United States Patent
Masuda et al.

(10) Patent No.: US 8,081,203 B2
(45) Date of Patent: Dec. 20, 2011

(54) LIGHT-AMOUNT DETECTING DEVICE, LIGHT SOURCE DEVICE, OPTICAL SCANNING UNIT AND IMAGE FORMING APPARATUS

(75) Inventors: Kensuke Masuda, Kodaira (JP); Tomohiro Nakajima, Machida (JP); Satoru Itoh, Yokohama (JP); Daisuke Ichii, Kawasaki (JP); Masahiro Soeda, Kawasaki (JP); Yoshinori Hayashi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 635 days.

(21) Appl. No.: 12/039,405

(22) Filed: Feb. 28, 2008

(65) Prior Publication Data
US 2008/0212999 A1 Sep. 4, 2008

(30) Foreign Application Priority Data

| Mar. 2, 2007 | (JP) | ................................. | 2007-052241 |
| Mar. 13, 2007 | (JP) | ................................. | 2007-063260 |
| Mar. 14, 2007 | (JP) | ................................. | 2007-064649 |
| Apr. 13, 2007 | (JP) | ................................. | 2007-105402 |

(51) Int. Cl.
*B41J 2/435* (2006.01)
*B41J 27/00* (2006.01)
(52) U.S. Cl. ......... 347/246; 347/236; 347/241; 347/256
(58) Field of Classification Search .................. 347/246, 347/236, 256, 241
See application file for complete search history.

(56) References Cited

U.S. PATENT DOCUMENTS

| 132,880 A | 11/1872 | Wheeler |
| 5,432,537 A | 7/1995 | Imakawa et al. |
| 5,557,448 A | 9/1996 | Endo et al. |

(Continued)

FOREIGN PATENT DOCUMENTS

EP 0 829 933 A2 3/1998

(Continued)

OTHER PUBLICATIONS

JP 2000-097770 A, Apr. 7, 2000, English translation of JP 3594813 B, Sep. 10, 2004 (Abstract only).

(Continued)

*Primary Examiner* — Stephen Meier
*Assistant Examiner* — Sarah Al Hashimi
(74) *Attorney, Agent, or Firm* — Dickstein Shapiro LLP

(57) ABSTRACT

A light-amount detecting device includes: a light source which emits a light beam; a branching optical element which divides the light beam emitted from the light source into a first light beam traveling in a predetermined direction and a second light beam traveling in a direction different to the predetermined direction; a light-condensing element which condenses the second light beam; a light-receiving element having a light-receiving surface which receives the second light beam condensed by the light-condensing element; and a detector which detects a light-amount of the second light beam received by the light-receiving element, and at least one of a direction of reflected light of the second light beam reflected from the light-receiving surface of the light-receiving element and spread of the reflected light of the second light beam reflected from the light-receiving surface of the light-receiving element is adjusted to control a light-amount of the reflected light of the second light beam returning to the light source.

20 Claims, 29 Drawing Sheets

U.S. PATENT DOCUMENTS

| | | | |
|---|---|---|---|
| 5,570,224 | A | 10/1996 | Endo et al. |
| 5,581,392 | A | 12/1996 | Hayashi |
| 5,633,744 | A * | 5/1997 | Nakajima ............... 359/196.1 |
| 5,652,670 | A | 7/1997 | Hayashi |
| 5,671,077 | A | 9/1997 | Imakawa et al. |
| 5,753,907 | A | 5/1998 | Nakajima et al. |
| 5,786,594 | A | 7/1998 | Ito et al. |
| 5,793,408 | A | 8/1998 | Nakajima |
| 5,875,051 | A | 2/1999 | Suzuki et al. |
| 5,936,756 | A | 8/1999 | Nakajima |
| 5,986,791 | A | 11/1999 | Suzuki et al. |
| 5,999,345 | A | 12/1999 | Nakajima et al. |
| 6,052,211 | A | 4/2000 | Nakajima |
| 6,069,724 | A | 5/2000 | Hayashi et al. |
| 6,081,386 | A | 6/2000 | Hayashi et al. |
| 6,091,534 | A | 7/2000 | Nakajima |
| 6,104,522 | A | 8/2000 | Hayashi et al. |
| 6,141,133 | A | 10/2000 | Suzuki et al. |
| 6,185,026 | B1 | 2/2001 | Hayashi et al. |
| 6,198,562 | B1 | 3/2001 | Hayashi et al. |
| 6,222,662 | B1 | 4/2001 | Suzuki et al. |
| 6,229,638 | B1 | 5/2001 | Sakai et al. |
| 6,239,860 | B1 | 5/2001 | Ito |
| 6,317,246 | B1 | 11/2001 | Hayashi et al. |
| 6,369,927 | B2 | 4/2002 | Hayashi |
| 6,400,391 | B1 | 6/2002 | Suhara et al. |
| 6,445,482 | B1 | 9/2002 | Hayashi |
| 6,462,853 | B2 | 10/2002 | Hayashi |
| 6,587,245 | B2 | 7/2003 | Hayashi |
| 6,621,512 | B2 | 9/2003 | Nakajima et al. |
| 6,657,765 | B2 | 12/2003 | Hayashi et al. |
| 6,704,129 | B2 | 3/2004 | Sakai et al. |
| 6,744,545 | B2 | 6/2004 | Suhara et al. |
| 6,757,089 | B2 | 6/2004 | Hayashi |
| 6,768,506 | B2 * | 7/2004 | Hayashi et al. ............... 347/235 |
| 6,771,296 | B2 | 8/2004 | Hayashi et al. |
| 6,771,407 | B2 | 8/2004 | Hayashi et al. |
| 6,775,041 | B1 | 8/2004 | Nakajima |
| 6,785,028 | B1 | 8/2004 | Atsuumi et al. |
| 6,786,506 | B2 | 9/2004 | Yasuhara et al. |
| 6,788,444 | B2 | 9/2004 | Suzuki et al. |
| 6,788,446 | B2 | 9/2004 | Hayashi |
| 6,803,941 | B2 | 10/2004 | Hayashi et al. |
| 6,806,984 | B2 | 10/2004 | Sakai et al. |
| 6,839,157 | B2 | 1/2005 | Ono et al. |
| 6,867,890 | B2 | 3/2005 | Suzuki et al. |
| 6,870,652 | B2 | 3/2005 | Suhara et al. |
| 6,903,856 | B2 | 6/2005 | Hayashi |
| 6,906,739 | B2 | 6/2005 | Suzuki et al. |
| 6,932,271 | B2 | 8/2005 | Nakajima et al. |
| 6,934,061 | B2 | 8/2005 | Ono et al. |
| 6,937,371 | B2 | 8/2005 | Hayashi et al. |
| 6,956,685 | B2 | 10/2005 | Hayashi |
| 6,972,883 | B2 | 12/2005 | Fujii et al. |
| 6,977,762 | B2 | 12/2005 | Hayashi |
| 6,987,593 | B2 | 1/2006 | Hayashi et al. |
| 6,995,885 | B2 | 2/2006 | Nakajima |
| 7,006,120 | B2 | 2/2006 | Sakai et al. |
| 7,012,724 | B2 | 3/2006 | Atsuumi et al. |
| 7,045,773 | B2 | 5/2006 | Suzuki et al. |
| 7,050,082 | B2 | 5/2006 | Suzuki et al. |
| 7,050,210 | B2 | 5/2006 | Atsuumi et al. |
| 7,068,296 | B2 | 6/2006 | Hayashi et al. |
| 7,072,127 | B2 | 7/2006 | Suhara et al. |
| 7,088,484 | B2 | 8/2006 | Hayashi et al. |
| 7,106,483 | B2 | 9/2006 | Hayashi et al. |
| 7,110,016 | B2 | 9/2006 | Suzuki et al. |
| 7,145,705 | B2 | 12/2006 | Hayashi |
| 7,154,651 | B2 | 12/2006 | Atsuumi et al. |
| 7,164,516 | B2 | 1/2007 | Hayashi et al. |
| 7,170,660 | B2 | 1/2007 | Nakajima |
| 7,218,432 | B2 | 5/2007 | Ichii et al. |
| 7,221,493 | B2 | 5/2007 | Fujii et al. |
| 7,233,425 | B2 | 6/2007 | Hayashi |
| 7,236,281 | B2 | 6/2007 | Hayashi et al. |
| 7,245,311 | B2 | 7/2007 | Hayashi et al. |
| 7,253,937 | B2 | 8/2007 | Ueda et al. |
| 7,271,823 | B2 | 9/2007 | Izumi et al. |
| 7,271,824 | B2 | 9/2007 | Omori et al. |
| 7,298,537 | B2 | 11/2007 | Hayashi et al. |
| 7,315,409 | B2 | 1/2008 | Hayashi |
| 7,561,318 | B2 | 7/2009 | Nakajima |
| 2002/0122217 | A1 | 9/2002 | Nakajima |
| 2003/0053156 | A1 | 3/2003 | Satoh et al. |
| 2004/0032631 | A1 | 2/2004 | Amada et al. |
| 2004/0036936 | A1 | 2/2004 | Nakajima et al. |
| 2004/0183890 | A1 | 9/2004 | Sakamoto et al. |
| 2004/0184127 | A1 | 9/2004 | Nakajima et al. |
| 2005/0062836 | A1 | 3/2005 | Nakajima |
| 2005/0105156 | A1 | 5/2005 | Ono et al. |
| 2005/0157160 | A1 | 7/2005 | Vazan |
| 2005/0185237 | A1 | 8/2005 | Nakajima |
| 2005/0190420 | A1 | 9/2005 | Imai et al. |
| 2005/0243396 | A1 | 11/2005 | Fujii et al. |
| 2006/0012844 | A1 | 1/2006 | Fujii et al. |
| 2006/0028533 | A1 | 2/2006 | Nakajima |
| 2006/0077500 | A1 | 4/2006 | Hayashi et al. |
| 2006/0109766 | A1 * | 5/2006 | Kim et al. ............... 369/53.23 |
| 2006/0132880 | A1 | 6/2006 | Amada et al. |
| 2006/0158711 | A1 | 7/2006 | Imai et al. |
| 2006/0209166 | A1 | 9/2006 | Suzuki et al. |
| 2006/0232659 | A1 | 10/2006 | Hayashi et al. |
| 2006/0232660 | A1 | 10/2006 | Nakajima et al. |
| 2006/0232844 | A1 | 10/2006 | Nakajima |
| 2006/0245009 | A1 | 11/2006 | Akiyama et al. |
| 2006/0256185 | A1 | 11/2006 | Suzuki et al. |
| 2006/0284968 | A1 | 12/2006 | Hayashi et al. |
| 2007/0035796 | A1 | 2/2007 | Nakajima |
| 2007/0058232 | A1 | 3/2007 | Nakajima |
| 2007/0058255 | A1 | 3/2007 | Imai et al. |
| 2007/0146473 | A1 * | 6/2007 | Masuda ............... 347/246 |
| 2007/0146738 | A1 | 6/2007 | Nakajima |
| 2007/0146851 | A1 | 6/2007 | Nakajima |
| 2007/0146856 | A1 | 6/2007 | Nakajima |
| 2007/0206257 | A1 | 9/2007 | Hayashi |
| 2007/0206259 | A1 | 9/2007 | Nakajima |
| 2007/0206261 | A1 | 9/2007 | Hayashi et al. |
| 2007/0211324 | A1 | 9/2007 | Sakai et al. |
| 2007/0211325 | A1 | 9/2007 | Ichii |
| 2007/0253047 | A1 | 11/2007 | Ichii et al. |
| 2007/0253048 | A1 | 11/2007 | Sakai et al. |
| 2007/0297036 | A1 | 12/2007 | Nakamura et al. |
| 2008/0024590 | A1 | 1/2008 | Nakajima |
| 2008/0204852 | A1 | 8/2008 | Amada et al. |
| 2008/0278566 | A1 * | 11/2008 | Towner et al. ............... 347/243 |

FOREIGN PATENT DOCUMENTS

| | | | |
|---|---|---|---|
| JP | 54-138451 A | 10/1979 | |
| JP | 64-51907 U | 3/1989 | |
| JP | 64-79629 A | 3/1989 | |
| JP | 3-85511 A | 4/1991 | |
| JP | 6-31980 A | 2/1994 | |
| JP | 6-106775 A | 4/1994 | |
| JP | 6-164070 A | 6/1994 | |
| JP | 7-9698 A | 1/1995 | |
| JP | 9-17225 A | 6/1997 | |
| JP | 10-100476 A | 4/1998 | |
| JP | 10-166644 A | 6/1998 | |
| JP | 11-149037 A | 6/1999 | |
| JP | 11-213243 A | 8/1999 | |
| JP | 11-245443 A | 9/1999 | |
| JP | 2000-009589 A | 1/2000 | |
| JP | 3227226 B | 8/2001 | |
| JP | 2002-40350 A | 2/2002 | |
| JP | 3594813 B | 9/2004 | |
| JP | 2004-276532 A | 10/2004 | |
| JP | 2005-10268 A | 1/2005 | |
| JP | 2005-092129 A | 4/2005 | |
| JP | 2005-156933 A | 6/2005 | |
| JP | 2005-208641 A | 8/2005 | |
| JP | 2006-091157 A | 4/2006 | |
| JP | 2006-154104 A | 6/2006 | |
| JP | 2006-259098 A | 9/2006 | |

| | | | |
|---|---|---|---|
| JP | 2006-301482 A | 11/2006 |
| JP | 2006-330581 A | 12/2006 |
| JP | 2006-332142 A | 12/2006 |
| JP | 2007-28509 A | 2/2007 |
| JP | 2007-41333 A | 2/2007 |
| JP | 2007-47428 A | 2/2007 |
| JP | 2007-298563 A | 11/2007 |

OTHER PUBLICATIONS

JP 2005-294005 A, Nov. 9, 1993, English translation of JP 3227226 B, Aug. 31, 2001 (Abstract only).

* cited by examiner

FIG. 7
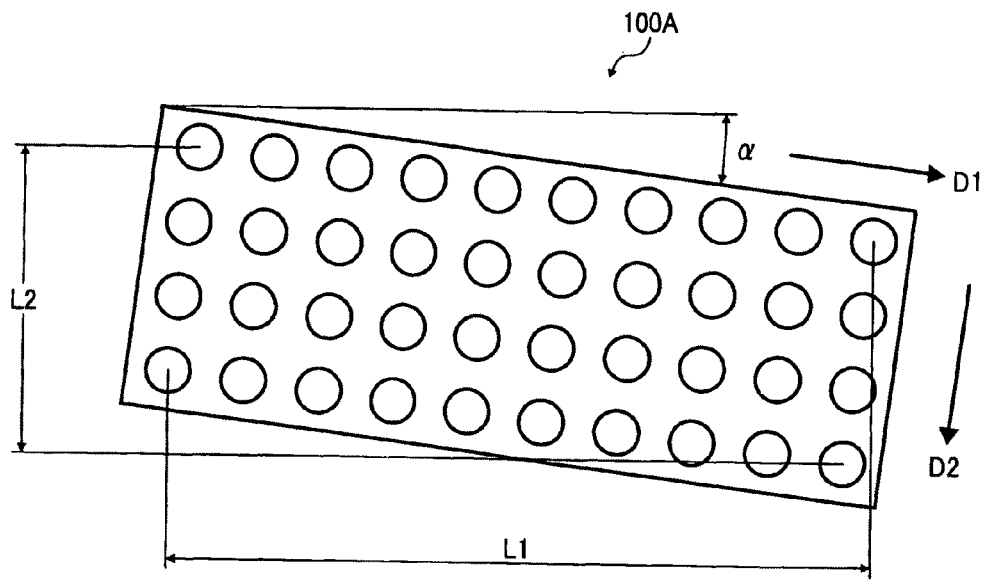
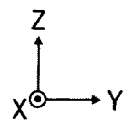
FIG. 8
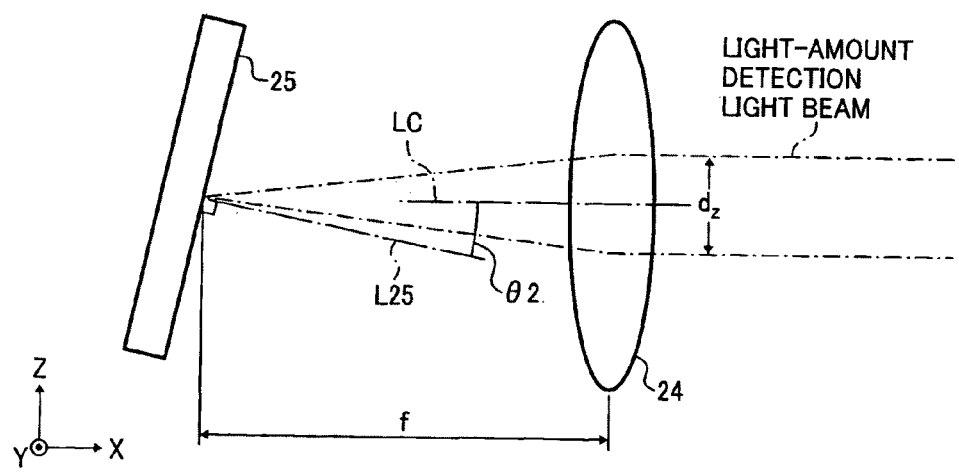

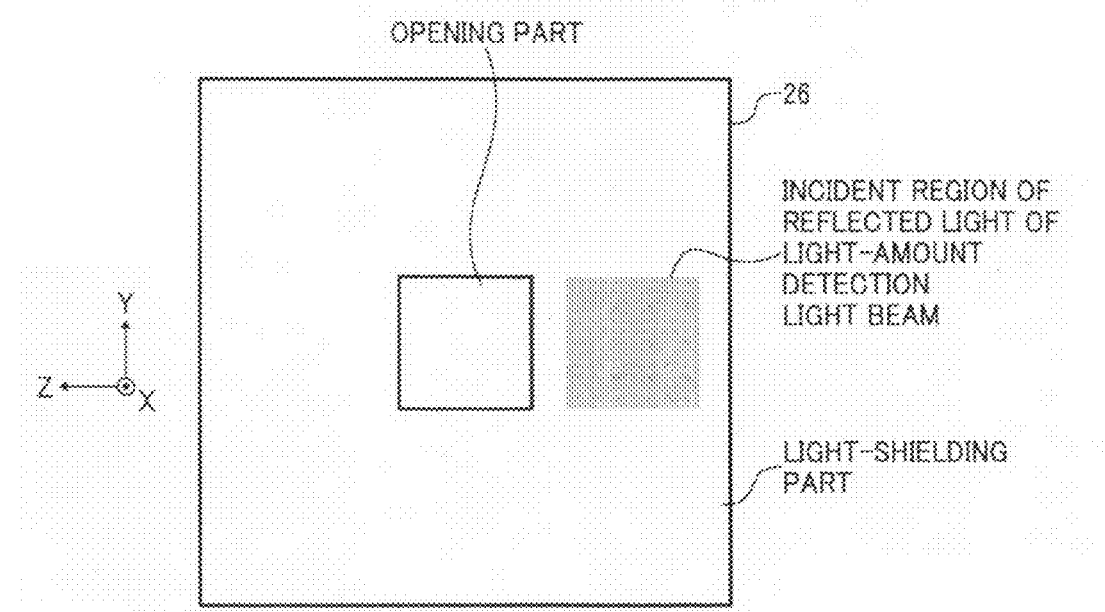
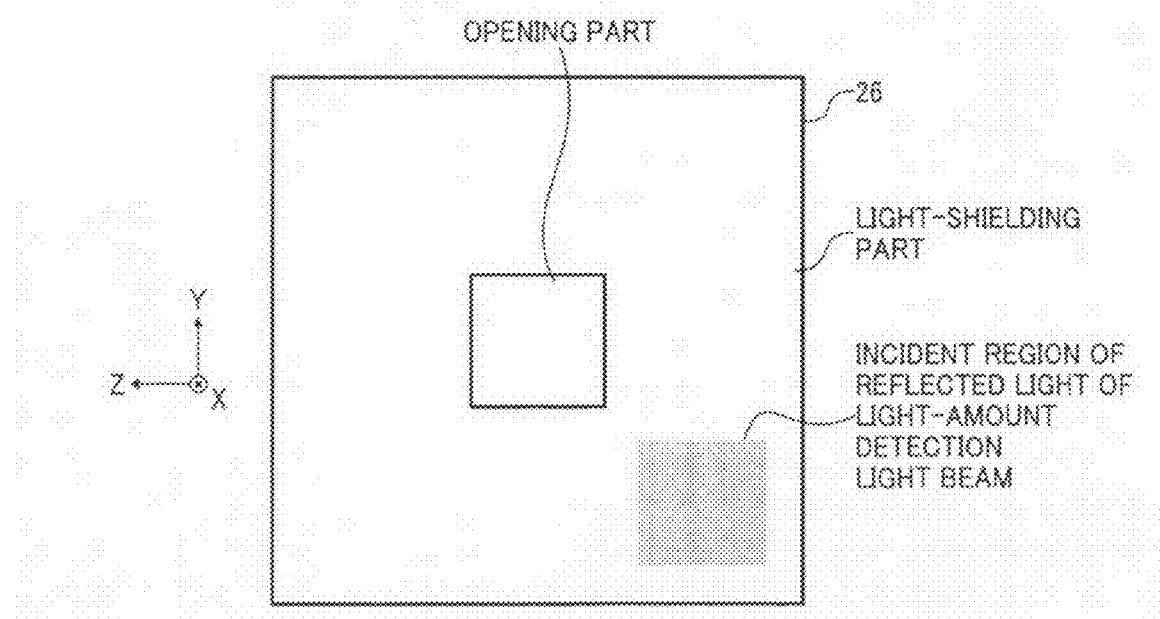

LIGHT-AMOUNT DETECTING DEVICE, LIGHT SOURCE DEVICE, OPTICAL SCANNING UNIT AND IMAGE FORMING APPARATUS

CROSS REFERENCE TO RELATED APPLICATIONS

The present application is based on and claims priority from Japanese Patent Applications No. 2007-064649, filed Mar. 14, 2007, No. 2007-052241, filed Mar. 2, 2007, No. 2007-063260, filed Mar. 13, 2007, and No. 2007-105402, filed Apr. 13, 2007, the disclosure of which are hereby incorporated by reference herein in their entirety.

BACKGROUND

The present invention relates to a light-amount detecting device which detects an amount of light of a light beam emitted from a light source, to a light source device provided with the light-amount detecting device, to an optical scanning unit having the light source device, and to an image forming apparatus provided with the optical scanning unit.

Conventionally, as an image forming apparatus which forms an image by utilizing a Carlson process, there has been known, for example, an image forming apparatus which forms an image by scanning a surface of a rotating photoreceptor drum with a light beam to form an electrostatic latent image on the surface of the photoreceptor drum, visualizing with a toner the electrostatic latent image as a toner image, and fixing the toner image onto a paper as a recording medium. In recent years, such a kind of image forming apparatus has been often used for a simplified printing as an on-demand printing system, and thus demands for attaining a high-density of an image and speed-up of an output of the image are being increased.

As a method of realizing the high-density of the image and the speed-up of the image output simultaneously, Japanese Patent Registration No. 3227226 proposes an image forming apparatus in which a light source emitting a plurality of light beams is used to scan photoreceptor drums with the light beams at once. The proposed image forming apparatus is possible to simultaneously scan the photoreceptor drums with the plurality of light beams, by collectively deflecting the light beams emitted from a surface emitting type laser (VCSEL: Vertical Cavity Surface Emitting LASER) array, having a plurality of light-emitting points, with a polygon mirror.

In addition, in an image forming apparatus, a light beam emitted from a light source influences quality of an image. Accordingly, various measures have been proposed in order to obtain the stable light beam.

For example, Japanese Patent Publications No. 2006-332142, No. 2006-91157, No. 2005-156933, and No. 2006-259098 each discloses an optical scanning unit which automatically changes an amount of driving current of light-emitting elements according to a change in light intensity of the light-emitting elements, by feeding back the light intensity of the light-emitting elements.

In addition, there are possibilities that an amount of light of a scanning light beam, which scans a photoreceptor drum, is changed in accordance with a temperature change, a secular change and so on, and that density unevenness is thereby generated on an image to be formed. In order to suppress such possibilities, normally, an optical scanning unit of an image forming apparatus detects an amount of light of light emitted from a light source or detects intensity of the light with a sensor such as a photodiode, to implement an APC (Auto Power Control) which controls the light-amount of the light source or the intensity of the light, on the basis of a result of the detection by the sensor.

In an image forming apparatus utilizing an optical scanning unit that detects a light-amount of a light beam emitted from a light source to control the light source, however, there is likely that returning light or reflected light of the light beam, utilized for the detection of the light-amount of the light source enters or incident on the light source. When the returning light or the reflected light is incident on the light source, laser oscillation may become unstable, and thereby, generation of noise and decrease in a laser output may be incurred.

In addition, in the image forming apparatus utilizing the optical scanning unit, light-emitting portions (or light-emitting elements) are lit constantly while the image forming apparatus is in operation. Hence, there is a possibility that deterioration in the light-emitting portions is occurred dues to heat generation of the light-emitting portions.

Moreover, it is desirable that the optical scanning unit be provided with a structure in which a positional relationship between the light source and an optical system is easily adjustable.

SUMMARY

At least one objective of the present invention is to provide a light-amount detecting device which detects a light-amount of a light beam emitted from a light source, a light source device provided with the light-amount detecting device, an optical scanning unit having the light source device, and an image forming apparatus provided with the optical scanning unit.

To achieve these and other advantages and in accordance with the purpose of the invention, as embodied and broadly described herein, the invention provides a light-amount detecting device, comprising: a light source which emits a light beam; a branching optical element which divides the light beam emitted from the light source into a first light beam traveling in a predetermined direction and a second light beam traveling in a direction different to the predetermined direction; a light-condensing element which condenses the second light beam; a light-receiving element having a light-receiving surface which receives the second light beam condensed by the light-condensing element; and a detector which detects a light-amount of the second light beam received by the light-receiving element, wherein at least one of a direction of reflected light of the second light beam reflected from the light-receiving surface of the light-receiving element and spread of the reflected light of the second light beam reflected from the light-receiving surface of the light-receiving element is adjusted to control a light-amount of the reflected light of the second light beam returning to the light source.

Advantageously, the light-receiving element is disposed such that a direction of a normal of the light-receiving surface in a light-receiving position of the second light beam is inclined relative to all directions of incidence of the second light beam entering the light-receiving surface.

Advantageously, the light-condensing element is disposed such that the second light beam is incident on the light-condensing element in a position separated from an optical axis of the light-condensing element.

Advantageously, the light source includes a plurality of light-emitting portions arranged two-dimensionally in which an interval between the light-emitting portions located at both ends in a first direction of the light-emitting portions is set smaller than an interval between the light-emitting portions located at both ends in a second direction perpendicular to the first direction of the light-emitting portions, and a direction of a normal of the light-receiving surface of the light-receiving element in a light-receiving position of the second light beam is inclined relative to all directions of incidence of the second light beam entering the light-receiving surface, in a plane which is horizontal to the first direction and which is perpendicular to a plane defined by the first direction and the second direction.

Advantageously, a following relationship is satisfied:

$$(L1-L2)\times(\theta1-\theta2)<0$$

where L1 is a center interval between the light-emitting portions located at the both ends in the first direction, L2 is a center interval between the light-emitting portions located at the both ends in the second direction, θ1 is an angle between the direction of the normal of the light-receiving surface of the light-receiving element in the light-receiving position of the second light beam and an optical axis of the second light beam entering the light-receiving element in the plane horizontal to the first direction and perpendicular to the plane defined by the first direction and the second direction, and θ2 is an angle between the direction of the normal of the light-receiving surface of the light-receiving element in the light-receiving position of the second light beam and an optical axis of the second light beam entering the light-receiving element in a plane which is horizontal to the second direction and which is perpendicular to a plane defined by the first direction and the second direction.

Advantageously, each of the light-emitting portions includes a vertical cavity surface emitting laser.

Advantageously, the light-receiving surface of the light-receiving element is disposed at a position separated in a direction of an optical axis of the light-condensing element from a focal position of the second light beam condensed by the light-condensing element.

Advantageously, a direction of a normal of the light-receiving surface of the light-receiving element in a light-receiving position of the second light beam is inclined relative to all directions of incidence of the second light beam entering the light-receiving surface.

Advantageously, the light-condensing element is disposed such that the second light beam is incident on the light-condensing element in a position separated from an optical axis of the light-condensing element.

Advantageously, the light-amount detecting device further comprises a light-shielding member disposed on an optical path of the reflected light of the second light beam reflected from the light-receiving surface of the light-receiving element and which shields the reflected light.

In addition, the invention provides an optical scanning unit, comprising; the light-amount detecting device, wherein the light source includes a plurality of light-emitting portions; a deflector which deflects the first light beam; an optical system which condenses the first light beam deflected from the deflector on a surface to be scanned; a synchronization sensor which detects a timing of starting a scanning by the first light beam of the surface to be scanned; and a controller which selects at least one of the light-emitting portions as the at least one light-emitting portion subjected to adjustment of a light-amount thereof, and which drives the at least one light-emitting portion subjected to the adjustment to emit the light beam and adjusts the light-amount of the at least one light-emitting portion subjected to the adjustment on the basis of the light-amount of the second light beam received by the light-receiving element during a time from a time point in which a predetermined time, after the timing of starting the scanning is detected by the synchronization sensor, is elapsed to a time point in which the first light beam reaches a scanning ending edge of the surface to be scanned.

Advantageously, the controller comprises: a light-emitting portion selecting circuit which selects the at least one light-emitting portion subjected to the adjustment and at least one light-emitting portion used for detection of the timing of starting the scanning; a timing signal generating circuit which generates a timing signal, which controls a timing of emission of the at least one light-emitting portion subjected to the adjustment; a light-amount adjusting circuit which adjusts the light-amount of the at least one light-emitting portion subjected to the adjustment, on the basis of the light-amount of the second light beam received by the light-receiving element; and a light-emitting portion driving circuit which drives the at least one light-emitting portion subjected to the adjustment, on the basis of a signal outputted from the light-amount adjusting circuit.

Advantageously, the light-emitting portion selecting circuit selects the at least one light-emitting portion subjected to the adjustment from the light-emitting portions excluding a light-emitting portion driven immediately before by the light-emitting portion driving circuit and excluding a light-emitting portion adjacent to that light-emitting portion driven by the light-emitting portion driving circuit immediately before.

Advantageously, the light-emitting portion selecting circuit selects the at least one light-emitting portion subjected to the adjustment from the light-emitting portions excluding a light-emitting portion used for the detection of the timing of starting the subsequent scanning and excluding a light-emitting portion adjacent to that light-emitting portion used for the detection of the timing of starting the subsequent scanning.

Advantageously, the light-emitting portion selecting circuit selects the at least one light-emitting portion subjected to the adjustment from the light-emitting portions excluding a light-emitting portion driven by the light-emitting portion driving circuit firstly in the subsequent scanning and excluding a light-emitting portion adjacent to that light-emitting portion driven firstly in the subsequent scanning by the light-emitting portion driving circuit.

Advantageously, the light-emitting portion selecting circuit selects the plurality of light-emitting portions subjected to the adjustment, and individually drives each of the light-emitting portions such that the selected light-emitting portions subjected to the adjustment emit with a timing different from each other.

Furthermore, the invention provides an image forming apparatus, comprising: the optical scanning unit; a photoreceptor on which an electrostatic latent image is formed by the optical scanning unit on the basis of image information; a developer which develops the electrostatic latent image formed on the photoreceptor as a toner image; and a transferring section which fixes the toner image developed by the developer on a recording medium.

Moreover, the invention provides another optical scanning unit, comprising: the light-amount detecting device; a holder which integrally retains the light-amount detecting device; and a position adjusting member which adjusts a position of the holder in a sub-scanning direction orthogonal to a direction of scanning by the first light beam on a surface to be scanned.

Advantageously, the position adjusting member supports the holder with at least three supporting points, and at least one of the at least three supporting points is adjustable in the sub-scanning direction.

The invention provides another image forming apparatus, comprising: the optical scanning unit; a photoreceptor on which an electrostatic latent image is formed by the optical scanning unit on the basis of image information; a developer which develops the electrostatic latent image formed on the photoreceptor as a toner image; and a transferring section which fixes the toner image developed by the developer on a recording medium.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

FIG. 7 is an explanatory view of another arrangement of the light-emitting portions in the light source section of the optical scanning unit according to the first embodiment of the invention.

FIG. 8 is an explanatory view of another positional relationship between the light-receiving surface of the photodiode and the imaging lens in the optical scanning unit according to the first embodiment of the invention.

FIG. 10 is an explanatory view of an incident region of the reflected light of the light-amount detection light beam in the light-shielding plate in a case in which an angle of arrangement of the photodiode is changed, in the optical scanning unit according to the first embodiment of the invention.

FIG. 11 is an explanatory view of another incident region of the reflected light of the light-amount detection light bean in the light-shielding plate in a case in which an angle of arrangement of the photodiode is changed, in the optical scanning unit according to the first embodiment of the invention.

DETAILED DESCRIPTION

Figure 1:
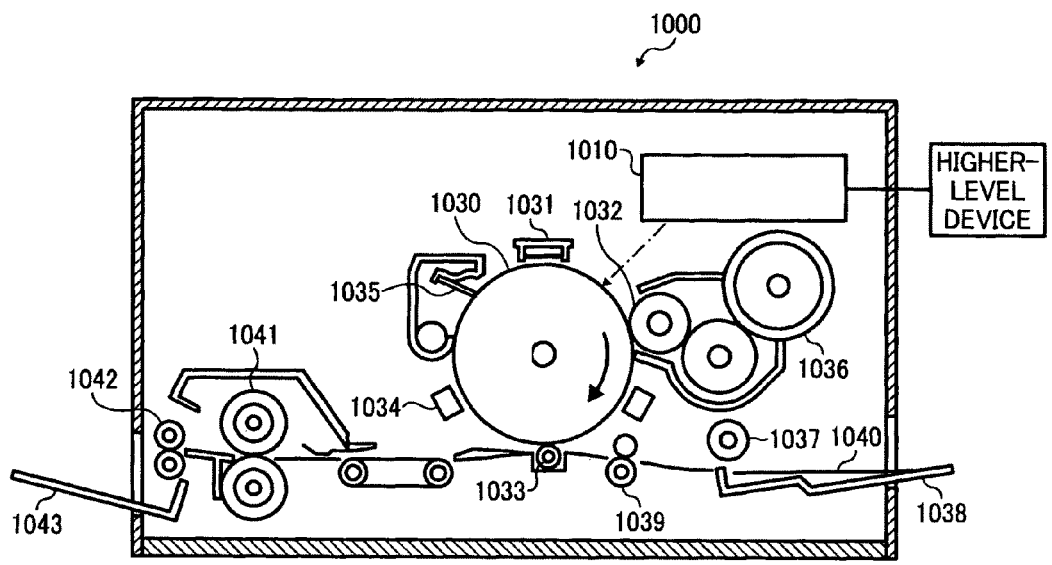
FIG. 1 is a side view schematically illustrating a structure of an image forming apparatus provided with an optical scanning unit according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

First Embodiment

FIGS. 1 to 6 illustrate a first embodiment of the present invention. The first embodiment of the invention is mainly directed to an optical scanning unit provided with a light-amount detecting device, and to an image forming apparatus provided with the optical scanning unit. The optical scanning unit according to the present embodiment is provided with a light-amount detecting device which detects an amount of light of a light beam emitted from a light source, and in which light-amount control for the light source is performed by using the light-amount detecting device. The optical scanning unit using the light-amount detecting device, for example, solves problems that returning light or reflected light of a light beam for detecting a light-amount of a light source (hereinafter simply referred to as a light beam for light-amount detection or a light-amount detection light beam) enters the light source, and thereby, laser oscillation may become unstable and generation of noise and decrease in a laser output may be incurred.

FIG. 1 schematically illustrates a structure of a laser printer 1000 as an image forming apparatus provided with an optical scanning unit according to a first embodiment of the invention.

Referring to FIG. 1, the laser printer 1000 including, for example, an optical scanning unit 1010, a photoreceptor drum 1030, an electrification charger 1031, a developing roller 1032, a transfer charger 1033, a destaticizing unit 1034, a cleaning blade 1035, a toner cartridge 1036, a paper-feeding roller 1037, a paper-feeding tray 1038, a pair of resist rollers 1039, fixing rollers 1041, paper-discharging rollers 1042, and a paper-delivery tray 1043, is illustrated.

A surface of the photoreceptor drum 1030 is formed with a photosensitive layer. The surface of the photoreceptor drum 1030 corresponds to a surface to be scanned.

The electrification charger 1031, the developing roller 1032, the transfer charger 1033, the destaticizing unit 1034, and the cleaning blade 1035 are arranged in the vicinity of the surface of the photoreceptor drum 1030, respectively. The photoreceptor drum 1030 is rotated clockwise or in a direction of an arrow in FIG. 1. The electrification charger 1031, the developing roller 1032, the transfer charger 1033, the destaticizing unit 1034, and the cleaning blade 1035 are disposed in that order in a direction of the rotation of the photoreceptor drum 1030.

The electrification charger 1031 evenly charges the surface of the photoreceptor drum 1030.

The optical scanning unit 1010 irradiates a light beam (a later-described light beam for scanning), modulated according to image information provided from a higher-level device, onto the surface of the photoreceptor drum 1030 charged by the electrification charger 1031. The higher-level device includes a personal computer, or other suitable devices. Thereby, the surface of the photoreceptor drum 1030 is formed with an electrostatic latent image corresponding to the image information. The thus formed electrostatic latent image is moved toward the developing roller 1032 in accordance with the rotation of the photoreceptor drum 1030. Note that a structure of the optical scanning unit 1010 will be described later in greater detail.

The toner cartridge 1036 stores therein a toner. The toner is supplied to the developing roller 1032.

The developing roller 1032 attaches the toner supplied from the toner cartridge 1036 to the electrostatic latent image formed on the surface of the photoreceptor drum 1030 to develop an image. The electrostatic latent image attached with the toner (hereinafter simply referred to as a toner image) is moved toward the transfer charger 1033 in accordance with the rotation of the photoreceptor drum 1030.

The paper-feeding tray 1038 contains therein recording papers 1040. The paper-feeding roller 1037 is disposed in the vicinity of the paper-feeding tray 1038. The paper-feeding roller 1037 takes one sheet of recording paper 1040 from the paper-feeding tray 1038, and sends the recording paper 1040 to the pair of resist rollers 1039 arranged near the transfer charger 1033. The pair of resist rollers 1039 once retains the recording paper 1040 retrieved by the paper-feeding roller 1037, and sends the retained recording paper 1040 toward an interspace between the photoreceptor drum 1030 and the transfer charger 1033 in a coordinated manner with the rotation of the photoreceptor drum 1030.

The transfer charger 1033 is applied with voltage having a polarity reverse to that of the toner, in order to electrically attract the toner on the surface of the photoreceptor drum 1030 to the recording paper 1040. Thereby, the toner image on the surface of the photoreceptor drum 1030 is transferred on the recording paper 1040. The recording paper 1040 on which the toner image is transferred is delivered to the fixing rollers 1041.

The fixing rollers 1041 apply heat and pressure on the recording paper 1040. Thereby, the toner image is fixed on the recording paper 1040. The recording paper 1040 on which the toner image is fixed is delivered to the paper-delivery tray 1043 through the paper-discharging rollers 1042, and is stacked on the paper-delivery tray 1043 one by one.

The destaticizing unit 1034 eliminates charges on the surface of the photoreceptor drum 1030.

The cleaning blade 1035 removes the toner or a residual toner remained on the surface of the photoreceptor drum 1030. The removed residual toner may be adapted to be used again. The surface of the photoreceptor drum 1030 in which the residual toner is removed returns to a position of the electrification charger 1031 again.

Now, the structure of the optical scanning unit 1010 will be described in detail. Note that the optical scanning unit 1010 will be described on the basis of a "Y-axis direction" defined by a longitudinal direction of the photoreceptor drum 1030, a "Z-axis direction" defined by a vertical direction of the optical scanning unit 1010 and perpendicular to the Y-axis direction, and an "X-direction" defined by a horizontal direction of the optical scanning unit 1010 and perpendicular to the Y-axis direction, as illustrated in FIG. 2.

Figure 2:
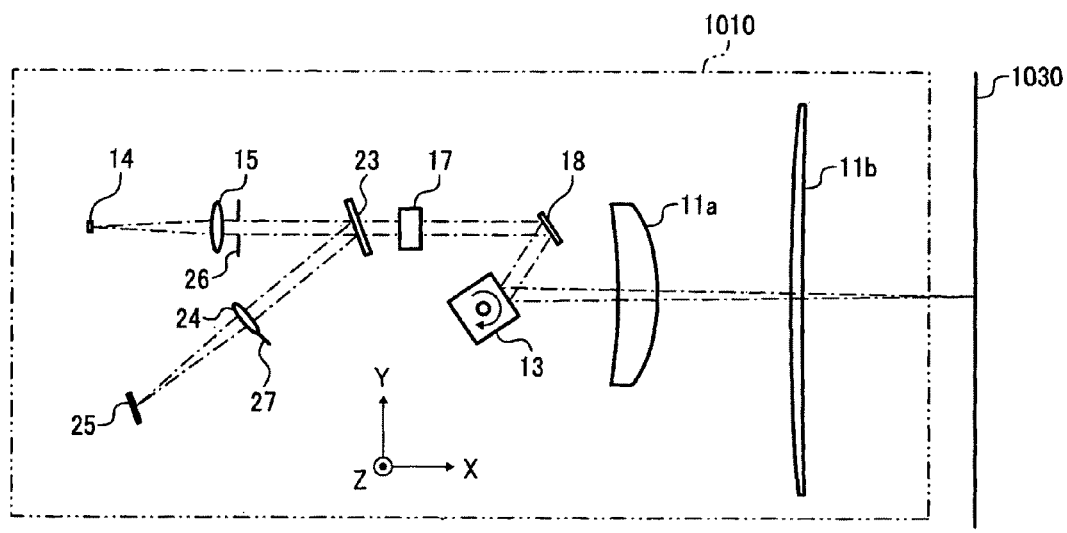
FIG. 2 is a plan view schematically illustrating the structure of the optical scanning unit according to the first embodiment of the invention.

FIG. 2 is a plan view schematically illustrating the structure of the optical scanning unit 1010 according to the first embodiment of the invention. Referring to FIG. 2, the optical scanning unit 1010 including, for example, a light source 14, a coupling lens 15, a branching optical element 23, a cylindrical lens 17, a reflecting plate (reflecting board) 18, a polygon mirror 13, an fθ lens 11*a,* a toroidal lens 11*b,* a light-shielding plate (light-shielding board) 26, a light-shielding plate (light-shielding board) 27, an imaging lens 24, and a photodiode 25 as a light-receiving element.

Figure 3:
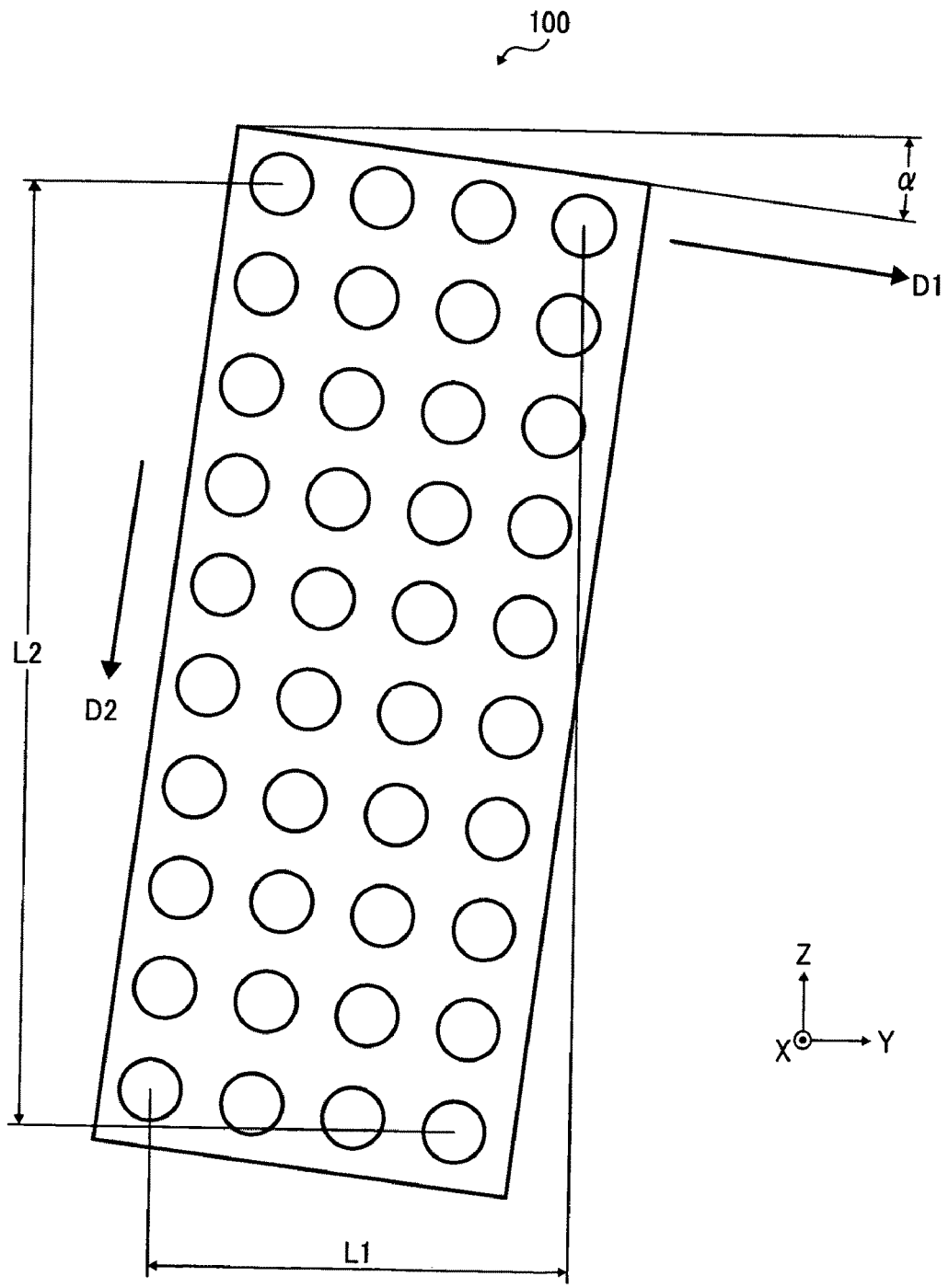
FIG. 3 is an explanatory view of an arrangement of light-emitting portions in a light source section of the optical scanning unit according to the first embodiment of the invention.

The light source 14 includes plural light-emitting portions. Preferably, each of the light-emitting portions includes VCSEL (Vertical Cavity Surface Emitting LASER), and arranged to structure a two-dimensional array 100, as illustrated in FIG. 3. In the present embodiment, a total of forty light-emitting portions is formed on a single substrate to structure the two-dimensional array 100. The two-dimensional array 100 includes ten columns of the light-emitting portions in which four light-emitting portions are arranged at even intervals along a direction having a tilt angle α relative to the Y-axis direction in a Y-Z plane, respectively. Here, the direction having the tilt angle α relative to the Y-axis direction in the Y-Z plane will be hereinafter simply referred to as a "D1 direction". In addition, the respective ten columns of the light-emitting portions are arranged at even intervals along a direction perpendicular to the D1 direction in the Y-Z plane. Here, the direction perpendicular to the D1 direction in the Y-Z plane will be hereinafter simply referred to as a "D2 direction". In other words, the forty light-emitting portions are arranged to be in a matrix configuration along the D1 direction and the D2 direction. In the present embodiment, an interval of the light-emitting portions refers to a center distance between the two light-emitting portions.

Furthermore, an interval L1 between the two light-emitting portions located at both ends in the Y-axis direction in the two-dimensional array 100 or a "first direction" is set to be smaller than an interval L2 between the two light-emitting portions located at both ends in the Z-axis direction in the two-dimensional array 100 or a "second direction".

Each of the light-emitting portions preferably includes the VCSEL having a 780 nm band, and emits the light beam in the X-axis direction of FIG. 2.

Referring to FIG. 2, the coupling lens 15 is disposed on a side of an emitting surface of the light beam of the light source 14, and causes the light beam projected from the light source 14 to be in a substantially parallel light.

The branching optical element 23 is disposed between the coupling lens 15 and the cylindrical lens 17. The branching optical element 23 includes an unillustrated opening defining at least a beam diameter in the Z-axis direction of the light beam having passed through the coupling lens 15. The branching optical element 23 is disposed to have an inclination relative to a virtual plane perpendicular to a traveling direction of the light beam having passed through the coupling lens 15, in order to utilize the light beam reflected from a surrounding area of the opening as the light-amount detection light beam (a second light beam).

Accordingly, the branching optical element 23 separates the light beam projected from the light source 14 into the light beam for scanning (a first light beam) for the photoreceptor drum 1030 and the light-amount detection light beam (the second light beam) for detecting the light-amount of the light source.

The cylindrical lens 17 is disposed between the branching optical element 23 and the reflecting plate 18. The scanning light beam having passed through the opening of the branching optical element 23 then passes through the cylindrical lens 17, which is then reflected by the reflecting plate 18 to be imaged near deflecting and reflecting surfaces of the polygon mirror 13.

In the present embodiment, an optical system disposed on an optical path between the light source 14 and the polygon mirror 13 structures a coupling optical system. The coupling optical system according to the present preferred embodiment includes the coupling lens 15, the branching optical element 23, the cylindrical lens 17, and the reflecting plate 18.

The polygon mirror 13 preferably includes a square prism member having low height, and formed with four planes of the deflecting and reflecting surfaces on side surfaces thereof. The polygon mirror 13 is rotated by an unillustrated rotating mechanism in a direction of an arrow illustrated in FIG. 2 at a constant angular velocity.

The fθ lens 11a is disposed between the polygon mirror 13 and the toroidal lens 11b. The fθ lens 11a has an image height proportional to an angle of incidence of the scanning light beam deflected from the polygon mirror 13, and causes the scanning light beam deflected by the polygon mirror 13 at the constant angular velocity to move at a constant velocity in the Y-axis direction as a main-scanning direction.

The toroidal lens 11b is disposed between the fθ lens 11a and the photoreceptor drum 1030.

In the present embodiment, an optical system disposed on an optical path between the polygon mirror 13 and the photoreceptor drum 1030 structures a scanning optical system. The scanning optical system according to the present preferred embodiment includes the fθ lens 11a and the toroidal lens 11b.

The scanning light beam deflected from the polygon mirror 13 is imaged by the scanning optical system, which is condensed on the surface of the photoreceptor drum 1030 as an optical spot.

The imaging lens 24 condenses or focuses the light-amount detection light beam reflected from the branching optical element 23. The photodiode 25 as the light-receiving element is disposed in the vicinity of a light-condensing position or a focal position of the light-amount detection light beam, and outputs a signal (photoelectric conversion signal) corresponding to an amount of light received. The signal outputted by the photodiode 25 is used to detect the light-amount of the light beam projected from the light source 14. Based on the output signal of the photodiode 25, driving current for each of the light-emitting portions is adjusted to control the light-amount of each of the light-emitting portions.

Figure 4:
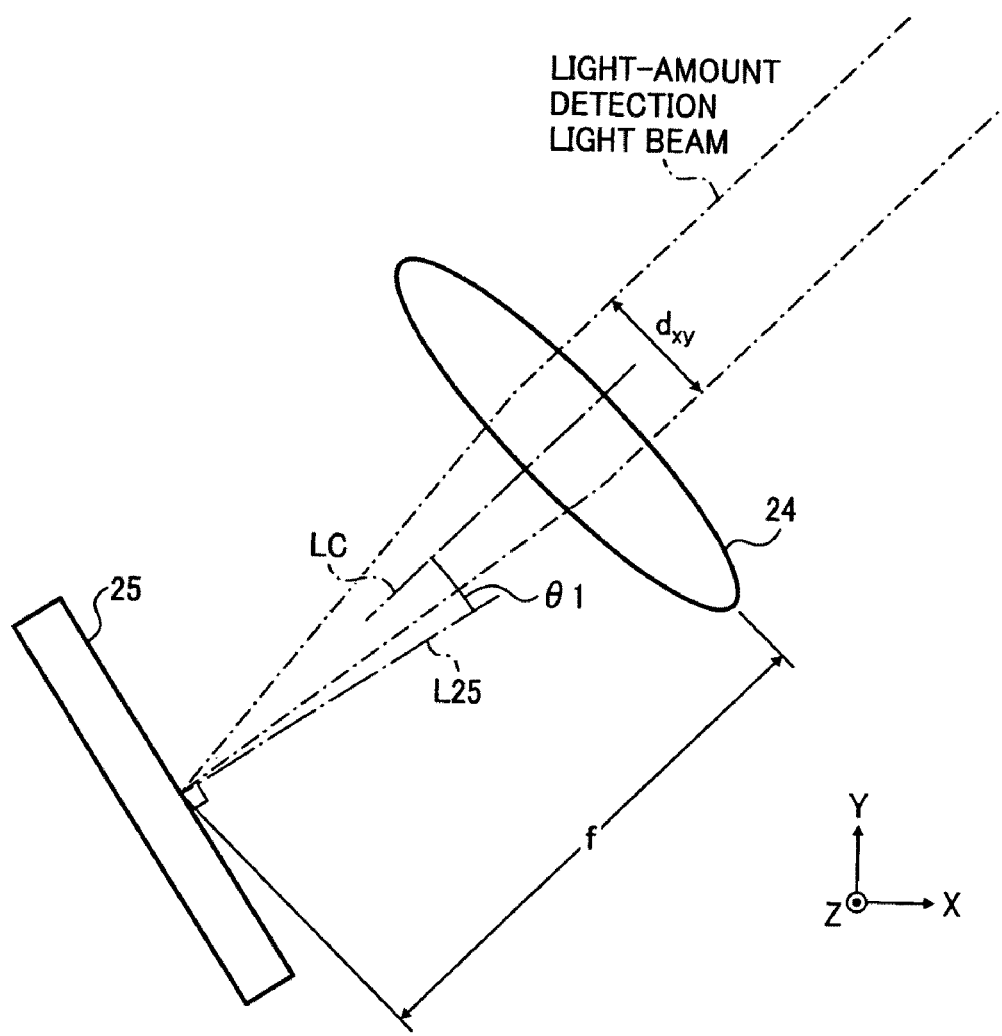
FIG. 4 is an explanatory view of a positional relationship between a light-receiving surface of a photodiode and an imaging lens in the optical scanning unit according to the first embodiment of the invention.

Referring to FIG. 4, in the present embodiment, the photodiode 25 is so arranged that a normal L25 of a light-receiving surface of the photodiode 25 in a light-receiving position of the light-amount detection light beam is inclined at an angle θ1 relative to an optical axis LC of the light-amount detection light beam entering the photodiode 25, in a plane (an XY plane in a case of FIG. 4) which is horizontal to the Y-axis direction (the first direction) and which is perpendicular to a plane defined by the Y-axis direction (the first direction) and the Z-axis direction (the second direction). More specifically, when the light-amount detection light beam is incident on the center of the imaging lens 24, the normal L25 of the light-receiving surface of the photodiode 25 in the light-receiving position of the light-amount detection light beam is inclined at the angle θ1 relative to an optical axis of the imaging lens 24. A size or degrees of the angle θ1 is set to be larger than a value obtained by a following formula (1):

$$\theta 1 = 2 \times \tan^{-1}(dxy/2f) \quad (1)$$

where dxy is a beam diameter of the light-amount detection light beam incident on the imaging lens 24, and f is a focal distance of the imaging lens 24.

It is to be noted that the beam diameter dxy depends on a size or length of the above-described interval L1.

For example, when the beam diameter dxy is 10 mm and the focal distance f is 46 mm, the angle θ1 is 6.2 degrees. In the present embodiment, the angle θ1 has 6.5 degrees, although it is not limited thereto.

When the angle θ1 satisfies conditions of the formula (1), a direction of the normal L25 of the light-receiving surface of the photodiode 25 in the light-receiving position of the light-amount detection light beam is inclined relative to all the incident directions of the light-amount detecting light beam entering the photodiode 25.

Here, in the present embodiment, a tilt angle θ2 of the normal L25 of the light-receiving surface of the photodiode 25 in the light-receiving position of the light-amount detection light beam relative to the optical axis LC of the light-amount detection light beam entering the photodiode 25, in a plane (an XZ plane in a case of FIG. 4) which is horizontal to the Z-axis direction (the second direction) and which is perpendicular to a plane defined by the Y-axis direction (the first direction) and the Z-axis direction (the second direction), has zero degree. Therefore, the interval L1, the interval L2, the angle θ1, and the angle θ2 satisfy a relationship as follows.

$$(L1-L2) \times (\theta 1 - \theta 2) < 0$$

Figure 5:
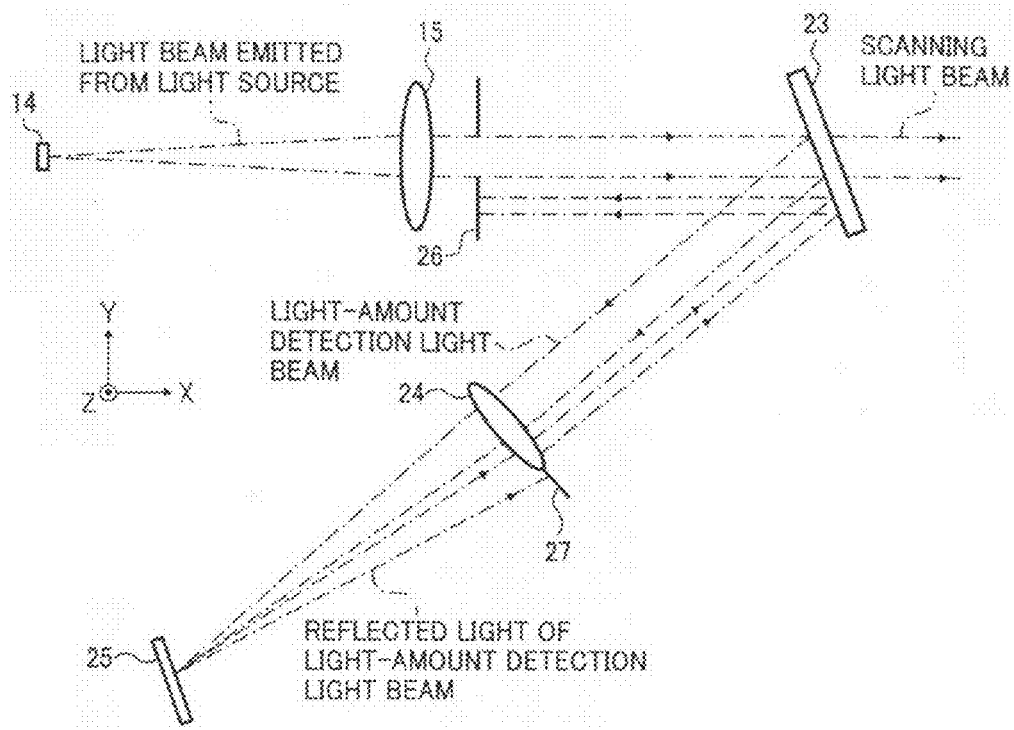
FIG. 5 is an explanatory view of an optical path of reflected light of a light-amount detection light beam in the optical scanning unit according to the first embodiment of the invention.

Referring to FIG. 5, for example, the reflected light or the returning light of the light-amount detection light beam reflected from the light-receiving surface of the photodiode 25 enters the branching optical element 23 through an optical path different from that of the light-amount detection light beam. The reflected light of the light-amount detection light beam reflected from the branching optical element 23 then, as illustrated in FIG. 5, travels toward the coupling lens 15 via a minus Y (−Y) side of the optical path going from the coupling lens 15 to the branching optical element 23.

Figure 6:
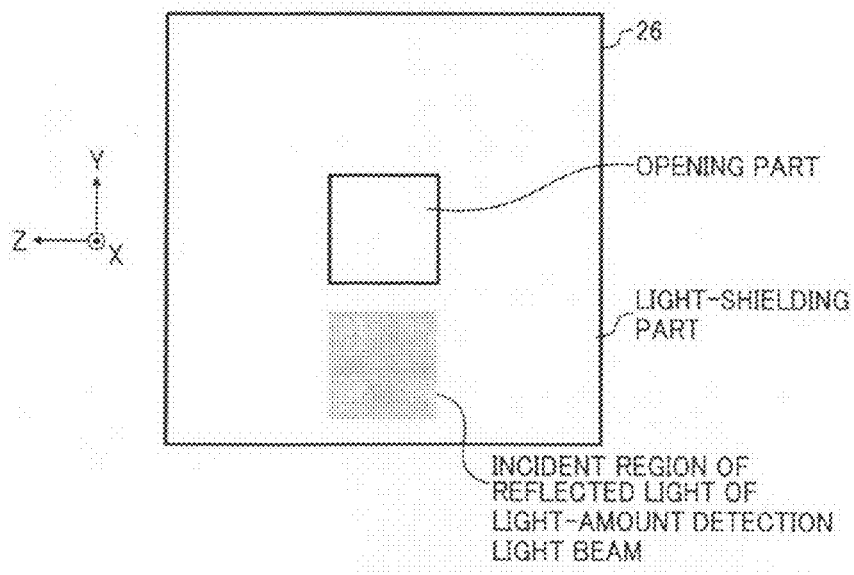
FIG. 6 is an explanatory view of an incident region of the reflected light of the light-amount detection light beam in a light-shielding plate, in the optical scanning unit according to the first embodiment of the invention.

Here, in the present embodiment, the light-shielding plate 26 is disposed between the coupling lens 15 and the branching optical element 23. The light-shielding plate 26 includes in the center thereof an opening part having a size through which the light beam traveling from the coupling lens 15 to the branching optical element 23 is possible to pass, and a light-shielding part as a surrounding area of the opening part. FIGS. 5 and 6 each illustrates an example in which the reflected light of the light-amount detection light beam is incident on the light-shielding part on the minus Y side in FIGS. 5 and 6 of the opening part in the light-shielding plate 26.

Therefore, it is possible to prevent the reflected light of the light-amount detection light beam, reflected from the branching optical element 23, from entering the coupling lens 15 by the light-shielding part of the light-shielding plate 26. As a result, it is possible to avoid the reflected light of the light-amount detection light beam to enter the light source 14.

On the other hand, the light-shielding plate 27 is disposed in the vicinity of the imaging lens 24, to prevent the reflected light of the light-amount detection light beam from entering, for example, the polygon mirror 13, the scanning optical system, and the photoreceptor drum 1030.

In the present embodiment, an optical system disposed on an optical path between the light-shielding plate 26 and the photodiode 25 structures a monitoring optical system. The monitoring optical system according to the present preferred embodiment includes the branching optical element 23 and the imaging lens 24.

The light-amount for the light-emitting portion is controlled by an unillustrated controller. The light-amount of the light-emitting portion may be adjusted, for example, by a method which lights the respective light-emitting portions subsequently, detects the light-amounts of the respective light-emitting portions individually, and adjusts the light-amount of each of the light-emitting portions based on a result of the detection of the individual light-amount. Alternatively, the light-amount of the light-emitting portion may be adjusted, for example, by a method which defines at least two light-emitting portions as a set, lights each of the plural sets of the light-emitting portions subsequently, detects the light-amount of each of the sets of the light-emitting portions, and adjusts the light-amount of each of the light-emitting portions based on a result of the detection thereof.

In the present embodiment, the branching optical element 23, the imaging lens 24, the photodiode 25, the light-shielding plate 26, the light-shielding plate 27, and the controller structure the light-amount detecting device.

Therefore, according to the present embodiment of the present invention, it is possible to adjust the light-amount of the plural light-emitting portions individually by using the single light-amount detecting portion. Hence, simplification of optical systems and reduction in the number of components are possible. As a result, it is possible to realize cost-reduction and miniaturization of a device.

In the optical scanning unit 1010 according to the present embodiment, the light source 14, the coupling lens 15 and the light-amount detecting device structure a light source device.

As described in the foregoing, therefore, the optical scanning unit 1010 according to the present embodiment separates the light beam emitted from the light source 14 into the scanning light beam and the light-amount detection light beam with the branching optical element 23, and condenses or focuses the light-amount detection light beam reflected to be separated by the branching optical element 23 onto or near the light-receiving surface of the photodiode 25 with the imaging lens 24. Here, the photodiode 25 is so disposed that the normal L25 of the light-receiving surface of the photodiode 25 in the light-receiving position of the light-amount detection light beam is inclined relative to all the incident directions of the light-amount detecting light beam incident on the photodiode 25. Hence, the reflected light of the light-amount detection light beam reflected from the photodiode 25 and returning to the light source 14 travels the optical path different from that of the light beam emitted from the light source 14. Therefore, it is possible to block only the reflected light of the light-amount detection light beam easily with the light-shielding plate 26, and to prevent the reflected light of the light-amount detection light beam from entering the light source 14 at reduced costs.

Accordingly, the entrance of the returning light to the light source 14, i.e., entrance of the reflected light of the light-amount detection light beam into the light source 14, is avoided. Thus, stable laser oscillation is performed in the respective light-emitting portions of the light source 14. Therefore, it is possible for the light source 14 to output the plural light beams in a stable manner. Consequently, it is possible to perform optical scanning of the photoreceptor drum 1030 with high accuracy without incurring rise in costs.

In addition, according to the optical scanning unit of the present embodiment, the interval L1 of the light-emitting portions is smaller than the interval L2 in the two-dimensional array 100, and the direction of the normal L25 of the light-receiving surface of the photodiode 25 in the light-receiving position of the light-amount detection light beam is inclined at the angle θ1 relative to the optical axis of the light-amount detection light beam entering the photodiode 25, in the plane which is horizontal to the Y-axis direction and which is perpendicular to the plane defined by the Y-axis direction and the Z-axis direction(the XY plane in a case of FIG. 4). Therefore, it is possible to set the tilt angle of the two-dimensional array 100 small.

Furthermore, in the optical scanning unit according to the present embodiment, the light source 14 in which the plural light-emitting portions are arranged in a two-dimensional array configuration is used. Therefore, it is possible to realize a high-density in writing density carried out by the scanning light beam.

Moreover, in the optical scanning unit according to the present embodiment, the returning light to the light source 14 is prevented from entering the light source 14. Hence, a loss in the laser oscillation in the light-emitting portions is reduced. Therefore, energy conservation and reduction of environmental burdens are possible.

According to the image forming apparatus having the optical scanning unit of the present embodiment, the optical scanning of the photoreceptor drum 1030 is carried out with high accuracy, without incurring rise in costs. Therefore, it is possible to form an image of high quality without incurring rise in costs.

In addition, the image forming apparatus provided with the optical scanning unit according to the present embodiment uses the light source 14 in which the plural light-emitting portions are arranged in the two-dimensional array configuration. Therefore, it is possible to attain speed-up of writing speed of the optical scanning unit 1010, and to attain speed-up of the formation of the image.

Referring to FIG. 7, according to an alternative embodiment, a two-dimensional array 100A in which the two-dimensional array 100 is rotated 90 degrees within the YZ plane is used. In this alternative embodiment, the interval L2 between the two light-emitting portions located at the both ends in the Z-axis direction is set to be smaller than the interval L1 between the two light-emitting portions located at the both ends in the Y-axis direction in the two-dimensional array 100A.

Referring to FIG. 8, in the alternative embodiment, it is preferable that the photodiode 25 be so arranged that the normal L25 of the light-receiving surface of the photodiode 25 in the light-receiving position of the light-amount detection light beam is inclined at an angle more than a value θ2 obtained the a following formula (2), relative to the optical axis LC of the light-amount detection light beam entering the photodiode 25, in the plane (an XZ plane in a case of FIG. 8) which is horizontal to the Z-axis direction and which is perpendicular to the plane defined by the Y-axis direction and the Z-axis direction. More specifically, when the light-amount detection light beam is incident on the center of the imaging lens 24, the normal L25 of the light-receiving surface of the photodiode 25 in the light-receiving position of the light-amount detection light beam is inclined at the angle more than the value θ2 obtained by the following formula (2), relative to the optical axis of the imaging lens 24.

$$\theta 2 = 2 \times \tan^{-1}(dz/2f) \quad (2)$$

where dz is a beam diameter in the Z-axis direction of the light-amount detection light beam incident on the imaging lens 24, and f is the focal distance of the imaging lens 24. It is to be noted that the beam diameter dz depends on a size or length of the above-described interval L2.

When the angle θ2 satisfies conditions of the formula (2), the direction of the normal L25 of the light-receiving surface of the photodiode 25 in the light-receiving position of the light-amount detection light beam is inclined relative to all the incident directions of the light-amount detecting light beam entering the photodiode 25.

Figure 9:
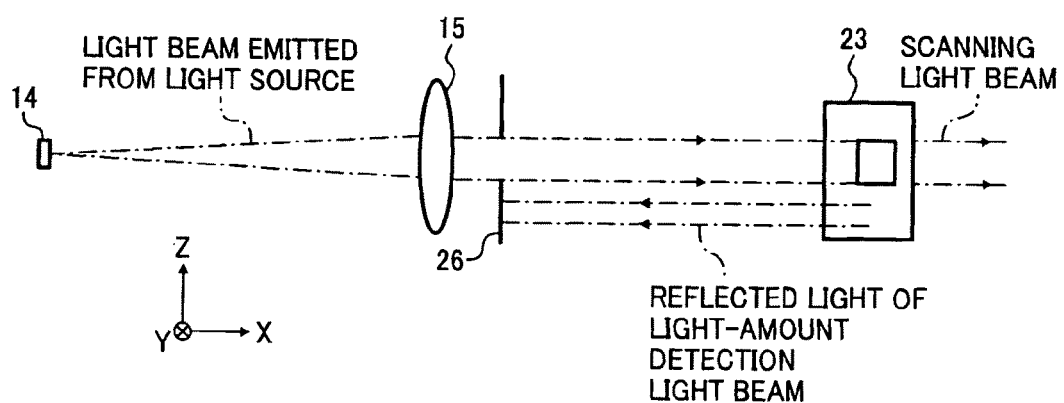
FIG. 9 is an explanatory view of another optical path of the reflected light of the light-amount detection light beam in the optical scanning unit according to the first embodiment of the invention.

Referring to FIG. 9, for example, the reflected light of the light-amount detection light beam reflected from the branching optical element 23 travels toward the coupling lens 15 via a minus Z (−Z) side of the optical path going from the coupling lens 15 to the branching optical element 23. Then, the reflected light of the light-amount detection light beam is blocked by the light-shielding plate 26 such that the reflected light does not enter the coupling lens 15. In this example, the reflected light of the light-amount detection light beam is incident on the light-shielding part on the minus Z (−Z) side of the opening part of the light-shielding plate 26 as illustrated in FIGS. 9 and 10, whereby the reflected light of the light-amount detection light beam is intercepted.

In addition, according to the alternative embodiment in which the two-dimensional array 100A is used, the photodiode 25 may also be so disposed that the normal L25 of the light-receiving surface of the photodiode 25 in the light-receiving position of the light-amount detection light beam is inclined at the angle θ1 relative to the optical axis LC of the light-amount detection light beam entering the photodiode 25 in the plane (the XY plane in a case of FIG. 8) which is horizontal to the Y-axis direction and which is perpendicular to the plane defined by the Y-axis direction and the Z-axis direction, and at the same time, inclined at the angle θ2 relative to the optical axis LC in the plane (the XZ plane in the case of FIG. 8) which is horizontal to the Z-axis direction and which is perpendicular to the plane defined by the Y-axis direction and the Z-axis direction. In this example, the reflected light of the light-amount detection light beam travels toward the coupling lens 15 through a path which is on the minus Z (−Z) side of the optical path going from the coupling lens 15 to the branching optical element 23 and which is on a minus Y (−Y) side in FIG. 9.

FIG. 11 illustrates an incident region of the reflected light of the light-amount detection light beam in the light-shielding plate 26 in the present example. Therefore, according to the alternative embodiment it is possible to set the incident region of the reflected light of the light-amount detection light beam at an arbitrary position in the light-shielding plate 26 by adjusting the angle θ1 and the angle θ2. Hence, it is possible to provide flexibility in conditions for a design layout of, for example, members, elements or the like structuring the light source 14.

Figure 12:
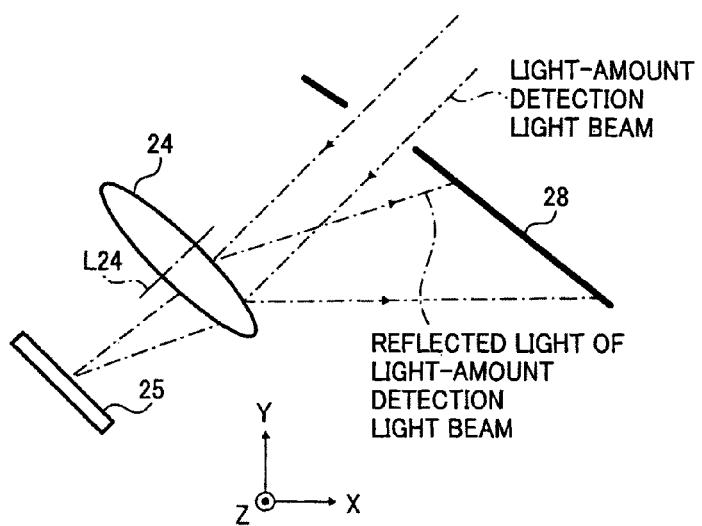
FIG. 12 is an explanatory view of an optical path of the reflected light of the light-amount detection light beam in a case in which the light-amount detection light beam enters a position shifted from an optical axis of the imaging lens, in the optical scanning unit according to the first embodiment of the invention.

Referring to FIG. 12, according to the present embodiment, the imaging lens 24 may be so arranged that the light-amount detection light beam enters a position of the imaging lens 24 shifted from an optical axis L24 of the imaging lens 24. In this example, the direction of the normal L25 of the light-receiving surface of the photodiode 25 in the light-receiving position of the light-amount detection light beam is inclined relative to all the incident directions of the light-amount detecting light beam entering the photodiode 25, when the light-receiving surface of the photodiode 25 is arranged perpendicular to the optical axis L24 of the imaging lens 24. Thus, the reflected light of the light-amount detection light beam is projected from the imaging lens 24 in a direction different from the direction that travels to the branching optical element 23.

In this example, a light-shielding plate (light-shielding board) 28 may be provided between the imaging lens 24 and the branching optical element 23, so as to avoid the reflected light of the light-amount detection light beam to enter, for example, the light source 14, the polygon mirror 13, the scanning optical system, and the photoreceptor drum 1030.

Figure 13:
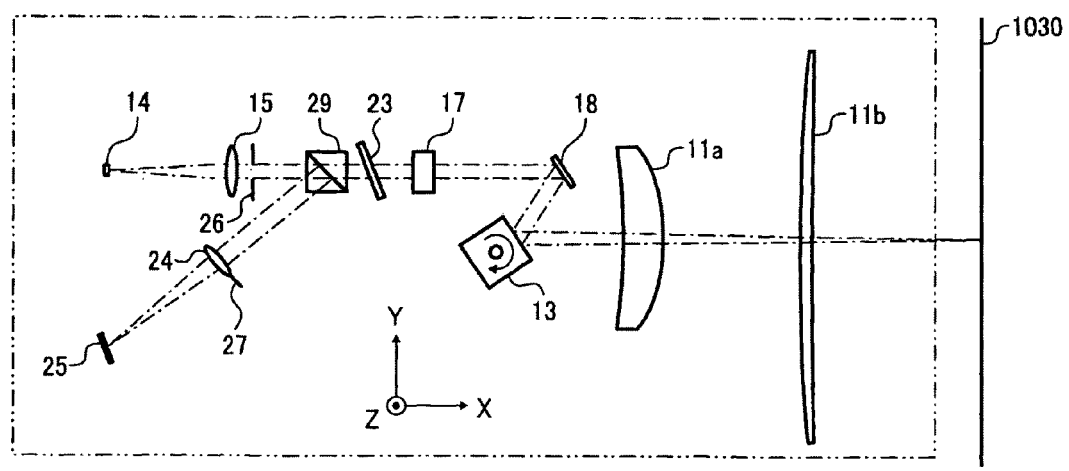
FIG. 13 is a plan view schematically illustrating a structure when light emitted from a light source is to be separated into a scanning light beam and the light-amount detection tight beam by using a half-mirror, in the optical scanning unit according to the first embodiment of the invention.

According to the present embodiment, light-amount detection light beam is provided based on the light beam reflected by the branching optical element 23. Alternatively, optical elements for separating the light beam emitted from the light source 14 into the scanning light beam and the light-amount detection light beam may be separately provided. Referring to FIG. 13, a half-mirror 29 may be disposed between the coupling lens 15 and the cylindrical lens 17, and the light beam reflected by the half-mirror 29 may be provided as the light-amount detection light beam.

In addition, according to the present embodiment the light-emitting portions of the light source 14 may employ a structure in which plural edge-emitting type lasers are combined, in place of the two-dimensional array 100. Alternatively, one-dimensional array of the edge-emitting type lasers may be used for the light-emitting portions, in place of the two-dimensional array 100.

Furthermore, the light source 14 of the present embodiment includes the forty light-emitting portions. However, the number of the light-emitting portions is not limited thereto. For example, the light source 14 may includes a single light-emitting portion.

Moreover, the present embodiment has been described based on the printer 1000 as the image forming apparatus. However, the image forming apparatus is not limited thereto. It is possible for any image forming apparatus provided with the optical scanning unit 1010 according to the present embodiment to form the high-quality image at high-speed.

For example, the image forming apparatus may also be an image forming apparatus, which includes the optical scanning unit 1010 according to the present embodiment, and which directly irradiates laser light onto a medium, such as a photosensitive paper, that develops a color by the laser light.

In addition, the image forming apparatus may also be an image forming apparatus in which a silver-halide film is used as an image carrying body. In this example, a latent image is formed on the silver-halide film by the optical scanning. The thus-formed latent image can be visualized with a process equivalent to a development process in normal silver-halide film processes, which can then be transcribed on a photographic paper with a process equivalent to a printing process in the normal silver-halide film processes. Such an image forming apparatus can be used as an optical plate-making device, a photo-lithographing device which draws an image of a computed-tomography scan, or the like.

The image forming apparatus may also be an image forming apparatus which forms a multi-colored image. In this example, formation of the colored image of high-quality is possible at high-speed by using the optical scanning unit corresponding to the colored image.

Figure 14:
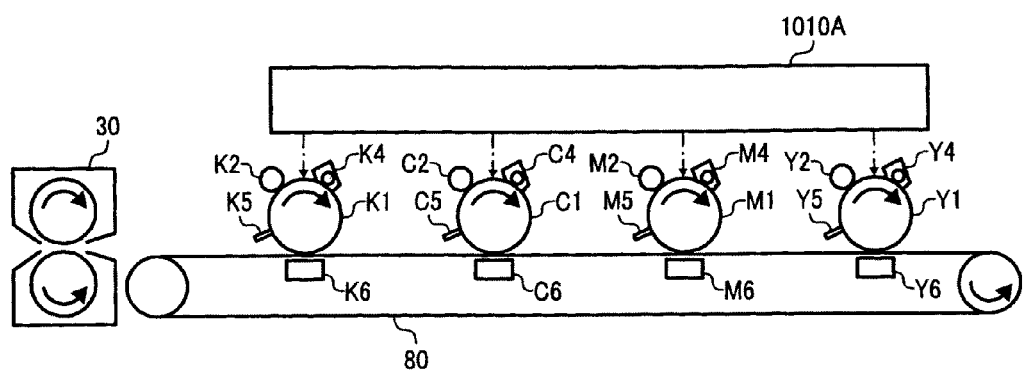
FIG. 14 is a side view schematically illustrating a structure of a tandem color machine utilizing the optical scanning unit according to the first embodiment of the invention.

Referring to FIG. 14, for example, the image forming apparatus may be a tandem color machine which corresponds to the colored image and provided with the optical scanning unit according to the present embodiment and the plural photoreceptor drums. The tandem color machine illustrated in FIG. 14, for example, includes a photoreceptor drum K1, a charger K2, a developer K4, a cleaner K5 and a transfer charger K6 for black (K: Key tone), a photoreceptor drum C1, a charger C2, a developer C4, a cleaner C5 and a transfer charger C6 for cyan (C: Cyan), a photoreceptor drum M1, a charger M2, a developer M4, a cleaner M5 and a transfer charger M6 for magenta (M: Magenta), a photoreceptor drum Y1, a charger Y2, a developer Y4, a cleaner Y5 and a transfer charger Y6 for yellow (Y: Yellow). The tandem color machine further includes an optical scanning unit 1010A, a transfer belt 80, and a fixing member 30, for example.

The optical scanning unit 1010A includes a light source and at least one light-amount detecting device, which are the same or similar to those described above. In this example, the light source includes light-emitting portions for black, light-emitting portions for cyan, light-emitting portion for magenta, and light-emitting portions for yellow. The light-amount detecting device detects the light-amount of the light beam projected from the light source.

The light beam from the light-emitting portions for black is irradiated on the photoreceptor drum K1 through a scanning optical system for black. Similarly, the light beam from the light-emitting portions for cyan is irradiated on the photoreceptor drum C1 through a scanning optical system for cyan, the light beam from the light-emitting portions for magenta is irradiated on the photoreceptor drum M1 through a scanning optical system for magenta, and the light beam from the light-emitting portions for yellow is irradiated on the photoreceptor drum Y1 through a scanning optical system for yellow.

The photoreceptor drums K1, C1, M1 and Y1 are rotated in directions of arrows as illustrated in FIG. 14, respectively. Each of the chargers, the developers, the transfer chargers and the cleaners for the respective colors are arranged in this order in the rotating direction thereof. Each of the chargers electrically charges the surface of the corresponding one of the photoreceptor drums, uniformly. The light beam is irradiated by the optical scanning unit onto the surface of each of the photoreceptor drums charged by the corresponding one of the chargers, thereby forming electrostatic latent images on the photoreceptor drums. Then, toner images are formed on the surfaces of the photoreceptor drums by the corresponding developers. Thereafter, the toner images of respective colors are transferred by the corresponding transfer chargers, which are finally fixed onto a recording paper by the fixing member 30.

In the tandem color machine, alternatively, an optical scanning unit for black, an optical scanning unit for cyan, an optical scanning unit for magenta, and an optical scanning unit for yellow may be provided, in place of the single optical scanning unit 1010A described above. In this example, the optical scanning units for the respective colors include the light-amount detecting devices for detecting the light-amounts of the light beams emitted from the light sources, respectively.

Second Embodiment

FIGS. 15 to 23 illustrate a second embodiment of the present invention. The second embodiment of the invention is mainly directed to an optical scanning unit provided with a light-amount detecting device, and to an image forming apparatus provided with the optical scanning unit. The optical scanning unit according to the present embodiment is provided with a light-amount detecting device which detects an amount of light of a light beam emitted from a light source, and in which light-amount control for the light source is performed by using the light-amount detecting device. The optical scanning unit using the light-amount detecting device, for example, solves problems that returning light or reflected light of a light-amount detection light beam enters the light source, and thereby, laser oscillation may become unstable and generation of noise and decrease in a laser output may be incurred. Note that the optical scanning unit according to the present embodiment is generally similar to the optical scanning unit 1010 described in the first embodiment, but a part of a structure differs from that of the optical scanning unit 1010.

Figure 15:
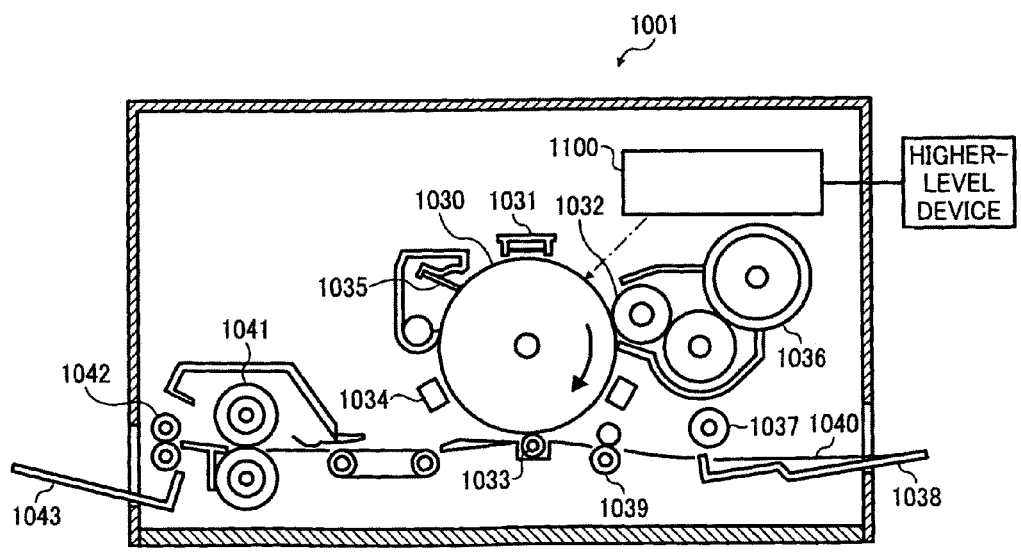
FIG. 15 is a side view schematically illustrating a structure of an image forming apparatus provided with an optical scanning unit according to a second embodiment of the invention.

FIG. 15 schematically illustrates a structure of a printer 1001 as the image forming apparatus provided with the optical scanning unit according to the second embodiment of the invention. The printer 1001 has a similar structure in which the optical scanning unit 1010 of the above-described printer 1000 is replaced with an optical scanning unit 1100 according to the present second embodiment. Since other parts of the structure of the optical scanning unit 1100 according to the present embodiment is the same or equivalent to the optical scanning unit 1010, description on the optical scanning unit 1100 will be hereinafter made, and description on the other parts will not be made in detail.

Figure 16:
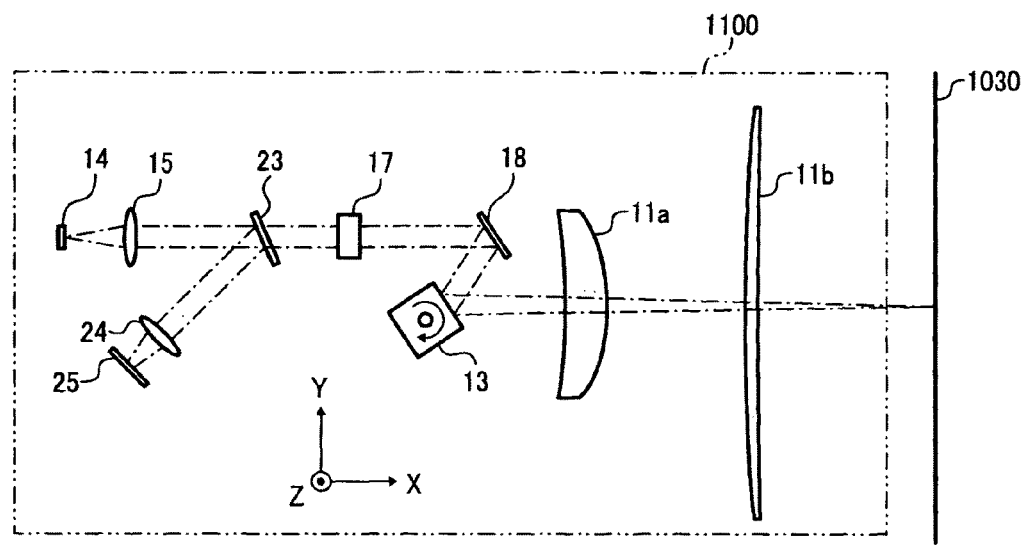
FIG. 16 is a plan view schematically illustrating the structure of the optical scanning unit according to the second embodiment of the invention.

FIG. 16 schematically illustrates the structure of the optical scanning unit 1100 according to the second embodiment of the invention. Referring to FIG. 16, the optical scanning unit 1100 including, for example, a light source 14, a coupling lens 15, a branching optical element 23, a cylindrical lens 17, a reflecting plate (reflecting board) 18, a polygon mirror 13, an fθ lens 11*a*, a toroidal lens 11*b*, an imaging lens 24, and a photodiode 25 as a light-receiving element, is illustrated.

Figure 17:
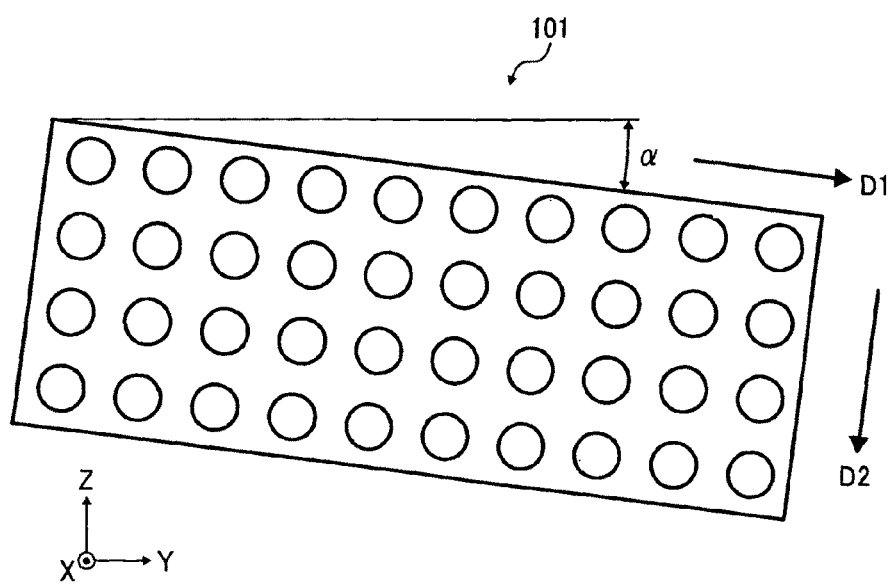
FIG. 17 is an explanatory view of an arrangement of light-emitting portions in a light source section of the optical scanning unit according to the second embodiment of the invention.

The light source 14 includes plural light-emitting portions. Preferably, each of the light-emitting portions includes VCSEL (Vertical Cavity Surface Emitting LASER), and arranged to structure a two-dimensional array 101, as illustrated in FIG. 17. In the present embodiment, a total of forty light-emitting portions is formed on a single substrate to structure the two-dimensional array 101. The two-dimensional array 101 includes ten columns of the light-emitting portions in which four light-emitting portions are arranged at even intervals along a direction having a tilt angle $\alpha$ relative to the Y-axis direction in a Y-Z plane, respectively. Here, the direction having the tilt angle $\alpha$ relative to the Y-axis direction in the Y-Z plane will be hereinafter simply referred to as a "D1 direction". In addition, the respective ten columns of the light-emitting portions are arranged at even intervals along a direction perpendicular to the D1 direction in the Y-Z plane. Here, the direction perpendicular to the D1 direction in the Y-Z plane will be hereinafter simply referred to as a "D2 direction". In other words, the forty light-emitting portions are arranged to be in a matrix configuration along the D1 direction and the D2 direction. In the present embodiment, an interval of the light-emitting portions refers to a center distance between the two light-emitting portions.

Each of the light-emitting portions preferably includes the VCSEL having a 780 nm band, and emits the light beam in the X-axis direction of FIG. 16.

Referring to FIG. 16, the coupling lens 15 is disposed on a side of an emitting surface of the light bean of the light source 14, and causes the light beam projected from the light source 14 to be in a substantially parallel light.

The branching optical element 23 is disposed between the coupling lens 15 and the cylindrical lens 17. The branching optical element 23 includes an unillustrated opening defining at least a beam diameter in the Z-axis direction of the light beam having passed through the coupling lens 15. The branching optical element 23 is disposed to have an inclination relative to a virtual plane perpendicular to a traveling direction of the light beam having passed through the coupling lens 15, in order to utilize the light beam reflected from a surrounding area of the opening as the light-amount detection light beam (a second light beam).

Accordingly, the branching optical element 23 separates the light beam projected from the light source 14 into the light beam for scanning (a first light beam) for the photoreceptor drum 1030 and the light-amount detection light beam (the second light beam) for detecting the light-amount of the light source.

The cylindrical lens 17 is disposed between the branching optical element 23 and the reflecting plate 18. The scanning light beam having passed through the opening of the branching optical element 23 then passes through the cylindrical lens 17, which is then reflected by the reflecting plate 18 to be imaged near deflecting and reflecting surfaces of the polygon mirror 13.

In the present embodiment, an optical system disposed on an optical path between the light source 14 and the polygon mirror 13 structures a coupling optical system. The coupling optical system according to the present preferred embodiment includes the coupling lens 15, the branching optical element 23, the cylindrical lens 17, and the reflecting plate 18.

The polygon mirror 13 preferably includes a square prism member having low height and formed with four planes of the deflecting and reflecting surfaces on side surfaces thereof. The polygon mirror 13 is rotated by an unillustrated rotating mechanism in a direction of an arrow illustrated in FIG. 16 at a constant angular velocity.

The fθ lens 11a is disposed between the polygon mirror 13 and the toroidal lens 11b. The fθ lens 11a has an image height proportional to an angle of incidence of the scanning light beam deflected from the polygon mirror 13, and causes the scanning light beam deflected by the polygon mirror 13 at the constant angular velocity to move at a constant velocity in the Y-axis direction as a main-scanning direction.

The toroidal lens 11b is disposed between the fθ lens 11a and the photoreceptor drum 1030.

In the present embodiment, an optical system disposed on an optical path between the polygon mirror 13 and the photoreceptor drum 1030 structures a scanning optical system. The scanning optical system according to the present preferred embodiment includes the fθ lens 11a and the toroidal lens 11b.

The scanning light beam deflected from the polygon mirror 13 is imaged by the scanning optical system, which is condensed or focused on the surface of the photoreceptor drum 1030 as an optical spot.

Accordingly, the optical spot moves on the surface of the photoreceptor drum 1030 in the Y-axis direction in accordance with the rotation of the polygon mirror 13. A direction of movement of the optical spot at this time, i.e., the Y-axis direction, corresponds to the main-scanning direction.

The imaging lens 24 condenses or focuses the light-amount detection light beam reflected from the branching optical element 23.

Figure 18:
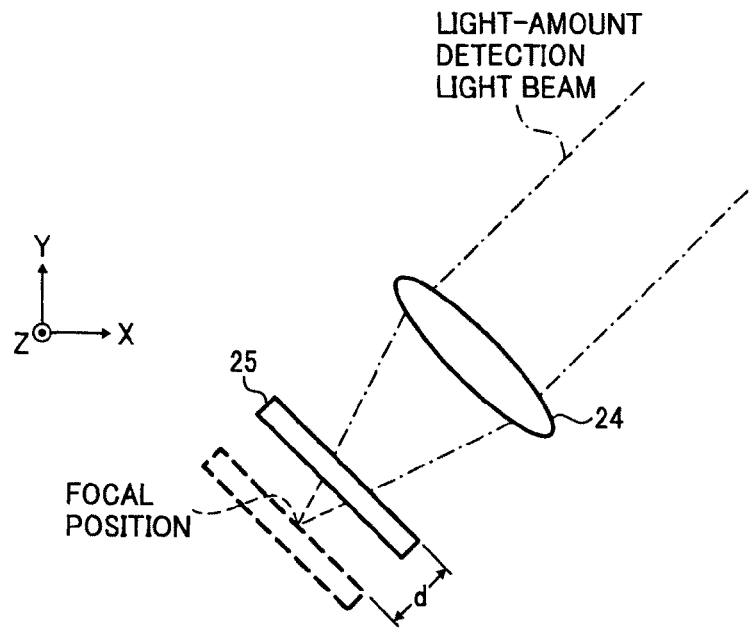
FIG. 18 is an explanatory view of a positional relationship between a light-receiving surface of a photodiode and an imaging lens in the optical scanning unit according to the second embodiment of the invention.

The photodiode 25 is so disposed that its light-receiving surface is positioned away, in a direction of an optical axis of the imaging lens 24, relative to a focal position of the light-amount detection light beam condensed or focused by the imaging lens 24. In other words, the light-receiving surface of the photodiode 25 is arranged to be either in front of or behind the focal position of the light-amount detection light beam. FIG. 18 illustrates an example in which the photodiode 25 is disposed such that the light-receiving surface thereof is located at a position away from and ahead of the focal position of the light-amount detection light beam at a distance d. The photodiode 25 outputs a signal (photoelectric conversion signal) corresponding to an amount of light received. Based on the output signal of the photodiode 25, driving current for each of the light-emitting portions is adjusted to control the light-amount of each of the light-emitting portions of the light source 14.

Figure 19:
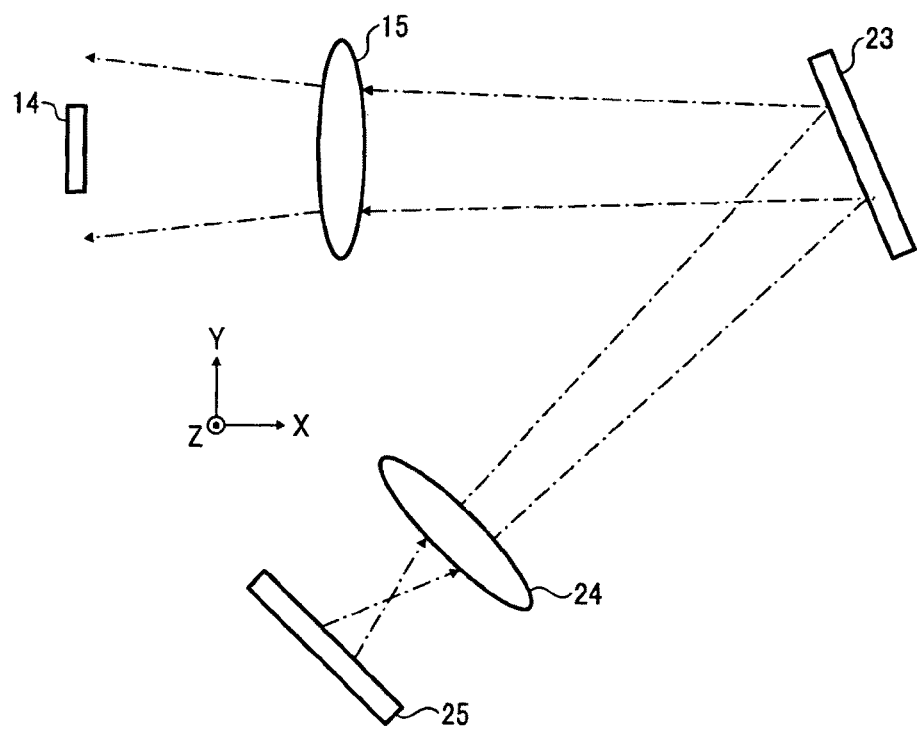
FIG. 19 is an explanatory view of an optical path of reflected light of a light-amount detection light beam in the optical scanning unit according to the second embodiment of the invention.
Figure 20:
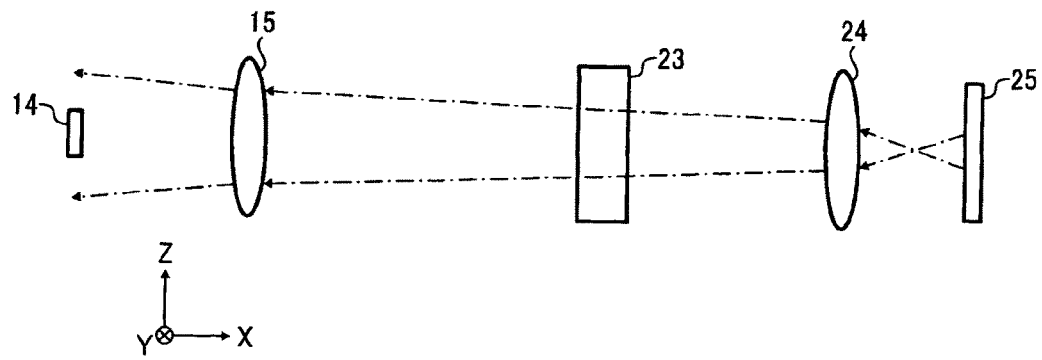
FIG. 20 is another explanatory view of the optical path of the reflected light of the light-amount detection light beam in the optical scanning unit according to the second embodiment of the invention.

For example, reflected light of the light-amount detection light beam reflected from the light-receiving surface of the photodiode 25 returns to the light source 14 as illustrated in FIGS. 19 and 20.

Since the light-receiving surface as a reflecting surface of the photodiode 25 is located, for example, forward of the focal position of the light-amount detection light beam, the reflected light of the light-amount detection light beam becomes divergent light and returns to the light source 14 as the divergent light. Therefore, intensity of the reflected light of the light-amount detection light beam becomes lower than that in a case where the light-receiving surface as the reflecting surface of the photodiode 25 is positioned at the focal position of the light-amount detection light beam. As a result, unstable laser oscillation, generation of noise, and decrease in a laser output will not be incurred in the light-emitting portions of the light source 14 even when the reflected light of the light-amount detection light beam enters the light source 14.

Figure 21:
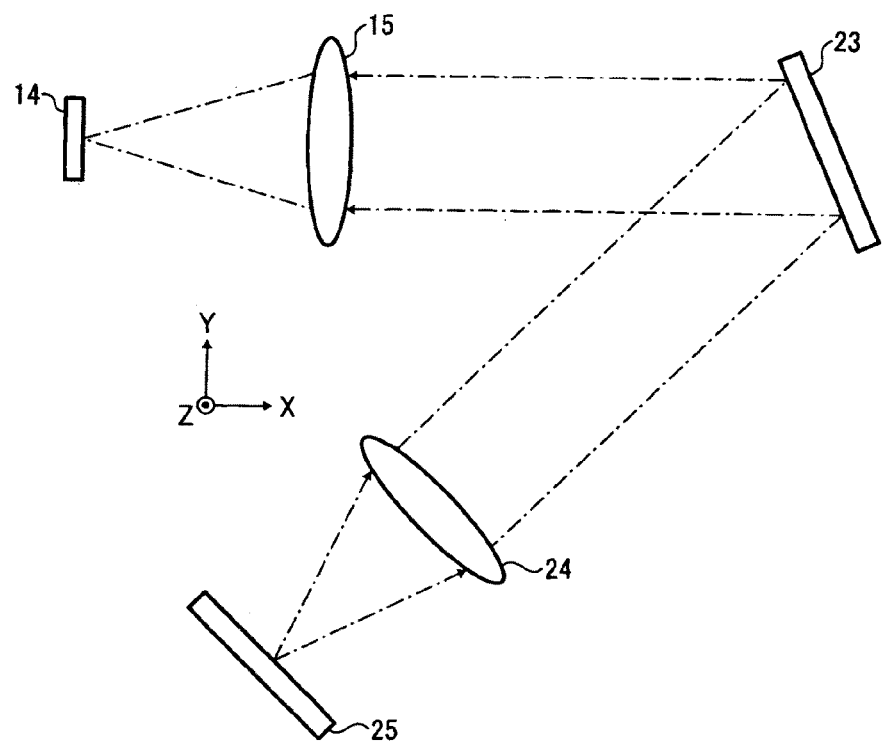
FIG. 21 is an explanatory view of an optical path of reflected light of a light-amount detection light beam in a conventional optical scanning unit.
Figure 22:
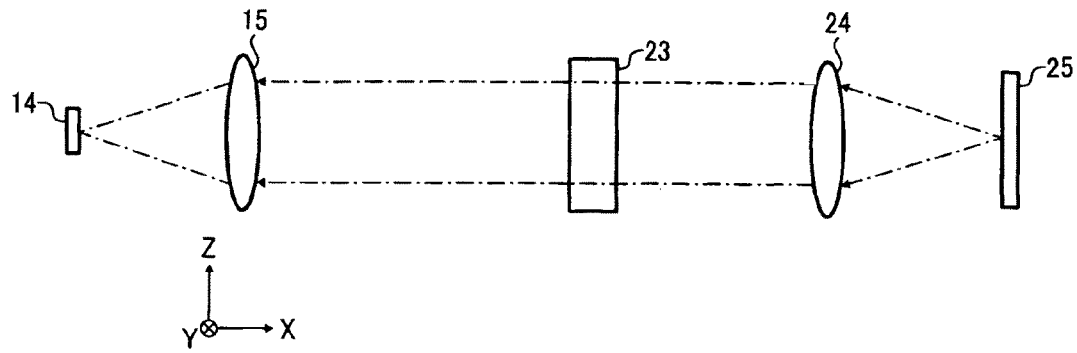
FIG. 22 is another explanatory view of the optical path of the reflected light of the light-amount detection light beam in the conventional optical scanning unit.

FIGS. 21 and 22 each illustrates an optical path of the reflected light of the light-amount detection light beam in a case in which the light-receiving surface of the photodiode 25 as the reflecting surface is located at the focal position of the light-amount detection light beam. In this case, the reflected light of the light-amount detection light beam is condensed on a position of the light source 14. Thus, the unstable laser oscillation, the generation of the noise, and the decrease in the laser output are incurred in the light-emitting portions of the light source 14.

It is to be noted that, in FIGS. 20 and 22, the optical path of the reflected light of the light-amount detection light beam is illustrated linearly, for easier understanding of the optical path of the reflected light.

Figure 23:
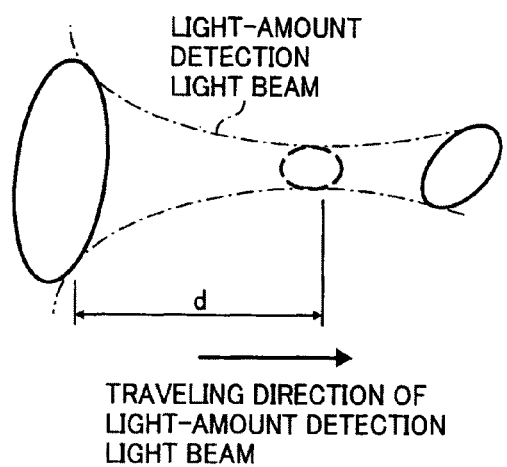
FIG. 23 is an explanatory view of a light-condensing state of the light-amount detection light beam in the optical scanning unit according to the second embodiment of the invention.

Here, the focal position in which a principal ray being a central axis and in which a beam waist is narrowed of the light-amount detection light beam becomes different in position in the Y-axis direction corresponding to the main-scanning direction and in the Z-axis direction corresponding to a sub-scanning direction in FIG. 17. Accordingly, an area of irradiation of the light-amount detection light beam in a certain point forward of the focal position in the Y-axis direction of the light-amount detection light beam, and an area of irradiation of the light-amount detection light beam in a certain point forward of the focal position in the Z-axis direction of the light-amount detection light beam, are different. Similarly, an area of irradiation of the light-amount detection light beam in a certain point rearward of the focal position in the Y-axis direction of the light-amount detection light beam, and an area of irradiation of the light-amount detection light beam in a certain point rearward of the focal position in the Z-axis direction of the light-amount detection light beam, are different, as illustrated in FIG. 23. Hence, the distance d between the light-receiving surface of the photodiode 25 and the focal position is appropriately set according to those irradiation areas of the light-amount detection light beam which influences the light source 14.

In the optical scanning unit 1100 according to present embodiment, the branching optical element 23, the imaging lens 24, and the photodiode 25 structure the light-amount detecting device.

For example, the light-amount of the light-emitting portion may be adjusted by a method which lights the respective light-emitting portions subsequently, detects the light-amounts of the respective light-emitting portions individually, and adjusts the light-amount of each of the light-emitting portions based on a result of the detection of the individual light-amount. Alternatively, the light-amount of the light-emitting portion may be adjusted, for example, by a method which defines at least two light-emitting portions as a set, lights each of the plural sets of the light-emitting portions subsequently, detects the light-amount of each of the sets of the light-emitting portions, and adjusts the light-amount of each of the light-emitting portions based on a result of the detection thereof.

Therefore, according to the present embodiment of the present invention, it is possible to adjust the light-amount of the plural light-emitting portions individually by using the single light-amount detecting portion. Hence, simplification of optical systems and reduction in the number of components are possible. As a result, it is possible to realize cost-reduction and miniaturization of a device.

In addition, in a case in which a plurality of light-amount detecting portions is used, variations in the detection of the light-amount are generated due to individual variability of the photodiode of each of the light-amount detecting portions. However, since the present embodiment uses the single light-amount detecting portion, the detection of the light-amount of the light beam emitted from the light source is possible with high accuracy.

In the optical scanning unit 1100 according to the present embodiment, the light source 14, the coupling lens 15 and the light-amount detecting device structure a light source device.

As described in the foregoing, therefore, the optical scanning unit 1100 according to the present embodiment separates the light beam emitted from the light source 14 into the scanning light beam and the light-amount detection light beam with the branching optical element 23, and condenses or focuses the light-amount detection light beam reflected to be separated by the branching optical element 23 near the light-receiving surface of the photodiode 25 with the imaging lens 24. Here, the photodiode 25 is so disposed that the light-receiving surface thereof is positioned away relative to the focal position of the light-amount detection light beam condensed or focused by the imaging lens 24 in the optical axis direction of the imaging lens 24.

Therefore, the reflected light of the light-amount detection light beam returning to a side of the light source 14 becomes the divergent light, whereby the beam diameter is enlarged and intensity of the light per unit area is decreased. Hence, since the intensity of the light is low, the unstable laser oscillation, the generation of the noise, and the decrease in the laser output will not be incurred in the light-emitting portions of the light source 14 even when the reflected light of the light-amount detection light beam enters the light source 14.

Thus, stable laser oscillation is performed in the respective light-emitting portions of the light source 14. Therefore, it is possible for the light source 14 to output the plural light beams in a stable manner. Consequently, the optical scanning unit 1100 is possible to perform optical scanning of the photoreceptor drum 1030 with high accuracy without incurring rise in costs.

In addition, according to the optical scanning unit 1100 of the present embodiment, the light source 14 includes the two-dimensional array 101. Therefore, it is possible to realize a high-density in writing density.

Moreover, in the optical scanning unit 1100 according to the present embodiment, a loss in the laser oscillation in the two-dimensional array 101 is reduced, which leads to energy conservation. Therefore, reduction of environmental burdens is possible.

In addition, the printer 1001 according to the present embodiment is provided with the optical scanning unit 1100 capable of performing the optical scanning of the photoreceptor drum 1030 with high accuracy without incurring rise in costs. Therefore, it is possible to form an image of high quality without incurring rise in costs.

In addition, in the printer 1001 according to the present embodiment, the light source 14 includes the two-dimensional array 101. Therefore, it is possible to attain speed-up of the writing speed.

Figure 24:
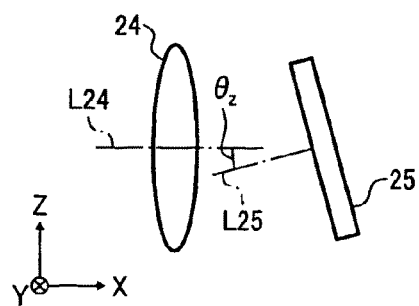
FIG. 24 is an explanatory view of another positional relationship between the light-receiving surface of the photodiode and the imaging lens in the optical scanning unit according to the second embodiment of the invention.
Figure 25:
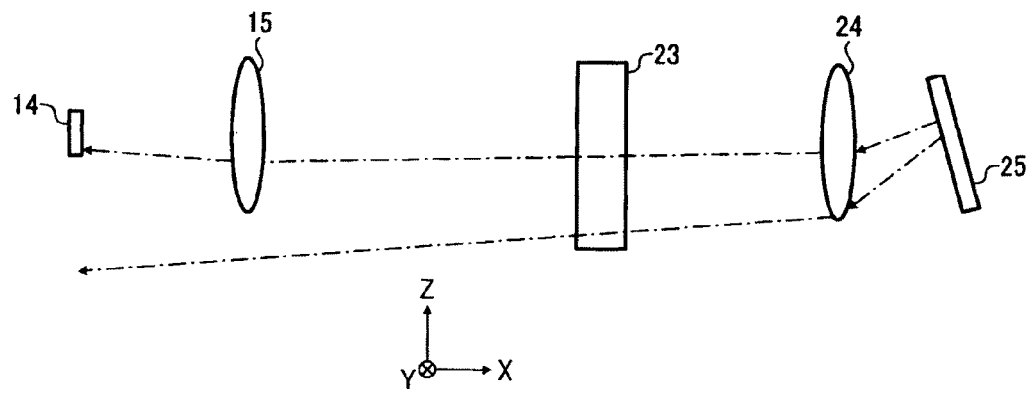
FIG. 25 is an explanatory view of another optical path of the reflected light of the light-amount detection light beam in the optical scanning unit according to the second embodiment of the invention.

Referring to FIG. 24, according to the present embodiment, a normal L25 of the light-receiving surface of the photodiode 25 in the light-receiving position of the light-amount detection light beam may be inclined at an angle $\theta z$ relative to an optical axis L24 of the imaging lens 24 in the XZ plane, for example. In this example, with reference to FIG. 25, the reflected light of the light-amount detection light beam travels in an optical path shifted to be nearer to a minus Z (−Z) side than that of the reflected light of the light-amount detection light beam in a case when $\theta z=0$ is established, and reaches the minus Z (−Z) side of the light source 14 with states in which the light source 14 is evaded and in which the light intensity is weakened by the diffusion. Therefore, it is possible to ensure blocking of the incidence of the reflected light of the light-amount detection light beam on the light source 14, and thereby to perform the stable laser oscillation in the respective light-emitting portions.

Figure 26:
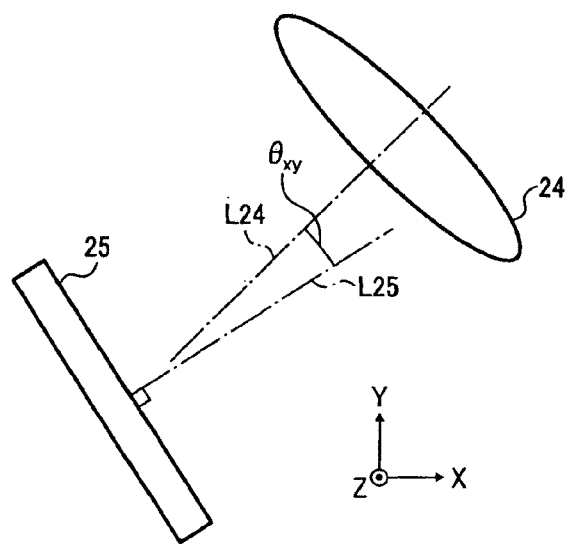
FIG. 26 is an explanatory view of yet another positional relationship between the light-receiving surface of the photodiode and the imaging lens in the optical scanning unit according to the second embodiment of the invention.

In addition, referring to FIG. 26, the normal L25 of the light-receiving surface of the photodiode 25 in the light-receiving position of the light-amount detection light beam may be inclined at an angle $\theta xy$ relative to the optical axis L24 of the imaging lens 24 in the XY plane, for example. In this example, with reference to FIG. 27, the reflected light of the light-amount detection light beam travels in an optical path shifted to be nearer to a minus Y (−Y) side than that of the reflected light of the light-amount detection light beam in a case when $\theta xy=0$ is established, and reaches the minus Y (−Y) side of the light source 14 with states in which the light source 14 is evaded and in which the light intensity is weakened by the diffusion. Therefore, it is possible to ensure the blocking of the incidence of the reflected light of the light-amount detection light beam on the light source 14, and thereby to perform the stable laser oscillation in the respective light-emitting portions.

Figure 27:
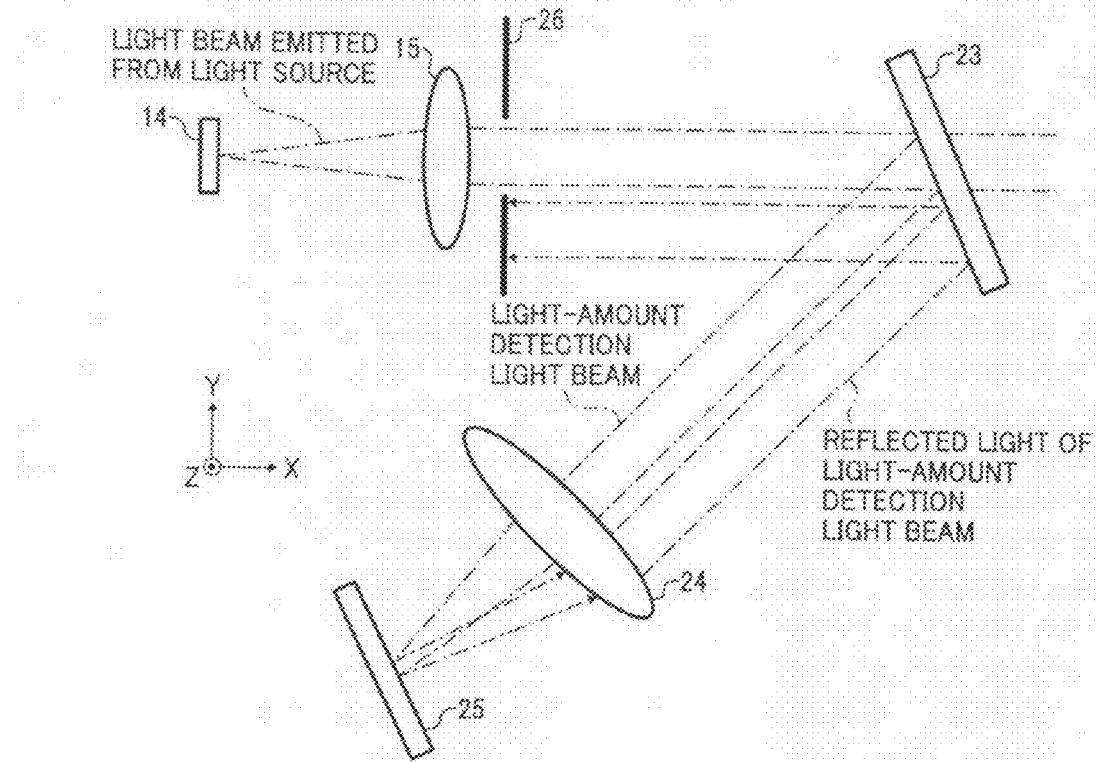
FIG. 27 is an explanatory view of yet another optical path of the reflected light of the light-amount detection light beam in the optical scanning unit according to the second embodiment of the invention.
Figure 28:
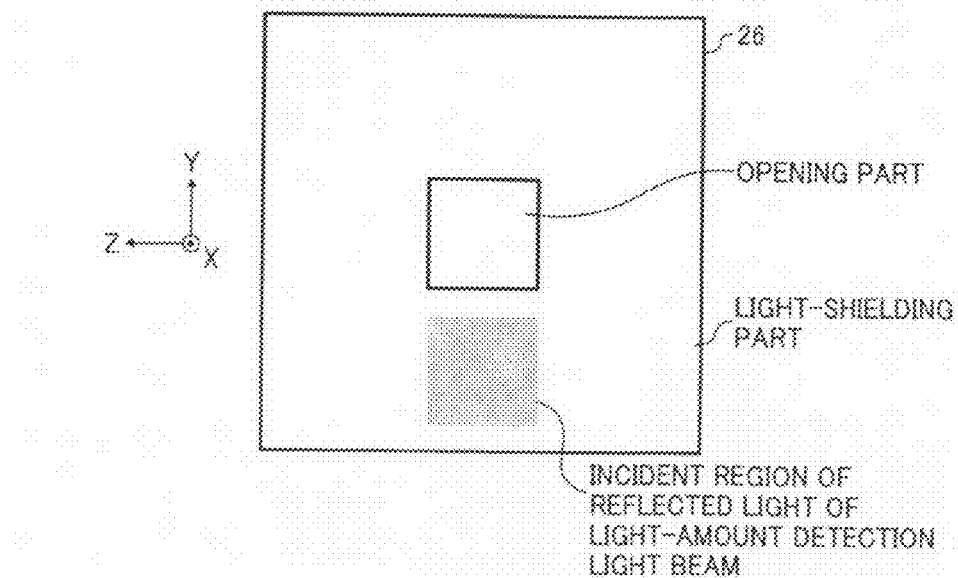
FIG. 28 is an explanatory view of an incident region of the reflected light of the light-amount detection light beam in a light-shielding plate, in the optical scanning unit according to the second embodiment of the invention.

Furthermore, for example, a light-shielding plate (light-shielding board) 26 may be disposed between the coupling lens 15 and the branching optical element 23 as illustrated in FIG. 27. The light-shielding plate 26 includes in the center thereof an opening part having a size through which the light beam traveling from the coupling lens 15 to the branching optical element 23 is possible to pass, and a light-shielding part as a surrounding area of the opening part. Referring to FIG. 28, when the light-shielding plate 26 is disposed, the reflected light of the light-amount detection light beam is incident on the light-shielding part on the minus Y side of the opening part in the light-shielding plate 26. Therefore, it is possible to prevent the reflected light of the light-amount detection light beam, via the branching optical element 23, from entering the coupling lens 15 by the light-shielding part of the light-shielding plate 26.

Figure 29:
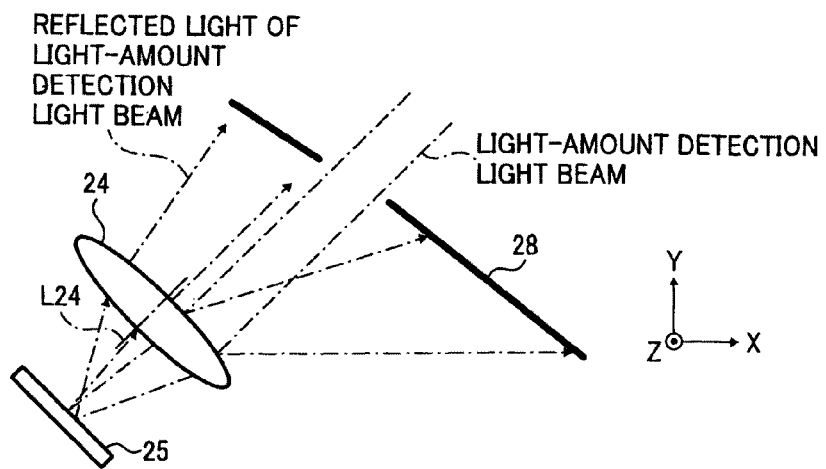
FIG. 29 is an explanatory view of an optical path of the reflected light of the light-amount detection light beam in a case in which the light-amount detection light beam enters a position shifted from an optical axis of the imaging lens, in the optical scanning unit according to the second embodiment of the invention.

Referring to FIG. 29, according to the present embodiment, the imaging lens 24 may be so arranged that the light-amount detection light beam enters a position of the imaging lens 24 shifted from an optical axis L24 of the imaging lens 24. In this example, the direction of the normal of the light-receiving surface of the photodiode 25 in the light-receiving position of the light-amount detection light beam is inclined relative to all the incident directions of the light-amount detecting light beam entering the photodiode 25, when the light-receiving surface of the photodiode 25 is arranged perpendicular to the optical axis L24 of the imaging lens 24. Thus, the reflected light of the light-amount detection light beam is projected from the imaging lens 24 in a direction different from the direction that travels to the branching optical element 23.

In this example, a light-shielding plate (light-shielding board) 28 may be provided between the imaging lens 24 and the branching optical element 23, so as to avoid the reflected light of the light-amount detection light beam to enter, for example, the light source 14, the polygon mirror 13, the scanning optical system, and the photoreceptor drum 1030.

Figure 30:
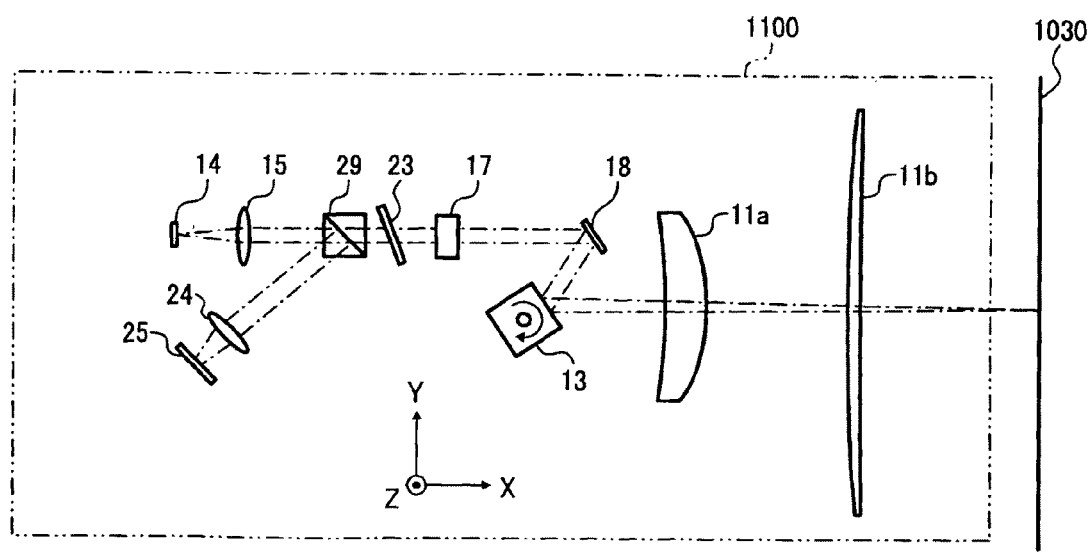
FIG. 30 is a plan view schematically illustrating a structure when light emitted from a light source is to be separated into a scanning light beam and the light-amount detection light beam by using a half-mirror, in the optical scanning unit according to the second embodiment of the invention.

According to the present embodiment, the light-amount detection light beam is provided based on the light beam reflected by the branching optical element 23. Alternatively, optical elements for separating the light beam emitted from the light source 14 into the scanning light beam and the light-amount detection light beam may be separately provided. Referring to FIG. 30, a half-mirror 29 may be disposed between the coupling lens 15 and the cylindrical lens 17, and the light beam reflected by the half-mirror 29 may be provided as the light-amount detection light beam.

According to the present embodiment, a two-dimensional array, in which an interval between the two light-emitting portions located at both ends in the Y-axis direction is set to be smaller than an interval between the two light-emitting portions located at both ends in the Z-axis direction, may be used, instead of the two-dimensional array 101.

In addition, according to the present embodiment, the light-emitting portions of the light source 14 may employ a structure in which plural edge-emitting type lasers are combined, in place of the two-dimensional array 101. Alternatively, one-dimensional array of the edge-emitting type lasers may be used for the light-emitting portions, in place of the two-dimensional array 101.

Furthermore, the light source 14 of the present embodiment includes the forty light-emitting portions. However, the number of the light-emitting portions is not limited thereto. For example, the light source 14 may includes a single light-emitting portion.

Moreover, the present embodiment has been described based on the printer 1001 as the image forming apparatus. However, the image forming apparatus is not limited thereto. It is possible for any image forming apparatus provided with the optical scanning unit 1100 according to the present embodiment to form the high-quality image at high-speed.

For example, the image forming apparatus may also be an image forming apparatus, which includes the optical scanning unit 1100 according to the present embodiment, and which directly irradiates laser light onto a medium, such as a photosensitive paper, that develops a color by the laser light.

In addition, the image forming apparatus may also be an image forming apparatus in which a silver-halide film is used as an image carrying body. In this example, a latent image is formed on the silver-halide film by the optical scanning. The thus-formed latent image can be visualized with a process equivalent to a development process in normal silver-halide film processes, which can then be transcribed on a photographic paper with a process equivalent to a printing process in the normal silver-halide film processes. Such an image forming apparatus can be used as an optical plate-making device, a photo-lithographing device which draws an image of a computed-tomography scan, or the like.

The image forming apparatus may also be an image forming apparatus which forms a multi-colored image. In this example, formation of the colored image of high-quality is possible at high-speed by using the optical scanning unit corresponding to the colored image.

Figure 31:
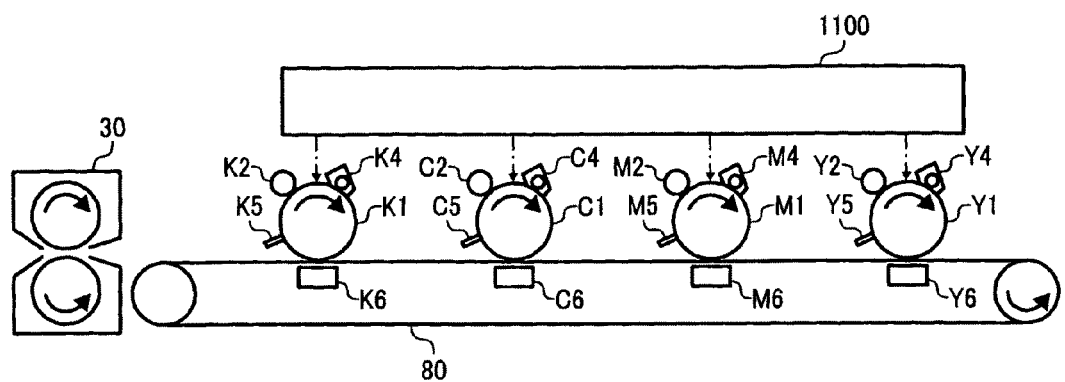
FIG. 31 is a side view schematically illustrating a structure of a tandem color machine utilizing the optical scanning unit according to the second embodiment of the invention.

Referring to FIG. 31, for example, the image forming apparatus may be a tandem color machine which corresponds to the colored image and provided with the optical scanning unit according to the present embodiment and the plural photoreceptor drums. Here, since the tandem color machine illustrated in FIG. 31 is the one in which the optical scanning unit 1010A of the tandem color machine illustrated in FIG. 14 is replaced with the optical scanning unit 1100 according to the present embodiment and thus other structure is the same or equivalent thereto, the description thereon will not be provided in detail.

In the tandem color machine, alternatively, an optical scanning unit for black, an optical scanning unit for cyan, an optical scanning unit for magenta, and an optical scanning unit for yellow may be provided, in place of the single optical scanning unit 1100 described above. In this example, the optical scanning units for the respective colors include the light-amount detecting devices for detecting the light-amounts of the light beams emitted from the light sources, respectively.

Third Embodiment

FIGS. 32 to 40 illustrate a third embodiment of the present invention. The third embodiment of the invention is mainly directed to an optical scanning unit and to an image forming apparatus provided with the optical scanning unit. The optical scanning unit and the image forming apparatus, for example, solve a problem that a light-emitting portion (or light-emitting devices) is lit constantly while the image forming apparatus is in operation, and thus deterioration in the light-emitting portion is occurred dues to heat generation of the light-emitting portion.

Figure 32:
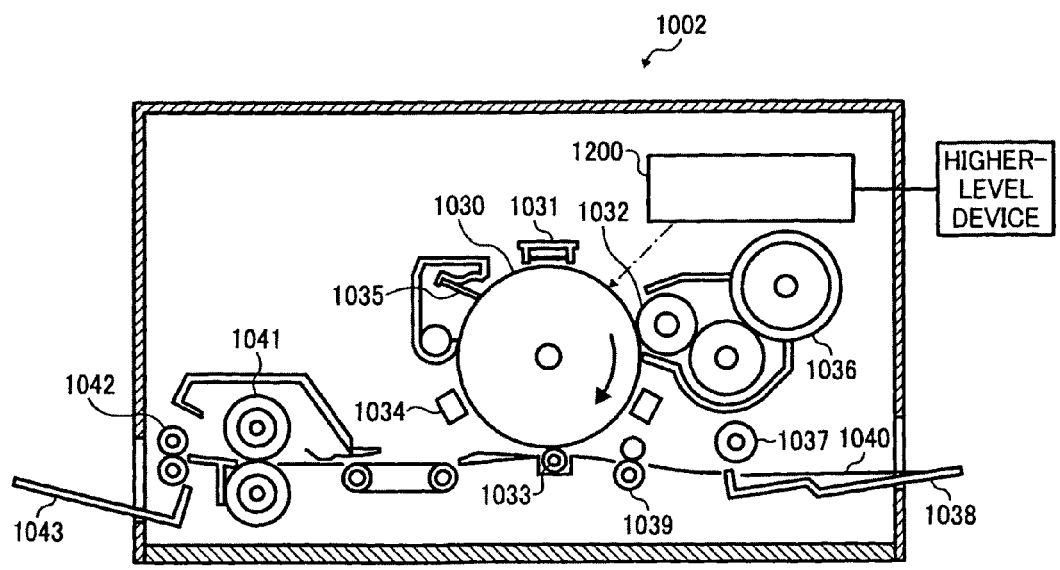
FIG. 32 is a side view schematically illustrating a structure of an image forming apparatus provided with an optical scanning unit according to a third embodiment of the invention.

FIG. 32 schematically illustrates a structure of a printer 1002 as the image forming apparatus provided with the optical scanning unit according to the third embodiment of the invention. The printer 1002 has a similar structure in which the optical scanning unit 1010 of the above-described printer 1000 is replaced with an optical scanning unit 1200 according to the present third embodiment. Since other parts of the structure of the optical scanning unit 1200 and the printer 1002 according to the present embodiment are the same or equivalent to the optical scanning unit 1010 and the printer 1000, description on the optical scanning unit 1200 will be hereinafter made, and description on the other parts will not be made in detail.

Figure 33:
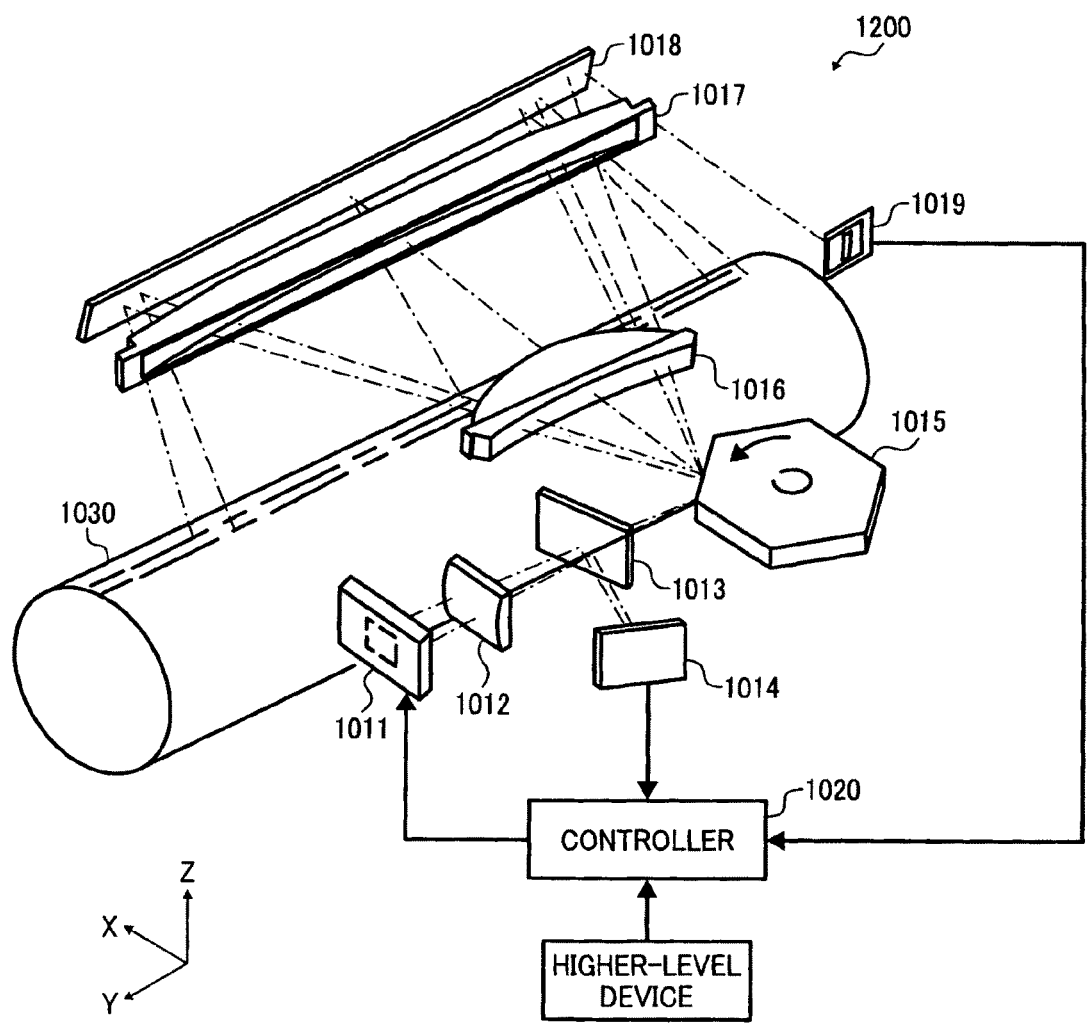
FIG. 33 schematically illustrates a structure of the optical scanning unit according to the third embodiment of the invention.

FIG. 33 schematically illustrates the structure of the optical scanning unit 1200 according to the third embodiment of the invention. Referring to FIG. 33, the optical scanning unit 1200 including, for example, a light source section 1011, a cylindrical lens 1012, a half-mirror 1013, a light-receiving element 1014, a polygon mirror 1015, an fθ lens 1016, a toroidal lens 1017, a bending mirror 1018, a synchronization sensor 1019, and a controller 1020 which collectively controls each part of the optical scanning unit 1200, is illustrated.

The light source section 1011 includes a light source LA, a light-emitting portion driving circuit 400, and an unillustrated coupling lens CL. The light source LA includes plural light-emitting portions. The light-emitting portion driving circuit 400 drives the light-emitting portions of the light source LA (see FIG. 36). Preferably, each of the light-emitting portions includes VCSEL (Vertical Cavity Surface Emitting LASER), and arranged to structure a two-dimensional array, in which a total of thirty-two light-emitting portions is formed on a single substrate, as illustrated in FIG. 34.

Figure 34:
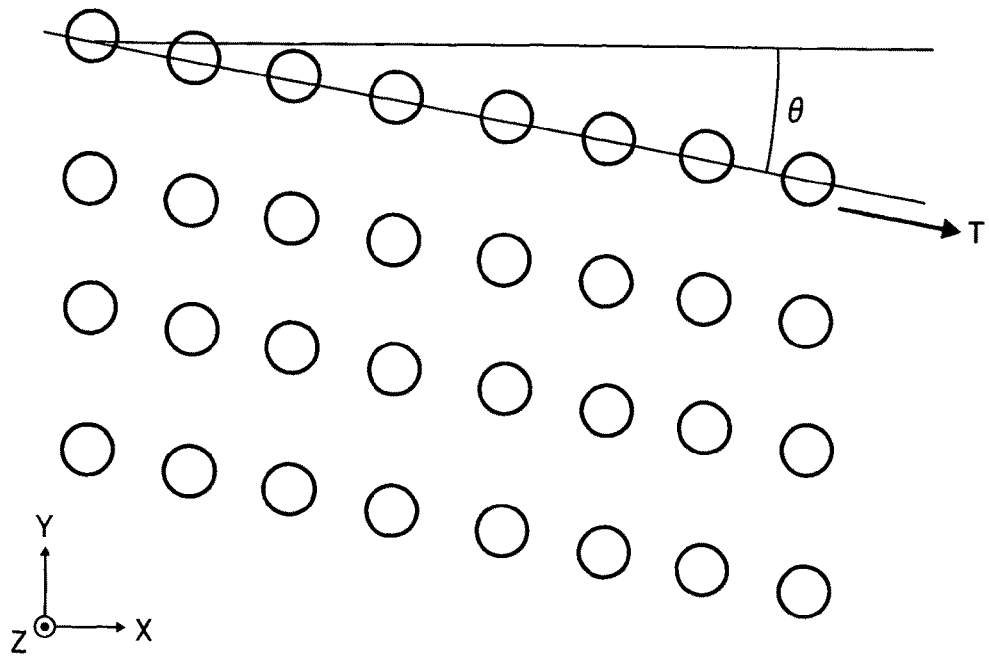
FIG. 34 is an explanatory view of an arrangement of light-emitting portions in a light source section of the optical scanning unit according to the third embodiment of the invention.

Referring to FIG. 34, the two-dimensional array includes four columns of the light-emitting portions in which eight light-emitting portions are arranged at even intervals along a direction inclined downward at an angle θ relative to a plus X (+X) direction. Here, the direction inclined downward (i.e., inclined in a minus Z (−Z) direction) at the angle θ relative to the plus X (+X) direction will be hereinafter simply referred to as a "T-direction". In addition, the respective four columns of the light-emitting portions are arranged at even intervals along a Z-axis direction. In other words, the thirty-two light-emitting portions are arranged two-dimensionally along the T-direction and the Z-axis direction. In the present embodiment, the light-emitting portions may be referred to as a first light-emitting portion column, a second light-emitting portion column, a third light-emitting portion column, and a fourth light-emitting portion column, from top to bottom of FIG. 34. In addition, in the present embodiment, an interval of the light-emitting portions refers to a center distance between the two light-emitting portions.

Figure 35:
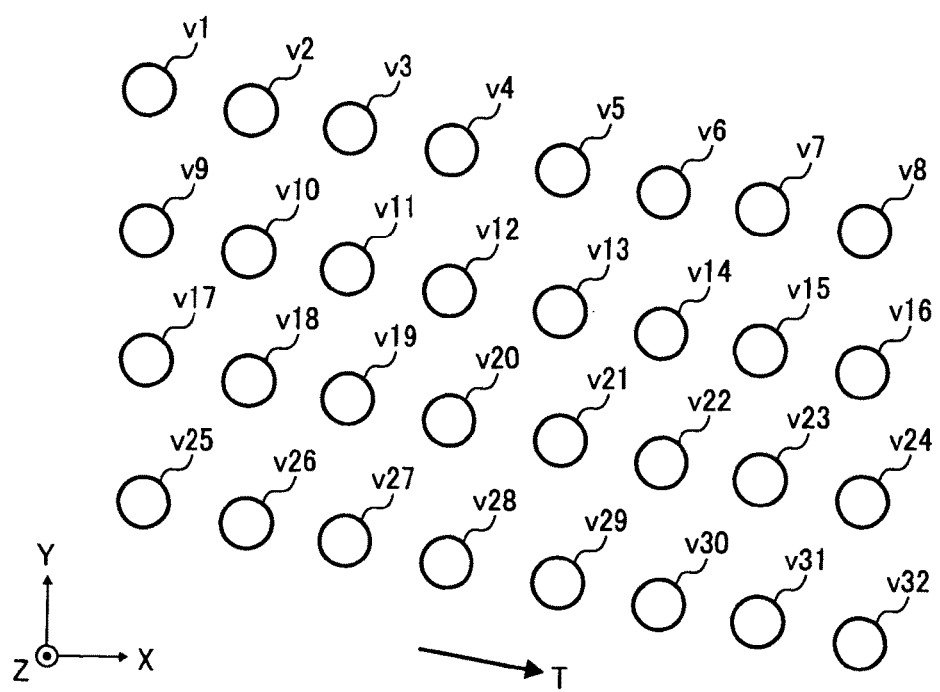
FIG. 35 is another explanatory view of an arrangement of the light-emitting portions in the light source section of the optical scanning unit according to the third embodiment of the invention.

Referring to FIG. 35, for the sake of convenience of explanation for specifying the light-emitting portions, the eight light-emitting portions structuring the first light-emitting portion column may be referred to as v1-v8, the eight light-emitting portions structuring the second light-emitting portion column may be referred to as v9-v16, the eight light-emitting portions structuring the third light-emitting portion column may be referred to as v17-v24, and the eight light-emitting portions structuring the fourth light-emitting portion column may be referred to as v25-v32, from top left to bottom right of FIG. 35.

Figure 36:
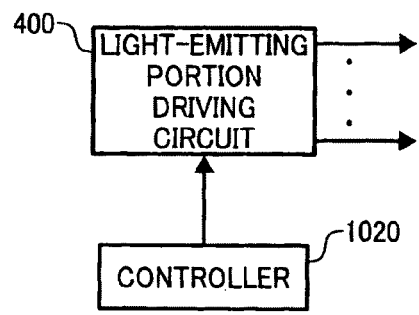
FIG. 36 is an explanatory view of a light-emitting portion driving circuit provided in the light source section of the optical scanning unit according to the third embodiment of the invention.

Referring to FIG. 36, the light-emitting portion driving circuit 400 individually drives the thirty-two light-emitting portions on the basis of various sets of driving information supplied from the controller 1020.

The coupling lens CL causes a light beam projected from the light source LA to be in a substantially parallel light. Thus, the substantially parallel light is outputted from the light source section 1011.

Referring to FIG. 33, the cylindrical lens 1012 condenses, in a sub-scanning direction, the light beam emitted from the light source section 1011 near deflecting surfaces of the polygon mirror 1015.

The half-mirror 1013 is disposed on an optical path between the cylindrical lens 1012 and the polygon mirror 1015, and reflects a part of the light beam having passed through the cylindrical lens 1012. In the present embodiment, transmission light which transmits the half-mirror 1013 corresponds to the light beam for scanning (a first light beam), and reflection light reflected by the half-mirror 1013 corresponds to the light-amount detection light beam (the second light beam). For example, it is preferable that a ratio of the light amount of the transmission light to the reflection light in the half-mirror 1013 be set one of 9:1, 8:2, and 7:3, although it is not limited thereto.

The polygon mirror 1015 preferably includes a hexagonal prism member having low height, and formed with sixth planes of the deflecting and reflecting surfaces on side surfaces thereof. The polygon mirror 1015 is rotated by an unillustrated rotating mechanism in a direction of an arrow illustrated in FIG. 33 at a constant angular velocity. Thus, the scanning light beam, emitted from the light source section 1011 and condensed near the deflecting and reflecting surfaces of the polygon mirror 1015 by the cylindrical lens 1012, is deflected by the rotation of the polygon mirror 1015 at the constant angular velocity.

The fθ lens 1016 has an image height proportional to an angle of incidence of the scanning light beam deflected from the polygon mirror 1015, and causes the scanning light beam deflected by the polygon mirror 1015 at the constant angular velocity to move at a constant velocity in a main-scanning direction.

The scanning light beam having passed through the fθ lens 1016 is imaged on a surface of a photoreceptor drum 1030 through the toroidal lens 1017 and the bending mirror 1018.

Figure 37:
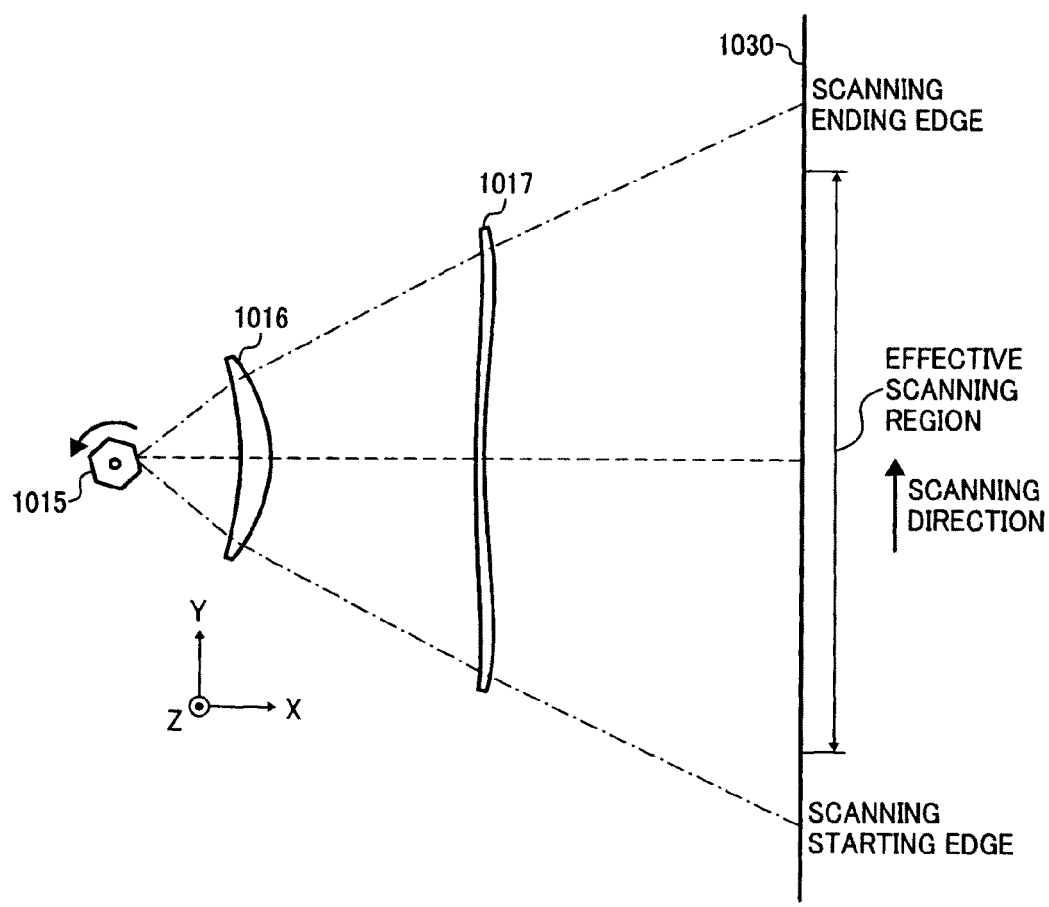
FIG. 37 is an explanatory view of a scanning starting edge and a scanning ending edge of a scanning light beam in the optical scanning unit according to the third embodiment of the invention.

Referring to FIG. 37, for example, the scanning light beam which is imaged on the surface of the photoreceptor drum 1030 is moved from a scanning starting edge to a scanning ending edge, in accordance with the rotation of the polygon mirror 1015. Here, an effective scanning region of the scanning light beam is an area in which writing is performed according to image data. The scanning light beam returns to the scanning starting edge for the subsequent scanning, when the scanning light beam reaches the scanning ending edge.

The synchronization sensor 1019 has a positional relationship equivalent to an image depicted by the scanning light beam, and is disposed in a position on which the scanning light beam, which is reflected by the bending mirror 1018 and before the scanning is started, is incident. The synchronization sensor 1019 outputs a signal (photoelectric conversion signal) corresponding to an amount of light received. Thus, start of the scanning in the photoreceptor drum 1030 is detectable from the signal outputted from the synchronization sensor 1019.

The light-receiving element 1014 is disposed on an optical path of the light-amount detection light beam reflected by the half-mirror 1013, and outputs a signal (photoelectric conversion signal) corresponding to an amount of light received.

Figure 38:
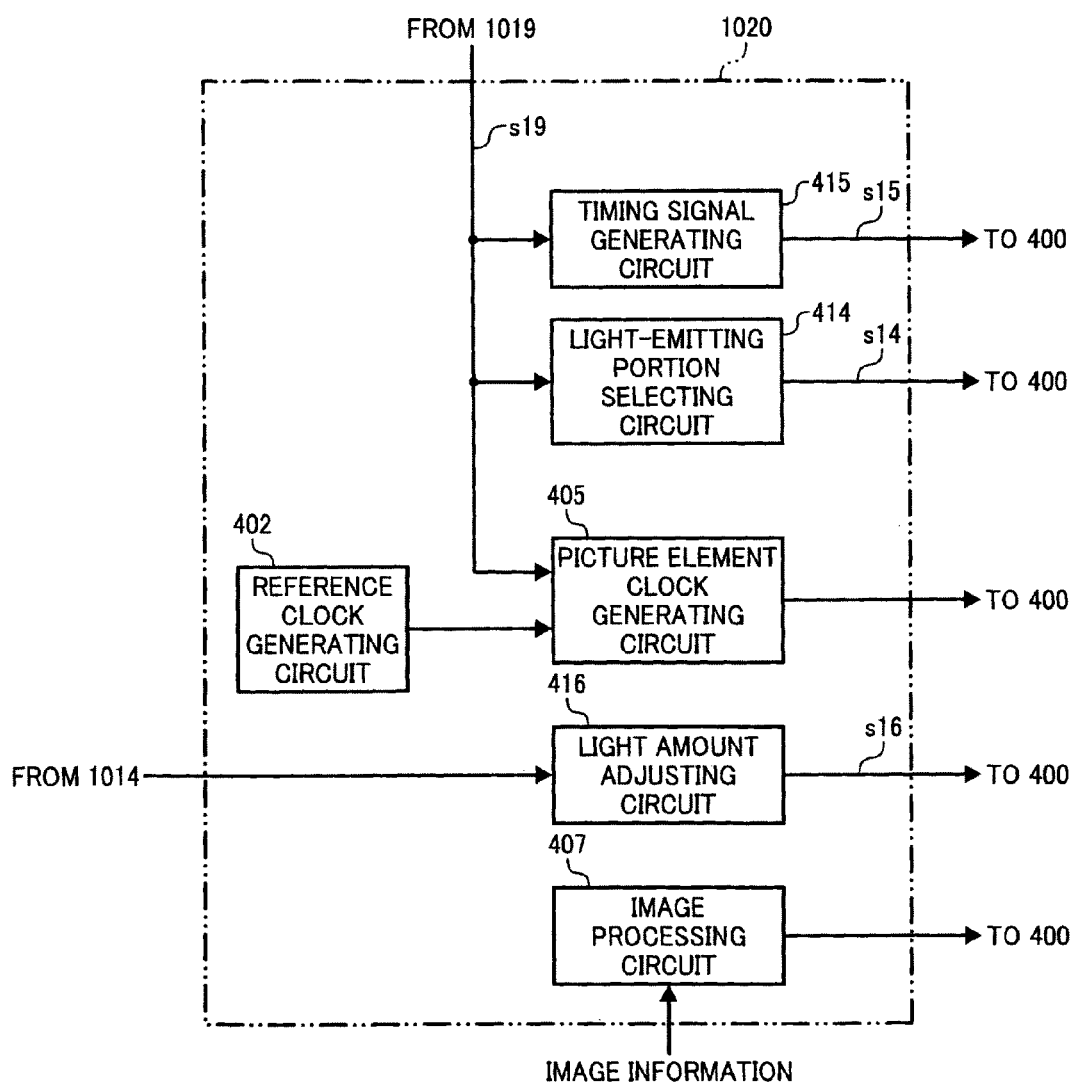
FIG. 38 is a block diagram of a controller of the optical scanning unit according to the third embodiment of the invention.

Referring to FIG. 38, the controller 1020 includes, for example, a reference clock generating circuit 402, a picture element clock generating circuit 405, an image processing circuit 407, a light-emitting portion selecting circuit 414, a timing signal generating circuit 415, and a light-amount adjusting circuit 416. Note that arrows illustrated in FIG. 38 represent flows of typical signals and information, and do not represent all relations of connection of each block.

Figure 39:
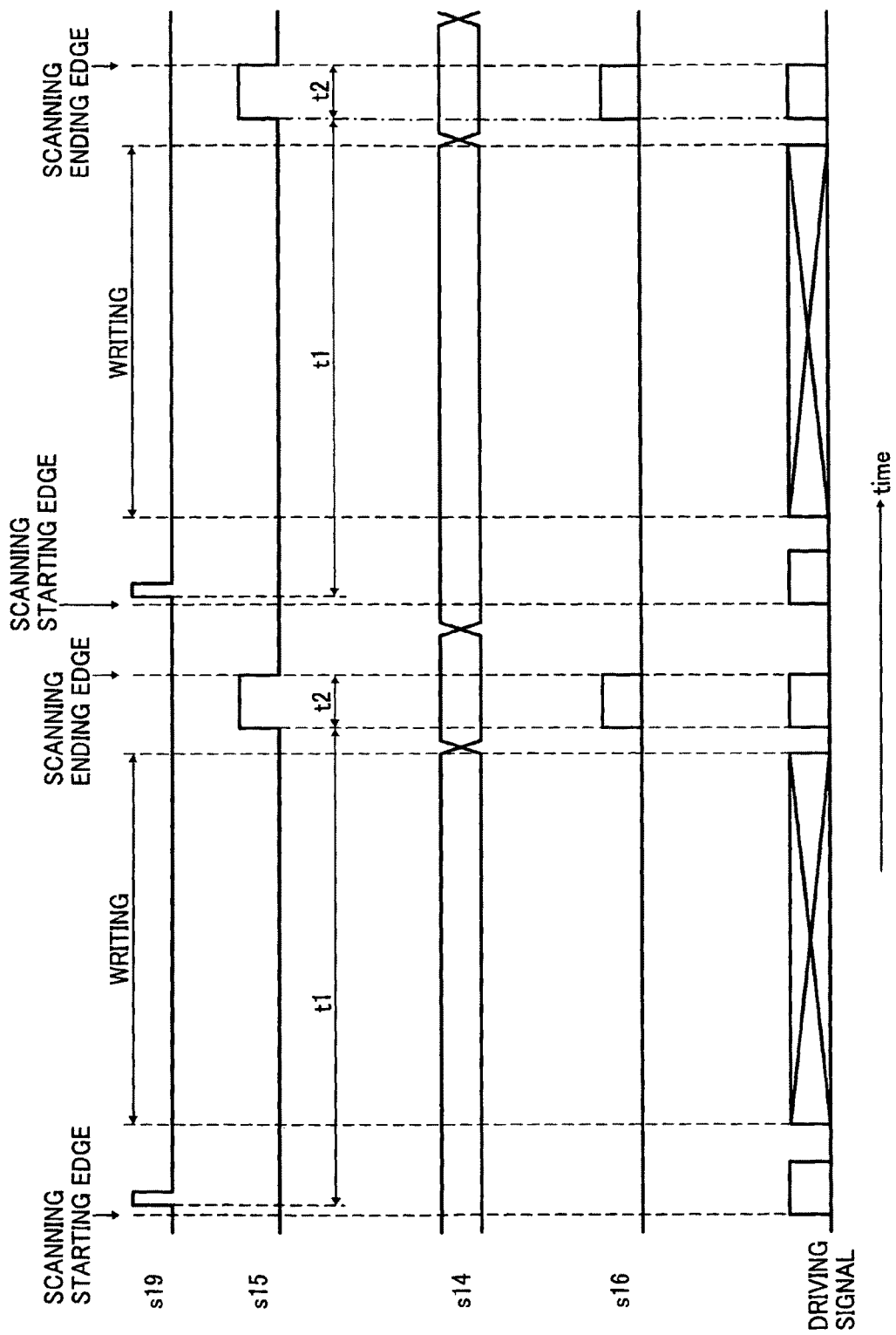
FIG. 39 is a timing chart of the controller of the optical scanning unit according to the third embodiment of the invention.

FIG. 39 illustrates a timing chart relating to each circuit illustrated in FIG. 38. Referring to FIG. 39, s19 denotes an output signal of the synchronization sensor 1019, s15 denotes an output signal of the timing signal generating circuit 415, s14 denotes an output signal of the light-emitting portion selecting circuit 414, and s16 denotes an output signal of the light-amount adjusting circuit 416.

The image processing circuit 407 generates writing data for each light-emitting portion based on image information supplied from a higher-level device. The writing data is supplied to the light-emitting portion driving circuit 400 as one of sets of driving information, at a predetermined timing.

The reference clock generating circuit 402 generates a high-frequency clock signal used as a reference.

The picture element clock generating circuit 405 generates a picture element clock signal on the basis of the output signal s19 of the synchronization sensor 1019 and the high-frequency clock signal of the reference clock generating circuit 402. The thus-generated picture element clock signal is supplied to the light-emitting portion driving circuit 400 as one of the sets of driving information.

The timing signal generating circuit 415 changes the output signal s15 from a low level to a high level, when a previously-set time t1 is elapsed from a rising edge of the output signal s19 of the synchronization sensor 1019. Then, when a previously-set time t2 is elapsed from the changing of the output signal s15 from the low level to the high level, the timing signal generating circuit 415 changes the output signal s15 from the high level to the low level. The output signal of the timing signal generating circuit 415 is supplied to the light-emitting portion driving circuit 400 as one of the sets of driving information.

The time t1 corresponds to the time from a time point in which the scanning of the scanning light beam is started to a time point in which writing by the scanning light beam, modulated according to the image information, is finished and the output of the light-emitting portion selecting circuit 414 becomes stable. In addition, the time t2 corresponds to the time in which the scanning light beam reaches the scanning ending edge after the time t1 has elapsed.

The light-emitting portion selecting circuit 414 selects the light-emitting portion on the basis of the writing data for each light-emitting portion, immediately before the writing is performed and during when the writing is performed. Then, the light-emitting portion selecting circuit 414 outputs a signal specifying the selected light-emitting portion.

In addition, the light-emitting portion selecting circuit 414 selects one of the thirty-two light-emitting portions as a light-emitting portion subjected to adjustment when the writing is finished, and outputs a signal specifying the light-emitting portion for the adjustment. In the present embodiment, for example, the light-emitting portion selecting circuit 414 selects the light-emitting portion subjected to the adjustment, from the light-emitting portions excluding a light-emitting portion which the light-emitting portion driving circuit 400 has driven immediately before and excluding a light-emitting portion adjacent to that light-emitting portion driven by the light-emitting portion driving circuit 400 immediately before. For example, when the light-emitting portion which the light-emitting portion driving circuit 400 has driven immediately before is v2, the light-emitting portions v1 to v3 are exempt from the selection, and the light-emitting portions other than the light-emitting portions v1 to v3 are selected.

Furthermore, the light-emitting portion selecting circuit 414 selects one of the thirty-two light-emitting portions to be used for detecting the timing for starting the subsequent scanning when the scanning light beam has reached the scanning ending edge, and outputs a signal specifying the selected light-emitting portion. In the present embodiment, for example, the light-emitting portion selecting circuit 414 selects the light-emitting portion used for detecting the timing for starting the subsequent scanning, from the light-emitting portions excluding a light-emitting portion driven firstly in the subsequent scanning and excluding a light-emitting portion adjacent to that light-emitting portion driven firstly in the subsequent scanning. For example, when the light-emitting portion which the light-emitting portion driving circuit 400 drives in the first place in the next scanning is v3, the light-emitting portions v2 to v4 are exempt from the selection, and the light-emitting portions other than the light-emitting portions v2 to v4 are selected.

The output signal s14 of the light-emitting portion selecting circuit 414 is supplied to the light-emitting portion driving circuit 400 as one of the sets of driving information.

The light-amount adjusting circuit 416 generates a signal for adjusting a light-amount of the light-emitting portion selected as the subject for the adjustment on the basis of the output signal of the light-receiving element 1014, when the output signal s15 of the timing signal generating circuit 415 changes from the low level to the high level. The output signal s16 of the light-amount adjusting circuit 416 is supplied to the light-emitting portion driving circuit 400 as one of the sets of driving information. Thereby, a driving signal or a driving current for the light-emitting portion, subjected to the adjustment, is adjusted in the light-emitting portion driving circuit 400.

As is apparent from the foregoing description, control for the light-emitting portions is carried out in the controller 1020, in accordance with the optical scanning unit 1200 of the present embodiment.

Therefore, the optical scanning unit 1200 according to the present third embodiment is provided with the controller 1020 including the light-emitting portion selecting circuit 414, the timing signal generating circuit 415, and the light-amount adjusting circuit 416. The optical scanning unit 1200 selects one of the thirty-two light-emitting portions as the light-emitting portion to which the light-amount is to be adjusted. In addition, the optical scanning unit 1200 causes the light-emitting portion subjected to the adjustment of the light-amount to emit light and adjusts the light-amount of the light-emitting portion subjected to the adjustment of the light-amount on the basis of the output signal of the light-emitting element 1014, during the time t2 from a time point in which the predetermined time t1 after the starting of the scanning is elapsed to a time point in which the scanning light beam reaches the scanning ending edge. Thereby, it is possible to once put the light of all the light-emitting portions out during a period from the scanning ending edge to the subsequent scanning starting edge. Hence, it is possible to suppress the generation of heat in the light-emitting portions. As a result, the deterioration of the light-emitting portions is suppressed.

Additionally, the laser printer 1002 according to the present embodiment is provided with the optical scanning unit 1200 capable of suppressing the deterioration of the light-emitting portions. Hence, formation of a high-quality image is possible in a stable manner.

Figure 40:
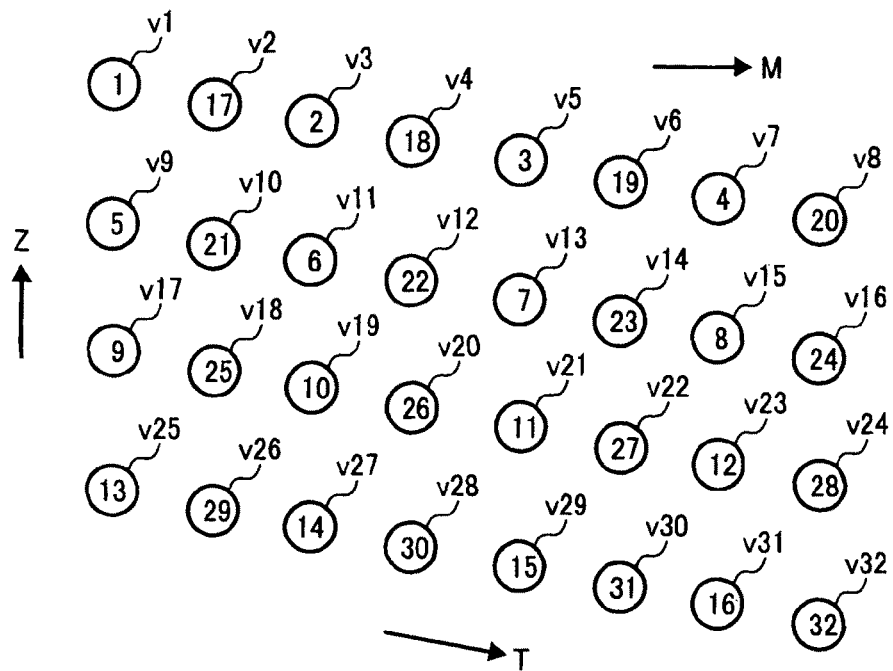
FIG. 40 is an explanatory view illustrating one example of an order of selection of the light-emitting portions subjected to adjustment of a light-amount of emission, in the optical scanning unit according to the third embodiment of the invention.

According to the present embodiment, the light-emitting portion selecting circuit 414 selects the light-emitting portion subjected to the adjustment, from the light-emitting portions excluding a light-emitting portion which the light-emitting portion driving circuit 400 has driven immediately before and excluding a light-emitting portion adjacent to that light-emitting portion driven by the light-emitting portion driving circuit 400 immediately before, although it is not limited thereto. For example, the light-emitting portion selecting circuit 414 may select one or more of the light-emitting portions for the adjustment of the light-amount of emission, excluding a light-emitting portion used for the detection of the timing of starting the subsequent scanning and excluding a light-emitting portion adjacent to that light-emitting portion. Referring to FIG. 40, in addition, the light-emitting portion subjected to the adjustment may also be set in an order from v1, v3, v5 . . . v31, v2, v4, v6 . . . to v32, for example.

Figure 41:
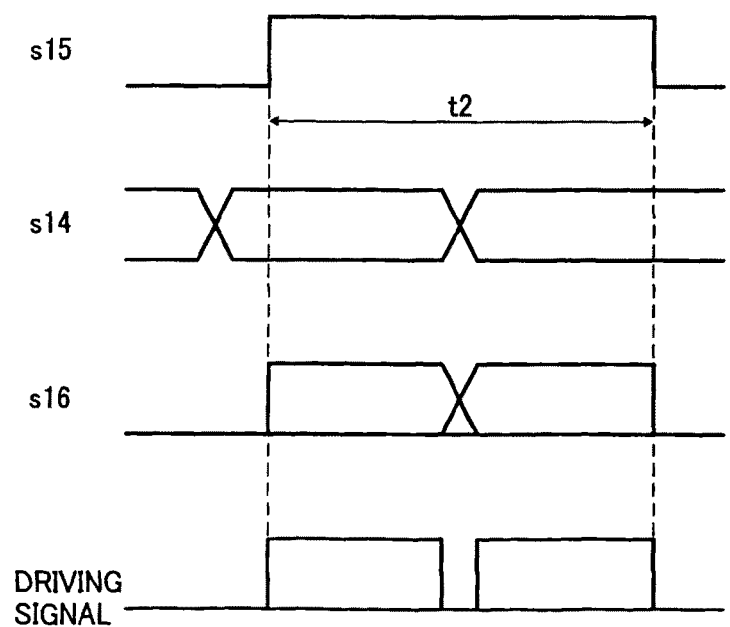
FIG. 41 is a timing chart illustrating a case in which two light-emitting portions are selected for the adjustment of the light-amount of the emission, in the optical scanning unit according to the third embodiment of the invention.

According to the present embodiment, the adjustment of the light-amount of the single light-emitting portion is performed in the timing from the time point in which the writing has finished to the time point in which the scanning light beam reaches the ending edge of the scanning, although it is not limited thereto. For example, the light-amount of the plural light-emitting portions may be adjusted in the timing from the time point in which the writing has finished to the time point in which the scanning light beam reaches the scanning ending edge. In this case, it is preferable that timing of light-emission of each of the light-emitting portions be staggered such that the plural light-emitting portions do not emit simultaneously. FIG. 41 illustrates a timing chart of an example for performing the adjustment of the light-amount of two light-emitting portions, with the timing from the time point in which the writing has finished to the time point in which the scanning light beam reaches the scanning ending edge.

According to the present embodiment, the light source includes the total of thirty-two light-emitting portions, although it is not limited thereto. Any number of the light-emitting portions suffices as long as the light source section includes the plural light-emitting portions. An arrangement of the light-emitting portions may also be a one-dimensional array.

In the present embodiment, at least one of the light-emitting portion selecting circuit 414 and the timing signal generating circuit 415 may be replaced with a microcomputer which executes processes having the same or similar functions thereto in accordance with a program.

Moreover, the present embodiment has been described based on the laser printer 1002 as the image forming apparatus. However, the image forming apparatus is not limited thereto. It is possible for any image forming apparatus provided with the optical scanning unit 1200 according to the present embodiment to form the high-quality image at high-speed.

For example, the image forming apparatus may also be an image forming apparatus, which includes the optical scanning unit 1200 according to the present embodiment, and which directly irradiates laser light onto a medium, such as a photosensitive paper, that develops a color by the laser light.

In addition, the image forming apparatus may also be an image forming apparatus in which a silver-halide film is used as an image carrying body. In this example, a latent image is formed on the silver-halide film by the optical scanning. The thus-formed latent image can be visualized with a process equivalent to a development process in normal silver-halide film processes, which can then be transcribed on a photographic paper with a process equivalent to a printing process in the normal silver-halide film processes. Such an image forming apparatus can be used as an optical plate-making device, a photo-lithographing device which draws an image of a computed-tomography scan, or the like.

Figure 42:
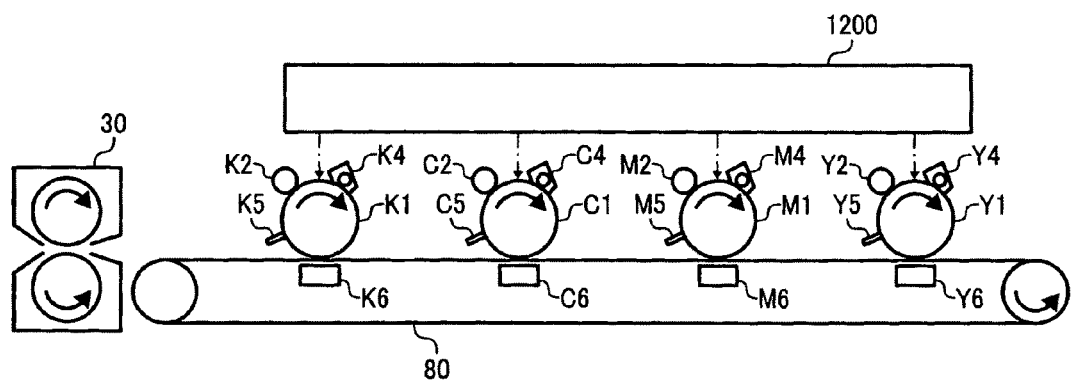
FIG. 42 is a side view schematically illustrating a structure of a tandem color machine utilizing the optical scanning unit according to the third embodiment of the invention.

Referring to FIG. 42, for example, the image forming apparatus may be a tandem color machine corresponding to the colored image and provided with the optical scanning unit according to the present embodiment and the plural photoreceptor drums. Here, since the tandem color machine illustrated in FIG. 42 is the one in which the optical scanning unit 1010A of the tandem color machine illustrated in FIG. 14 is replaced with the optical scanning unit 1200 according to the present embodiment and thus other structure is the same or equivalent, the description thereon will not be provided in detail.

In the tandem color machine, alternatively, an optical scanning unit for black, an optical scanning unit for cyan, an optical scanning unit for magenta, and an optical scanning unit for yellow may be provided, in place of the optical scanning unit 1200 described above. In this example, the optical scanning units for the respective colors include the light-amount detecting devices for detecting the light-amounts of the light beams emitted from the light sources, respectively.

Fourth Embodiment

FIGS. 43 to 50 illustrate a fourth embodiment of the present invention. The fourth embodiment of the invention is mainly directed to an image forming apparatus having a light source in which plural light-emitting portions are arranged two-dimensionally. The image forming apparatus includes a structure in which a positional relationship between the light source and an optical system is easily adjustable.

Figure 43:
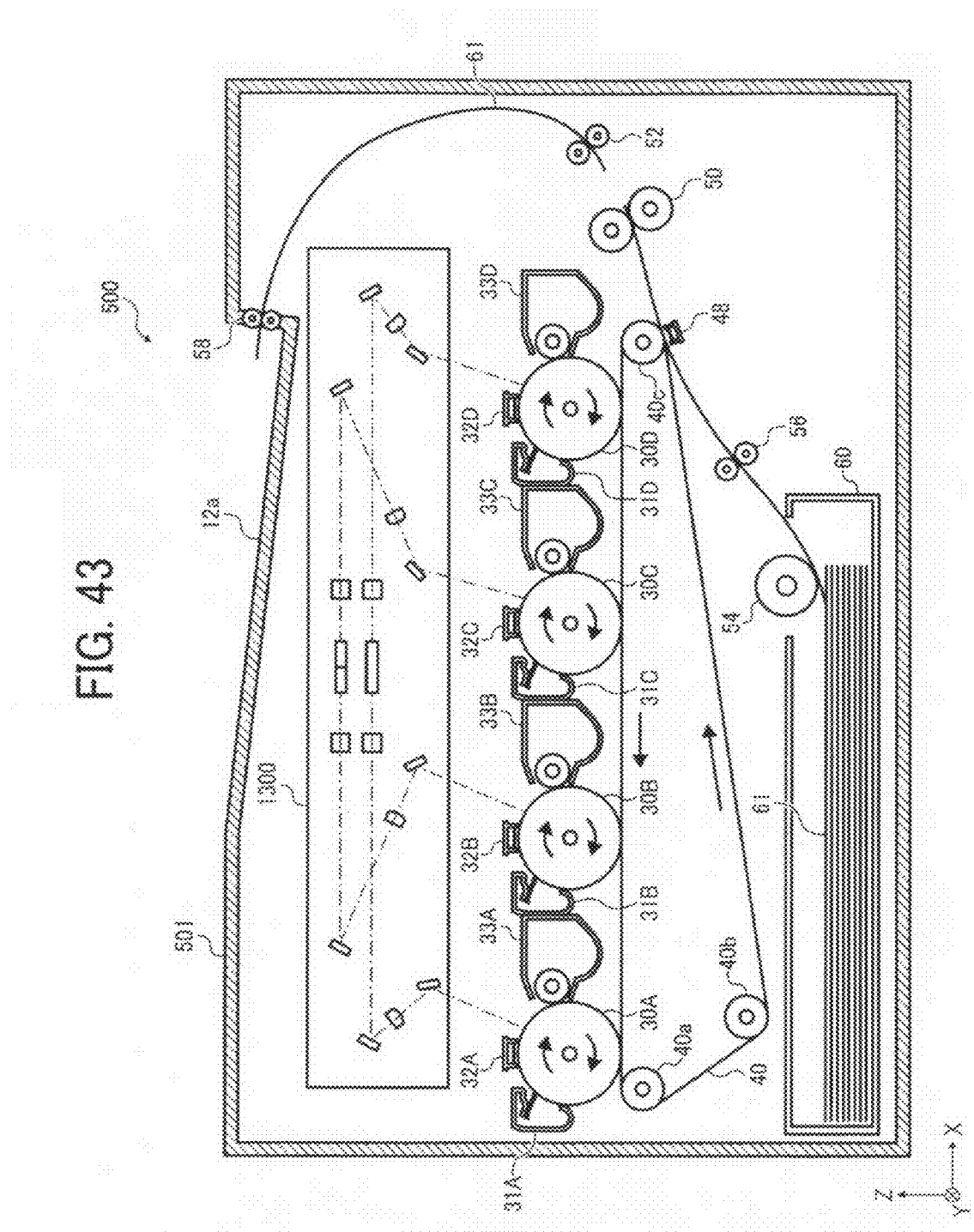
FIG. 43 is a side view schematically illustrating a structure of an image forming apparatus provided with an optical scanning unit according to a fourth embodiment of the invention.

FIG. 43 schematically illustrates the structure of the image forming apparatus 500 according to the fourth embodiment of the invention. According to the present embodiment, the image forming apparatus 500 is a tandem color printer which prints a multi-colored image by overlapping toner images of black, yellow, magenta, and cyan onto a plain paper and transferring them on the plain paper. Referring to FIG. 43, the image forming apparatus 500 including, for example, an optical scanning unit 1300, four photoreceptor drums 30A, 30B, 30C and 30D, a transfer belt 40, fixing rollers 50, a paper-feeding roller 54, a first pair of resist rollers 56, a second pair of resist rollers 52, paper-discharging rollers 58, a paper-feeding tray 60, an unillustrated controller which collectively controls each part of the image forming apparatus 500, and a housing 501 having, for example, a substantially rectangular-solid configuration and accommodates the respective parts of the image forming apparatus, is illustrated.

The housing 501 includes a paper-delivery tray 12a formed, for example, on an upper surface thereof. A paper in which printing is finished is discharged on the paper-delivery tray 12a. A lower part of the paper-delivery tray 12a is arranged with the optical scanning unit 1300.

The optical scanning unit 1300 scans a light beam, indicative of a black image component modulated based on image information supplied from a higher-level device such as a personal computer, to the photoreceptor drum 30A. In addition, the optical scanning unit 1300 scans a light beam indicative of a cyan image component to the photoreceptor drum 30B, and scans a light beam indicative of a magenta image component to the photoreceptor drum 30C. Moreover, the optical scanning unit 1300 scans a light beam indicative of a yellow image component to the photoreceptor drum 30D. The structure of the optical scanning unit 1300 will be described later in detail.

Each of the four photoreceptor drums 30A, 30B, 30C, and 30D includes a cylindrical member formed, on a surface thereof, with a photosensitive layer having a property in which, when a light beam for scanning is irradiated, an irradiated part becomes electrically conductive. Each of the four photoreceptor drums 30A, 30B, 30C, and 30D is disposed below the optical scaring unit 1300 along an X-axis direction in FIG. 43 at even intervals.

The photoreceptor drum 30A is disposed on a minus X (−X) side, i.e., on left side of FIG. 43, in the housing 501, in which a longitudinal direction thereof corresponds to a Y-axis direction of FIG. 43. The photoreceptor drum 30A is rotated clockwise or in a direction of an arrow in FIG. 43 by an unillustrated rotating mechanism. An electrification charger 32A, a toner cartridge 33A, and a cleaning case 31A are disposed around the photoreceptor drum 30A in that order in a direction of the rotation of the photoreceptor drum 30A.

The electrification charger 32A is disposed relative to the surface of the photoreceptor drum 30A through a predetermined clearance provided therebetween, in which a longitudinal direction thereof corresponds to the Y-axis direction of FIG. 43. The electrification charger 32A charges the surface of the photoreceptor drum 30A at a predetermined voltage.

The toner cartridge 33A includes, for example, a cartridge body in which a toner of the black image component is filled, and a developing roller charged by a voltage having a polarity reverse to that of the photoreceptor drum 30A. The toner cartridge 33A supplies the toner filled in the cartridge body to the surface of the photoreceptor drum 30A through the developer roller.

The cleaning case 31A includes a cleaning blade having, for example, a rectangular configuration, in which a longitudinal direction thereof corresponds to the Y-axis direction of FIG. 43. The cleaning case 31A is so disposed that one end of the cleaning blade is attached to the surface of the photoreceptor drum 30A. The toner attached to or absorbed on the surface of the photoreceptor drum 30A is removed by the cleaning blade in accordance with the rotation of the photoreceptor drum 30A, which may be then collected in the cleaning case 31A.

The photoreceptor drums 30B, 30C, and 30D are subsequently arranged on a plus X (+X) side of the photoreceptor drum 30A, which are separated away from each other at an predetermined interval. Each of the photoreceptor drums 30B, 30C, and 30D is also rotated clockwise or in a direction of an arrow in FIG. 43 by an unillustrated rotating mechanism. Electrification chargers 32B, 32C, and 32D, toner cartridges 33B, 33C, and 33D, and cleaning cases 31B, 31C, and 31D are disposed around the photoreceptor drums 30B, 30C, and 30D with a positional relationship similar to that of the photoreceptor drum 30A, respectively.

The electrification chargers 32B, 32C, and 32D are disposed similarly to the electrification charger 32A, and charge the surfaces of the photoreceptor drums 30B, 30C, and 30D at a predetermined voltage, respectively.

The toner cartridges 33B, 32C, and 32D include, for example, cartridge bodies in which toners of a cyan image component, a magenta image component, and a yellow image component are filled, and developing rollers charged by a voltage having a polarity reverse to that of the photoreceptor drums 30B, 30C, and 30D, respectively. The toner cartridges 33B, 33C, and 33D supply the toners filled in the cartridge bodies to the surfaces of the photoreceptor drums 30B, 30C, and 30D through the developer rollers, respectively.

The cleaning cases 31B, 31C, and 31D have structures and arrangement similarly to the cleaning case 31A, and function similarly to the cleaning case 31A, respectively.

Hereinafter, the photoreceptor drum 30A, the electrification charger 32A, the toner cartridge 33A, and the cleaning case 31A may be collectively referred to as a first station. In addition, the photoreceptor drum 30B, the electrification charger 32B, the toner cartridge 33B, and the cleaning case 31B may be collectively referred to as a second station. Likewise, the photoreceptor drum 30C, the electrification charger 32C, the toner cartridge 33C, and the cleaning case 31C may be collectively referred to as a third station. Furthermore, the photoreceptor drum 30D, the electrification charger 32D, the toner cartridge 33D, and the cleaning case 31D may be collectively referred to as a fourth station.

The transfer belt 40 is preferably an endless annular member. The transfer belt 40 is twined around a driven roller 40a disposed below the photoreceptor drum 30A, a driven roller 40c disposed below the photoreceptor drum 30D, and a driving roller 40b disposed at a position slightly lower than those of the driven rollers 40a and 40c. An upper side surface of the transfer belt 40 contacts with a lower end surface of each of the photoreceptor drums 30A, 30B, 30C, and 30D. The transfer belt 40 is rotated counterclockwise or in a direction illustrated by an arrow in FIG. 43 by the counterclockwise rotation of the driving roller 40b. A transfer charger 48, applied with voltage having a polarity reverse to that of each of the electrification chargers 32A, 32B, 32C, and 32D, is disposed on a plus X (+X) side, i.e., on right side of FIG. 43, of the transfer belt 40.

The paper-feeding tray 60 is disposed below the transfer belt 40. The paper-feeding tray 60 may be a tray having a substantially rectangular-solid configuration in which plural sheets of paper 61 subjected to printing are stacked and stored. In addition, an upper surface of the paper-feeding tray 60 on the plus X (+X) side, i.e., on the right side of FIG. 43, may be formed with a rectangular paper-feeding opening.

The paper-feeding roller 54 takes one sheet of paper 61 from the paper-feeding tray 60 one by one, and delivers the taken paper 61 to an interspace formed between the transfer belt 40 and the transfer charger 48 through the resist rollers 56 structured by a pair of revolving rollers.

The fixing rollers 50 are structured by a pair of revolving rollers, and apply heat and pressure on the paper 61. Thereafter, the fixing rollers 50 deliver the paper 61, on which the toner images are fixed, to the paper-discharging rollers 58 through the resist rollers 52 structured by a pair of revolving rollers.

The paper-discharging rollers 58 are structured by a pair of revolving rollers, and discharge the paper 61 on the paper-delivery tray 12a.

Now, the structure of the optical scanning unit 1300 will be described with reference to FIGS. 44 and 45. In the present embodiment, the optical scanning unit 1300 is disposed above the photoreceptor drums 30A, 30B, 30C, and 30D.

Figure 44:
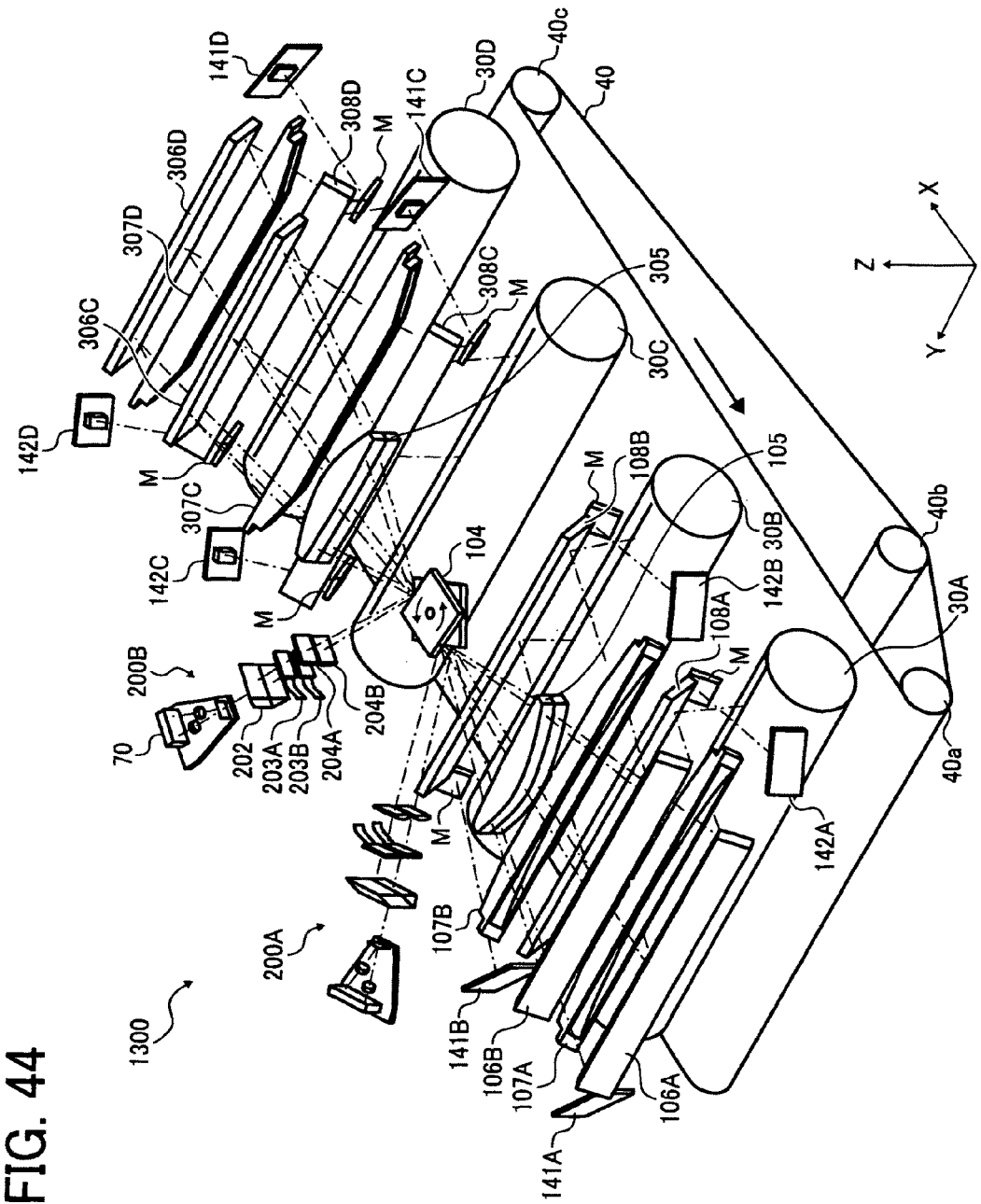
FIG. 44 schematically illustrates a structure of the optical scanning unit according to the fourth embodiment of the invention.

Referring to FIG. 44, the optical scanning unit 1300 is provided with a scanning optical system including a polygon mirror 104, an fθ lens 105, a reflecting mirror 106A, a reflecting mirror 108A, and a toroidal lens 107A. The fθ lens 105 is disposed in a minus X (−X) direction of the polygon mirror 104. The reflecting mirror 106A is disposed in the minus X (−X) direction of the fθ lens 105. The reflecting mirror 108A is disposed in a position lower than that of the reflecting mirror 106A. The toroidal lens 107A is disposed between the reflecting mirror 106A and reflecting mirror 108A.

The optical scanning unit 1300 is also provided with a scanning optical system including the fθ lens 105, a reflecting mirror 106B, a reflecting mirror 108B, and a toroidal lens 107B. The fθ lens 105 is disposed in the minus X (−X) direction of the polygon mirror 104. The reflecting mirror 106B disposed in the minus X (−X) direction of the fθ lens 105. The reflecting mirror 108B is disposed below the reflecting mirror 106B. The toroidal lens 107B is disposed between the reflecting mirror 106B and reflecting mirror 108B.

In addition, the optical scanning unit 1300 is provided with a scanning optical system including the polygon mirror 104, an fθ lens 305, a reflecting mirror 306D, a reflecting mirror 308D, and a toroidal lens 307D. The fθ lens 305 is disposed in a plus X (+X) direction of the polygon mirror 104. The reflecting mirror 306D is disposed in the plus X (+X) direction of the fθ lens 305. The reflecting mirror 308D is disposed in a position lower than that of the reflecting mirror 306D. The toroidal lens 307D is disposed between the reflecting mirror 306D and reflecting mirror 308D.

The optical scanning unit 1300 is also provided with a scanning optical system including the fθ lens 305, a reflecting mirror 306C, a reflecting mirror 308C, and a toroidal lens 307C. The fθ lens 305 is disposed in the plus X (+X) direction of the polygon mirror 104. The reflecting mirror 306C disposed in the plus X (+X) direction of the fθ lens 305. The reflecting mirror 308C is disposed below the reflecting mirror 306C. The toroidal lens 307C is disposed between the reflecting mirror 306C and reflecting mirror 308C.

The optical scanning unit 1300 is further provided with two incident optical systems of an incident optical system 200A which causes the scanning light beam, which scans the first station and the second station, to enter the polygon mirror 104, and an incident optical system 200B which causes the scanning light beam, which scans the third station and the fourth station, to enter the polygon mirror 104.

Each of the incident optical systems 200A and 200B causes the scanning light beam to enter deflecting and reflecting surfaces of the polygon mirror 104 from a direction having an angle of 120 degrees or an angle of 60 degrees relative to the X-axis. Each of the incident optical systems 200A and 200B includes a light source device 70, a light flux splitting prism 202, a set of liquid crystal element 203A and 203B, and a set of cylindrical lenses 204A and 204B, as illustrated typically in the incident optical system 200B of FIG. 44.

It is to be noted that, hereinafter, description will be made on the basis of an xyz coordinate system defined by rotating an XY coordinate at an 30-degrees angle around a Z-axis relative to an xyz coordinate system illustrated in FIG. 44, for the sake of convenience of explanation.

Figure 46:
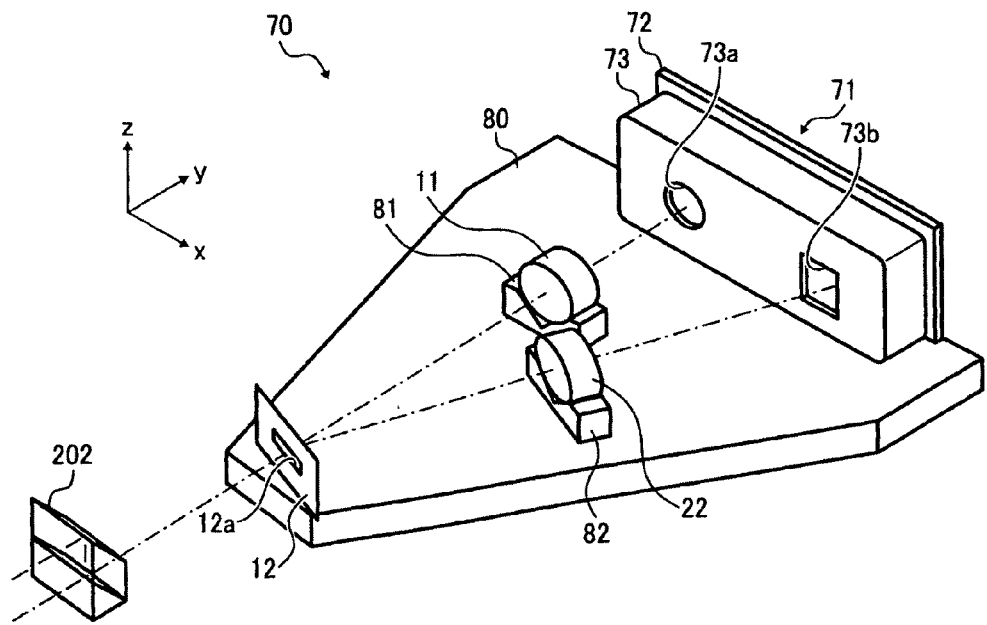
FIG. 46 schematically illustrates a structure of an upper part of a light source unit in the optical scanning unit according to the fourth embodiment of the invention.

FIG. 46 is a perspective view illustrating the light source device 70 together with the light flux splitting prism 202. Referring to FIG. 46, the light source device 70 includes, for example, a base 80, a light source unit retained on an upper surface of the base 80, a coupling lens 11, a branching optical element 12, and an imaging lens 22.

Figure 47:
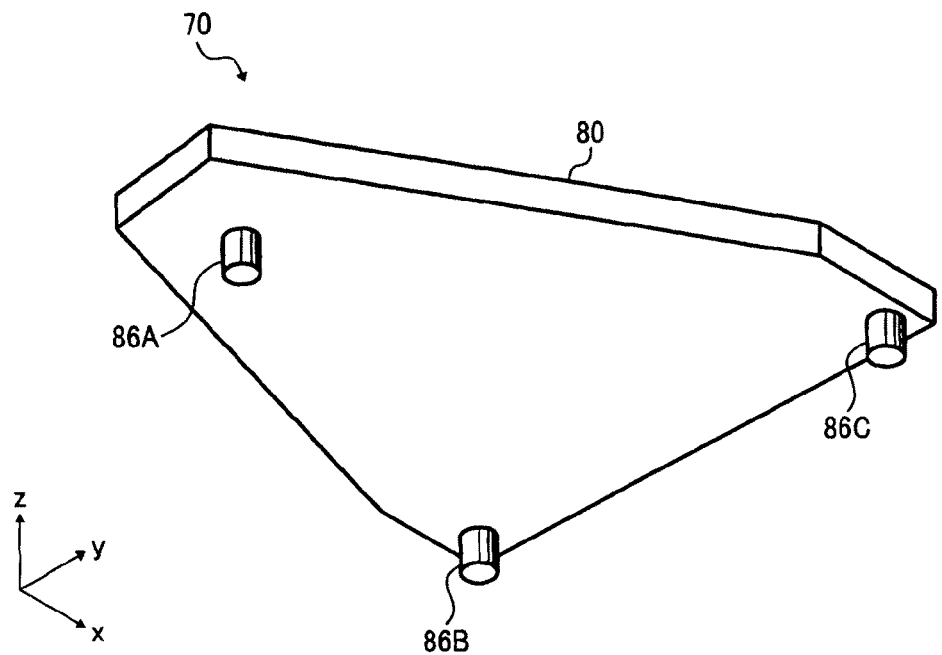
FIG. 47 schematically illustrates a structure of a lower part of the light source unit in the optical scanning unit according to the fourth embodiment of the invention.

The base 80 is preferably a plate-like member having a substantially isosceles triangle configuration as seen on the flat, although it is not limited thereto. Referring to FIG. 47, in the present embodiment, adjustment portions 86A, 86B, and 86C are fixed to three corners of a lower surface of the base 80. Each of the adjustment portions 86A, 86B, and 86C is preferably a cylindrical member in which an upper end thereof is fixed to the lower surface of the base 80 and in which a longitudinal direction thereof corresponds to a z-axis direction in FIG. 47. In the present embodiment, the adjustment portion 86C among the three adjustment portions 86A, 86B, and 86C is adapted to be extendable, telescopic, or extensible in the z-axis direction, or adapted to move up and down in the z-axis direction. Alternatively, one or more adjustment portions 86A, 86B, and 86C may be extendable or capable of elevating in the z-axis direction. A mechanism for moving the at least one of the adjustment portions up and down in the z-axis direction, for example, includes a sliding structure having a groove, a screw structure having a threaded portion, and other structure which moves a bottom part of the adjustment portion relative to a top part of the adjustment portion.

Figure 48:
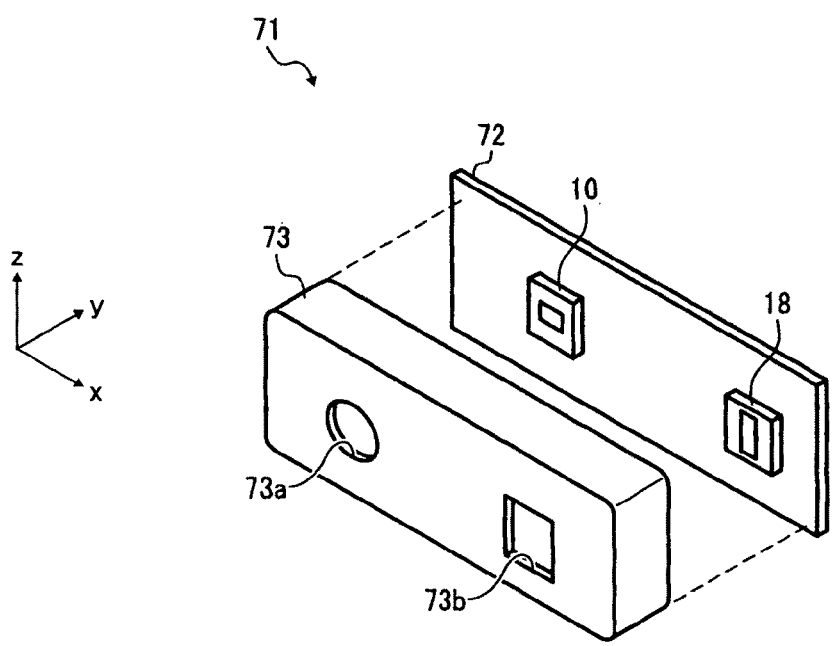
FIG. 48 is a development view of a light source section in the optical scanning unit according to the fourth embodiment of the invention.

FIG. 48 is a development perspective view of the light source unit 71. Referring to FIG. 48, the light source unit 71 includes, for example, a substrate 72, a light source 10 and a light-receiving element 18 implemented on the substrate 72, and a chassis 73 fixed to the substrate 72.

The substrate 72 is preferably a substrate in which a longitudinal direction thereof corresponds to an x-axis direction, and the light source 10 and the light-receiving element 18 are mounted on a surface on a minus y (−y) direction. In addition, front and back surfaces of the substrate 72 may be formed with a driving circuit for driving the light source 10, and a monitoring circuit for monitoring a signal outputted from the light-receiving element 18, for example.

Figure 49:
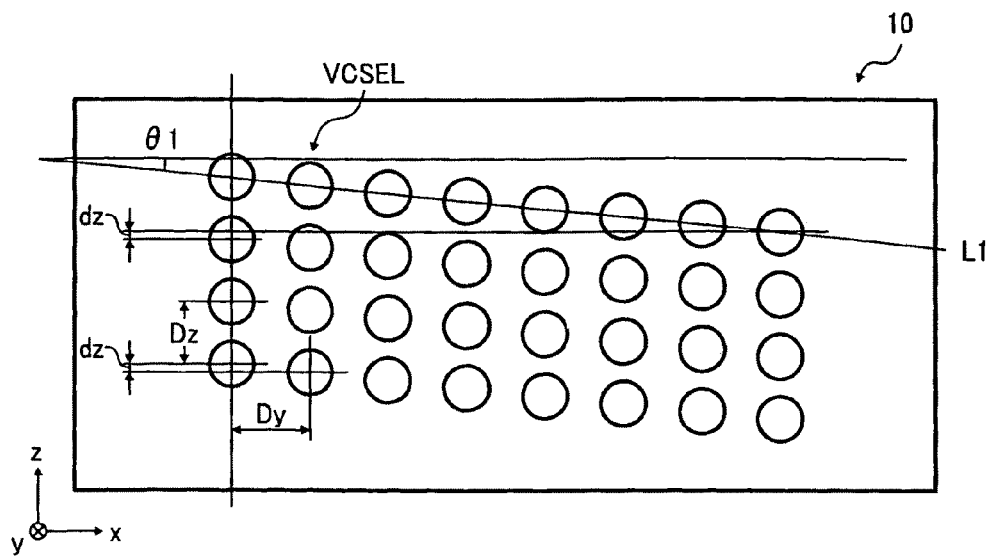
FIG. 49 is a front view of a light source in the optical scanning unit according to the fourth embodiment of the invention.

For example, the light source 10 is a surface emitting type semiconductor laser array in which VCSELs (Vertical Cavity Surface Emitting LASER) are arranged two-dimensionally. Referring to FIG. 49, in the light source 10 according to the present embodiment, a total of thirty-two VCSELs, which projects divergent light in a minus y (−y) direction, is arranged in a matrix configuration having four rows and eight columns thereof to form a light-emitting plane, in which a direction parallel to a straight line L1 having an angle θ1 relative to an x-axis corresponds to a row direction and a direction parallel to a z-axis corresponds to a column direction. In the present embodiment, for example, an interval Dz between the VCSELs in a sub-scanning direction is 18.4 μm, an interval Dy between the VCSELs in a main-scanning direction is 30 μm, and a center interval dz in the z-axis direction or the sub-scanning direction between the adjacent VCSELs in a direction of the x-axis is 2.3 μm (Dz/8). In addition, directions of polarization of the light beams emitted from the VCSELs are aligned.

Referring to FIG. 48, the light-emitting element 18 is arranged on a plus x (+x) side of the light source 10, and outputs a signal (photoelectric conversion signal) corresponding to an amount of light of an incident light beam (for example, a light-amount detection light beam).

The chassis 73 is preferably a rectangular-solid member in which a plus y (+y) side thereof is opened and a longitudinal direction thereof corresponds to the x-axis direction. An opening 73a which may be circular in shape is formed on a surface on a minus y (−y) side of the chassis 73 at a position facing the light source 10, and an opening 73b having a rectangular shape for example is formed thereon at a position facing the light-receiving element 18. An end on the plus y (+y) side of the chassis 73 and an outer edge of the surface of the substrate 72 on the minus y (−y) side are fixed, so that the chassis 73 and the substrate 72 are integrated with a state in which the light source 10 and the light-receiving element 18 are accommodated in an internal space of the chassis 73. Referring to FIG. 46, a lower surface of the chassis 73 is fixed to an edge of the upper surface of the base 80 on the plus y (+y) side, such that the thus-structured light source unit 71 is held on the base 80.

The coupling lens 11 is held by a retaining part 81 formed on the base 80, in such a manner that an optical axis thereof is orthogonal to the substrate 72 and the center of the light source 10 is positioned on the optical axis. The coupling lens includes a lens having a refractive index of about 1.5 for example, and couples the light beam projected from the light source 10. The retaining part 81 is formed with a groove formed along the y-axis on an upper surface thereon and having, for example, an alphabet V shaped configuration in cross-section along the x-axis direction.

For example, adjustment for collimation of the optical axis of the coupling lens 11 may be carried out as follows. First, an ultraviolet curing adhesive is applied on the groove of the retaining part 81, and the collimate lens 11 is arranged thereon in a state in which the plus y (+y) side and the minus y (−y) side of the collimate lens 11 are held and sandwiched with a pair of jigs. Then, a position and attitude of the coupling lens 11 are adjusted by moving the coupling lens 11 in the x, y and z axis directions and around the respective x, y and z axes by the use of the jigs, while detecting a point of focus thereof by using, for example, a knife-edge method and detecting a position of the optical axis of the coupling lens 11 with a position sensor for example. Finally, when the adjustment of the coupling lens 11 completes, ultraviolet irradiation is performed onto the ultraviolet curing adhesive to cure the adhesive.

The branching optical element 12 is preferably a plate-like member having an opening 12a on the center thereof. For example, the opening 12a has a rectangular configuration having a width in the x-axis direction or a main-scanning direction of 5.5 mm and a width in the z-axis direction or the sub-scanning direction of 1.18 mm. A surface on the plus y (+y) side of the branching optical element 12 is formed with a reflecting surface for reflecting the light beam. The branching optical element 12 is disposed in a state in which the center of the opening 12a is positioned in a focal position or in the vicinity of the focal position of the coupling lens, and in which the reflecting surface is slanted at a predetermined angle relative to a zx plane. Thereby, the light beam, projected from the light source 10 in the minus y (−y) direction and which enters the branching optical element 12, is separated into the scanning light beam which passes through the opening 12a, and the light-amount detection light beam reflected by the reflecting surface and which enters the light-receiving element 18 of the light source unit 71 through the opening 73*b*.

The imaging lens 22 is held by a retaining part 82 and disposed between the branching optical element 12 and the light-receiving element 18. The imaging lens 22 condenses the light-amount detection light beam from the branching optical element 12 to a light-receiving surface of the light-receiving element 18.

Figure 45:
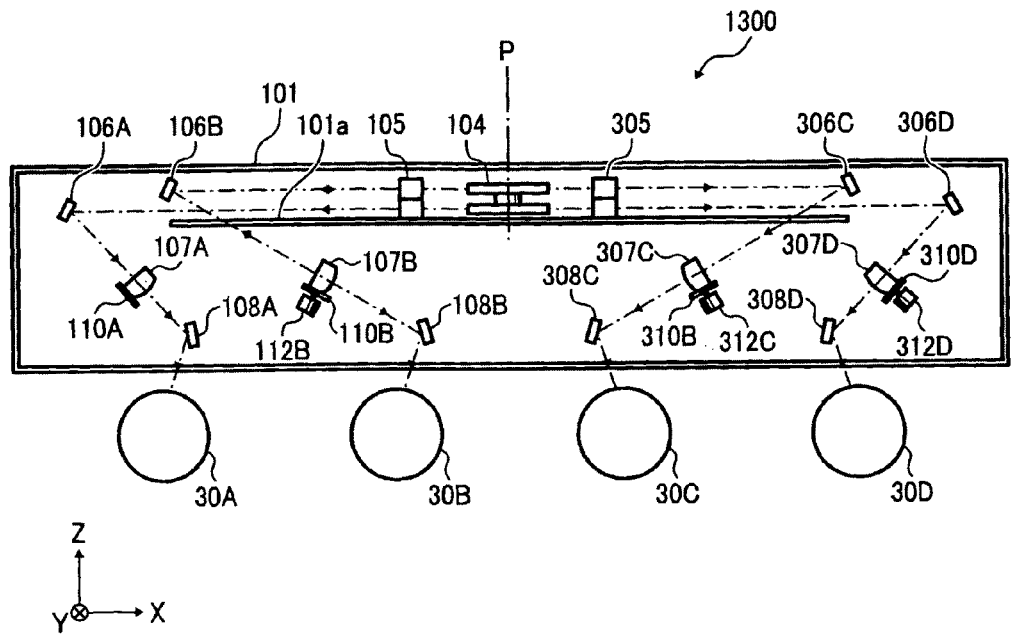
FIG. 45 is a side view of the optical scanning unit according to the fourth embodiment of the invention.
Figure 50:
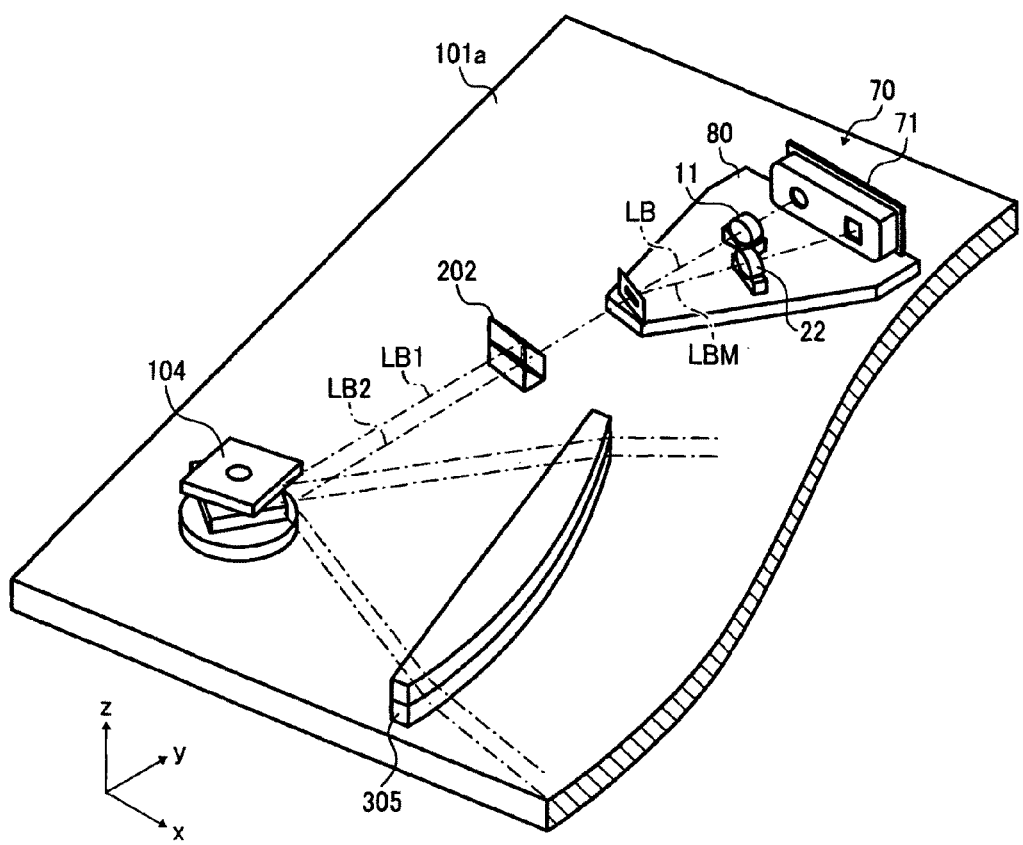
FIG. 50 is an explanatory view of an arrangement of the light source unit in the optical scanning unit according to the fourth embodiment of the invention.

Referring to FIG. 50, the thus-structured light source device 70 is disposed on an upper surface of a supporting plate (a supporting board) 101*a* fixed substantially horizontally to a chassis 101 of the optical scanning unit 1300 as illustrated in FIG. 45, through the adjustment portions 86A, 86B, and 86C as illustrated in FIG. 47. For example, by expanding and contracting the adjustment portion 86C to slant the base 80 relative to the supporting plate 101*a*, adjustment of a position of the light beam emitted from the light source unit 71 in the Z-axis direction or in the sub-scanning direction is possible. Hence, it is possible to adjust in the sub-scanning direction a pitch of a spot of the scanning light beam formed on the photoreceptor drums 30A to 30D.

Referring to FIG. 46, the light flux splitting prism 202 splits the scanning light beam having passed through the opening 12*a* of the branching optical element 12 into two light beams, and projects the split scanning light beams in the minus y (−y) direction, respectively, in such a manner that a predetermined interval is provided therebetween.

Referring to FIG. 44, the liquid crystal element 203A and 203B are disposed adjacently in a vertical direction in front of a projection plane of the light flux splitting prism 202. The liquid crystal element 203A and 203B deflect the scanning light beams in the sub-scanning direction according to voltage signals supplied from an unillustrated controller, respectively.

The cylindrical lenses 204A and 204B are disposed adjacently in the vertical direction in front of the liquid crystal element 203A and 203B correspondingly to the scanning light beams divided in the light flux splitting prism 202. One of the cylindrical lenses 204A and 204B is attached in such a manner as to be capable of adjusting its rotation around the optical axis, such that adjustment of focal lines of the scanning light beams, split into two in the light flux splitting prism 202, to be in parallel is possible. The cylindrical lenses 204A and 204B condense the incident scanning light beams onto the polygon mirror 104, respectively.

Here, each of the cylindrical lenses 204A and 204B at least has a positive curvature in the sub-scanning direction, and once converges the scanning light beam on the reflecting surface of the polygon mirror 104. In the present embodiment, an optical face tangle error correction for laser scanning system, in which a deflection point in the sub-scanning direction and imaging positions of the surfaces of the photoreceptor drums 30A to 30D are set as a conjugated relation, is structured by the convergence of the scanning light beam on the reflecting surface of the polygon mirror 104 and the toroidal lenses 107A to 107D.

The polygon mirror 104 preferably includes a set of square prism members formed with the deflecting and reflecting surfaces for the scanning light beams on side surfaces thereof. Each of the square prism members is disposed adjacently in the vertical direction, and a phase of each of the square prism members is shifted at an angle of 45 degrees to each other. The polygon mirror 104 is rotated by an unillustrated rotating mechanism in a direction of an arrow illustrated in FIG. 44 at a constant angular velocity. Thus, the scanning light beam, split into two in the vertical direction with the light flux splitting prism 202 of the incident optical system 200A and condensed on the deflecting and reflecting surfaces of the polygon mirror 104, is deflected by the upper and lower deflecting and reflecting surfaces of the polygon mirror 104, which is then incident alternately on the photoreceptor drums 30A and 30B. Similarly, the scanning light beam, split into two in the vertical direction with the light flux splitting prism 202 of the incident optical system 200B and condensed on the deflecting and reflecting surfaces of the polygon mirror 104, is deflected by the upper and the lower deflecting and reflecting surfaces of the polygon mirror 104, which is then incident alternately on the photoreceptor drums 30C and 30D.

Each of the fθ lenses 105 and 305 has an image height proportional to an angle of incidence of the scanning light beam deflected from the polygon mirror 104, and causes to move an image surface of the scanning light beam, deflected by the polygon mirror 104 at the constant angular velocity, in the Y-axis direction at a constant velocity.

Referring to FIGS. 44 and 45, the reflecting mirror 106A and the reflecting mirror 106B turn back the scanning light beams routed through the fθ lens 105 to guide the scanning light beams to the toroidal lenses 107A and 107B, in which longitudinal directions thereof correspond to the Y-axis direction, respectively. Similarly, the reflecting mirror 306C and the reflecting mirror 306D turn back the scanning light beams routed through the fθ lens 305 to guide the scanning light beams to the toroidal lenses 307C and 307D, in which longitudinal directions thereof correspond to the Y-axis direction, respectively.

The toroidal lens 107A is supported by a supporting plate 110A in which a longitudinal direction thereof corresponds to the Y-axis direction and in which both ends thereof are fixed to the housing 501. Referring to FIGS. 44 and 45, the toroidal lens 107A images the scanning light beam bent back by the reflecting mirror 106A on the surface of the photoreceptor drum 30A through the reflecting mirror 108A. A longitudinal direction of the reflecting mirror 108A corresponds to the Y-axis direction.

On the other hand, the toroidal lens 107B is supported by a supporting plate 110B, in which a longitudinal direction thereof corresponds to the Y-axis direction, and in which one end (for example, +Y side) is fixed to the housing 501 and the other end (for example, −Y side) is supported by a driving mechanism 112B. Referring to FIG. 45, the driving mechanism 112B includes a rotary motor and a feed-screw mechanism, for example. The toroidal lens 107B images the scanning light beam bent back by the reflecting mirror 106B on the surface of the photoreceptor drum 30B through the reflecting mirror 108B. A longitudinal direction of the reflecting mirror 108B corresponds to the Y-axis direction.

Similarly, the toroidal lens 307C is supported by a supporting plate 310C, in which a longitudinal direction thereof corresponds to the Y-axis direction, and in which one end (for example, +Y side) is fixed to the housing 501 and the other end (for example, −Y side) is supported by a driving mechanism 312C. Referring to FIG. 45, the driving mechanism 312C includes a rotary motor and a feed-screw mechanism, for example. The toroidal lens 307C images the scanning light beam bent back by the reflecting mirror 306C on the surface of the photoreceptor drum 30C through the reflecting mirror 308C. A longitudinal direction of the reflecting mirror 308C corresponds to the Y-axis direction.

Similarly, the toroidal lens 307D is supported by a supporting plate 310D, in which a longitudinal direction thereof corresponds to the Y-axis direction, and in which one end (for example, +Y side) is fixed to the housing 501 and the other end (for example, −Y side) is supported by a driving mechanism 312D. Referring to FIG. 45, the driving mechanism 312D includes a rotary motor and a feed-screw mechanism, for example. The toroidal lens 307D images the scanning light beam bent back by the reflecting mirror 306D on the surface of the photoreceptor drum 30D through the reflecting mirror 308D. A longitudinal direction of the reflecting mirror 308D corresponds to the Y-axis direction.

Light-detecting sensors 141A and 141B are disposed in the vicinity of the ends on the plus Y (+Y) side, i.e., on the incident side of the scanning light beam, of the toroidal lenses 107A and 107B, respectively, and light-detecting sensors 142A and 142B are disposed in the vicinity of the ends on the minus Y (−Y) side thereof, respectively. In addition, light-detecting sensors 142C and 142D are disposed in the vicinity of the ends on the plus Y (+Y) side of the toroidal lenses 307C and 307D, respectively, and light-detecting sensors 141C and 141D are disposed in the vicinity of the ends on the minus Y (−Y) side thereof, respectively. For example, each of the light-detecting sensors 141A to 141D and 142A to 142D outputs a signal which is turned ON when the scanning light beam is being detected and turned OFF in other occasions.

Now, operation of the image forming apparatus 500 provided with the optical scanning unit 1300 having the structure described above will be described. When information on an image is supplied, for example, from a higher-level device, the scanning light beam projected from the light source device 70 of the incident optical system 200A is divided into two in the vertical direction by the light flux splitting prism 202. The scanning light beams split above and below are subjected to correction of their positions in the sub-scanning direction by transmitting the liquid crystal element 203A and 203B, respectively, which are then condensed on the deflecting and reflecting surfaces of the polygon mirror 104 by the cylindrical lenses 204A and 204B, respectively. Thereafter, the scanning light beams deflected by the polygon mirror 104 enter the fθ lens 105.

The upper scanning light beam in the vertical direction, incident on the fθ lens 105, is reflected from the reflecting mirror 106B to enter the toroidal lens 107B, which is then condensed on the surface of the photoreceptor drum 30B by the toroidal lens 107B through the reflecting mirror 108B. The lower scanning light beam in the vertical direction, incident on the fθ lens 105, is reflected from the reflecting mirror 106A to enter the toroidal lens 107A, which is then condensed on the surface of the photoreceptor drum 30A by the toroidal lens 107A through the reflecting mirror 108A. Here, the polygon mirror 104 has a phase difference of 45 degrees between the upper and the lower deflecting and reflecting surfaces. Thus, the scanning of the photoreceptor drum 30B by the upper scanning light beam and the scanning of the photoreceptor drum 30A by the lower scanning light beam are carried alternately in the minus Y (−Y) direction, in synchronization with the respective signals outputted from the light-detecting sensors 141A, 141B, 142A, and 142B.

Similarly, the scanning light beam projected from the light source device 70 of the incident optical system 200B is divided into two in the vertical direction by the light flux splitting prism 202. The scanning light beams split above and below are subjected to correction of their positions in the sub-scanning direction by transmitting the liquid crystal element 203A and 203B, respectively, which are then condensed on the deflecting and reflecting surfaces of the polygon mirror 104 by the cylindrical lenses 204A and 204B, respectively. Thereafter, the scanning light beams deflected by the polygon mirror 104 enter the fθ lens 305.

The upper scanning light beam in the vertical direction, incident on the fθ lens 305, is reflected from the reflecting mirror 306C to enter the toroidal lens 307C, which is then condensed on the surface of the photoreceptor drum 30C by the toroidal lens 307C through the reflecting mirror 308C. The lower scanning light beam in the vertical direction, incident on the fθ lens 305, is reflected from the reflecting mirror 306D to enter the toroidal lens 307D, which is then condensed on the surface of the photoreceptor drum 30D by the toroidal lens 307D through the reflecting mirror 308D. Here, the polygon mirror 104 has the phase difference of 45 degrees between the upper and the lower deflecting and reflecting surfaces. Thus, the scanning of the photoreceptor drum 30C by the upper scanning light beam and the scanning of the photoreceptor drum 30D by the lower scanning light beam are carried alternately in the plus Y (+Y) direction, in synchronization with the respective signals outputted from the light-detecting sensors 141C, 141D, 142C, and 142D.

Referring to FIG. 50, in the light source device 70, the light-amount detection light beam LBM, emitted from the light source 10 of the light source unit 71 and reflected from the reflecting surface of the branching optical element 12, enters the light-receiving element 18 by the imaging lens 22. In the light source device 70, the signal outputted when the light-amount detection light beam LBM is incident on the light-receiving element 18 is constantly detected, so as to perform light-amount control of the light beam outputted from the light source 10.

The light-amount control for the light-emitting portions may be performed as follows. For example, the light-amount detection light beam LBM is received on the light-emitting element 18 before the scanning light beams LB1 and LB2, projected from the light flux splitting prism 202 and deflected by the deflecting and reflecting surfaces of the polygon mirror 104, reach the photoreceptor drums 30A-30D. In the light source device 70, intensity of the light beam LB projected from the light source 10 is detected on the basis of the photoelectric conversion signal outputted from the light-receiving element 18 having received the light-amount detection light beam LBM, and a value of injected power supplied to each of the light-emitting portions of the light source 10 is determined, such that the intensity of the light beam LB emitted from the light source 10 corresponds to previously-set intensity. Hence, the scanning light beams LB1 and LB2 enter the photoreceptor drums 30A-30D with a state in which the light-amounts thereof are adjusted to the previously-set light-amount. Here, the value of the injected power may be once reset when the scanning of the photoreceptor drums 30A-30D is completed, and may be set again before the subsequent scanning of the photoreceptor drums 30A-30D is performed. Therefore, the adjustment of the light-amount for each of the light-emitting portions is carried out for each scanning of the photoreceptor drums 30A-30D.

The photosensitive layers of the surfaces of the photoreceptor drums 30A, 30B, 30C, and 30D are electrically charged at the predetermined voltage by the electrification chargers 32A, 33B, 33C, and 32D, respectively, so that charges are distributed thereon with a certain charge density. When each of the photoreceptor drums 30A, 30B, 30C, and 30D is scanned by the scanning light beam, the part of each of the photosensitive layers on which the scanning light beam is condensed now has a conductive property, and thus a potential at that part becomes substantially zero. Thus, by scanning the scanning light beams, modulated based on the image information, to the photoreceptor drums 30A, 30B, 30C, and 30D rotated in the directions of the arrows illustrated in FIG. 43, electrostatic latent images represented by the distribution of the charges are formed on the surfaces of the photoreceptor drums 30A, 30B, 30C, and 30D, respectively.

Referring to FIG. 43, when the electrostatic latent images are formed on the surfaces of the photoreceptor drums 30A, 30B, 30C, and 30D, the toners are supplied to the surfaces of the photoreceptor drums 30A, 30B, 30C, and 30D by the developing rollers of the toner cartridges 33A, 33B, 33C, and 33D, respectively. At this time, the developing roller of each of the cartridges 33A, 33B, 33C, and 33D is charged to have the voltage having the polarity reverse to that of the photoreceptor drums 30A, 30B, 30C, and 30D, so that the toner attached to the developing roller is charged to have the same polarity as the photoreceptor drums 30A, 30B, 30C, and 30D. Thus, the toner does not attach to the part in which the charges are distributed, and attaches only to the part in which the scanning light beam is scanned to provide the zero potential, in the surface of each of the photoreceptor drums 30A, 30B, 30C, and 30D. Thereby, the toner images in which the electrostatic latent images are visualized are formed on the surfaces of the photoreceptor drums 30A, 30B, 30C, and 30D, respectively.

Thereafter, the respective toner images formed by the first, the second, the third, and the fourth stations on the basis of the image information are transferred on the surface of the transfer belt 40, with the state in which each of the toner images is coincided with each other on the surface of the transfer belt 40. The toner images transferred on the transfer belt 40 are transferred by the transfer charger 48 on the surface of the paper 61 retrieved from the paper-feeding tray 60, which are then fixed onto the paper 61 with the fixing rollers 50. The paper 61 on which the image is thus formed is discharged by the paper-discharging rollers 58, and is sequentially stacked on the paper-delivery tray 12a.

Therefore, according to the present embodiment of the invention, the light source unit 71 including the light source 10 and the light-receiving element 18, the coupling lens 11, the branching optical element 12, and the imaging lens 22 are integrally held on the base 80 with the state in which the mutual positional relationship is maintained. Thus, even when, for example, the adjustment portion 86C is extended or elevated in the z-axis direction in a case of conducting an optical adjustment of the light source device 70 such as the pitch adjustment in the sub-scanning direction of the light beam, the relative positional relationship among the light source 10, the light-receiving element 18, the coupling lens 11, the branching optical element 12, and the imaging lens 22 does not change, and hence, a state of the incidence of the light-amount detection light beam entering the light-receiving element 18 is maintained with high accuracy. In other words, an optical adjustment between the light source 10 and the light-receiving element 18, when conducting the optical adjustment of the light source device 70, is unnecessary. Therefore, it is possible to perform the optical adjustment of the light source unit 70 with high accuracy in a short time.

In the present embodiment, the adjustment portion 86C is provided to be capable of extending or elevating among the adjustment portions 86A, 86B, and 86C, although it is not limited thereto. For example, the adjustment portions 86A and 86B other than the adjustment portion 86C, or all of the adjustment portions 86A, 86B, and 86C may be structured to be capable of extending or elevating. In other words, any structure suffices as long as the adjustment of the position in the Z-axis direction or the sub-scanning direction of the light beam LB emitted from the light source 10 is possible, by inclining the base 80 relative to the supporting plate 101a by at least one of the adjustment portions 86A, 86B, and 86C. For example, the number of the adjustment portions provided to the base 80 is not limited to three, and positions of the adjustment portions provided to the base 80 are not limited to corners of the configuration of the base 80. In addition, the configuration of the base 80 is not limited to a substantially isosceles triangle shape.

In the present embodiment, the branching optical element 12 allows a part of the light beam LB projected from each of the light-emitting portions of the light source 10 as the scanning light beam, and reflects the other part of the light beam LB as the light-amount detection light beam, so as to split the light beam LB projected from the light source 10. Thus, the photoreceptor drums 30A-30D are scanned by the scanning light beam having passed through the opening 21a and in which the intensity is high, and the light-amount of the light beam emitted from the light source 10 is monitored based on the light-amount detection light beam which does not contribute to the scanning. Hence, it is possible to increase use-efficiency of the light beam LB. In addition, the opening 21a also has a function as an aperture. Therefore, for example, the number of components is reduced as compared with a case in which a beam splitter and an aperture member are used. Hence, it is possible to attain reduction of costs of a device.

In addition, according to the present embodiment, both of the light source 10 and the light-receiving element 18 are implemented on the substrate 72. Therefore, it is unnecessary to electrically connect the light source 10 to the light-receiving element 18 with a flexible cable or the like, for example. Hence, it is possible to reduce an influence by external noise. In addition, it is possible to reduce the number of components, and to attain the reduction of costs of a device.

Furthermore, the imaging lens 22 is disposed at the position where the light beam reflected from the branching optical element 12 is incident on the light-receiving element 18 as the light-amount detection light beam. Hence, it is possible to set the injected power for each of the light-emitting portions.

Moreover, the directions of polarization of the light beams emitted from each of the light-emitting portions of the light source 10 is aligned. Hence, a variation in shapes of the spots in the respective light-amount detection light beam and the scanning light beams is suppressed. Hence, it is possible to irradiate the light-amount detection light beam and the scanning light beams on the light-receiving element 18 and the photoreceptor drums 30A-30D with high accuracy, respectively.

In the present embodiment, the image forming apparatus 500 includes the plural photoreceptor drums 30A-30D to form the multi-colored image, although it is not limited thereto. The embodiment of the invention is also applicable to, for example, an image forming apparatus which forms a monochromatic image by scanning the plural scanning light beams on the single photoreceptor drum, and so on.

In addition, according to the present embodiment, the optical scanning unit 1300 is used in the printer as the image forming apparatus, although it is not limited thereto. The optical scanning unit 1300 is also preferable for, for example, a copying machine, a facsimile, a compound machine in which the copying machines, the facsimile and so on are aggregated, or other devices which form an image.

Accordingly, it is possible to achieve the following (1) to (19) from the above-described exemplary embodiments of the present invention.

(1) A light-amount detecting device, comprising: a light source which emits a light beam; a branching optical element which divides the light beam emitted from the light source into a first light beam traveling in a predetermined direction and a second light beam traveling in a direction different to the predetermined direction; a light-condensing element which condenses the second light beam; a light-receiving element having a light-receiving surface which receives the second light beam condensed by the light-condensing element; and a detector which detects a light-amount of the second light beam received by the light-receiving element, wherein at least one of a direction of reflected light of the second light beam reflected from the light-receiving surface of the light-receiving element and spread of the reflected light of the second light beam reflected from the light-receiving surface of the light-receiving element is adjusted to control a light-amount of the reflected light of the second light beam returning to the light source.

Accordingly, it is possible to suppress the influence of the reflected light of the light-amount detecting light beam on an emission property of the light source. Thus, it is possible to output the light stably from the light source without incurring rise in costs. In addition, it is possible to detect the light-amount of the light source without influencing the emission property of the light source and without incurring rise in costs.

(2) A light-amount detecting device according to (1), wherein the light-receiving element is disposed such that a direction of a normal of the light-receiving surface in a light-receiving position of the second light beam is inclined relative to all directions of incidence of the second light beam entering the light-receiving surface.

Accordingly, it is possible to suppress the influence of the reflected light of the light-amount detecting light beam on the emission property of the light source. Thus, it is possible to output the light stably from the light source without incurring rise in costs. In addition, it is possible to detect the light-amount of the light source without influencing the emission property of the light source and without incurring rise in costs.

(3) A light-amount detecting device according to (1), wherein the light source includes a plurality of light-emitting portions arranged two-dimensionally in which an interval between the light-emitting portions located at both ends in a first direction of the light-emitting portions is set smaller than an interval between the light-emitting portions located at both ends in a second direction perpendicular to the first direction of the light-emitting portions, and wherein a direction of a normal of the light-receiving surface of the light-receiving element in a light-receiving position of the second light beam is inclined relative to all directions of incidence of the second light beam entering the light-receiving surface, in a plane which is horizontal to the first direction and which is perpendicular to a plane defined by the first direction and the second direction.

(4) A light-amount detecting device according to (3), wherein a following relationship is satisfied:

$$(L1-L2) \times (\theta1-\theta2) < 0$$

where L1 is a center interval between the light-emitting portions located at the both ends in the first direction, L2 is a center interval between the light-emitting portions located at the both ends in the second direction, $\theta1$ is an angle between the direction of the normal of the light-receiving surface of the light-receiving element in the light-receiving position of the second light beam and an optical axis of the second light beam entering the light-receiving element in the plane horizontal to the first direction and perpendicular to the plane defined by the first direction and the second direction, and $\theta2$ is an angle between the direction of the normal of the light-receiving surface of the light-receiving element in the light-receiving position of the second light beam and an optical axis of the second light beam entering the light-receiving element in a plane which is horizontal to the second direction and which is perpendicular to a plane defined by the first direction and the second direction.

Accordingly, it is possible to further suppress the influence of the reflected light of the light-amount detecting light beam on the emission property of the light source. Thus, it is possible to output the light stably from the light source without incurring rise in costs even more. In addition, it is possible to detect the light-amount of the light source without influencing the emission property of the light source and without incurring rise in costs even more.

(5) A light-amount detecting device according to (2), wherein the light-condensing element is disposed such that the second light beam is incident on the light-condensing element in a position separated from an optical axis of the light-condensing element.

Accordingly, it is possible to further suppress the influence of the reflected light of the light-amount detecting light beam on the emission property of the light source. Thus, it is possible to output the light stably from the light source without incurring rise in costs even more. In addition, it is possible to monitor the light-amount of the light source without influencing the emission property of the light source and without incurring rise in costs even more.

(6) A light-amount detecting device according to (3), wherein each of the light-emitting portions includes a vertical cavity surface emitting laser.

Accordingly, it is possible to further suppress the influence of the reflected light of the light-amount detecting light beam on the emission property of the light source. Thus, it is possible to output the light stably from the light source without incurring rise in costs even more. In addition, it is possible to monitor the light-amount of the light source without influencing the emission property of the light source and without incurring rise in costs even more.

(7) A light-amount detecting device according to (1), wherein the light-receiving surface of the light-receiving element is disposed at a position separated in a direction of an optical axis of the light-condensing element from a focal position of the second light beam condensed by the light-condensing element.

Accordingly, it is possible to suppress the influence of the reflected light of the light-amount detecting light beam on the emission property of the light source. Thus, it is possible to output the light stably from the light source without incurring rise in costs even more. In addition, it is possible to monitor the light-amount of the light source without influencing the emission property of the light source and without incurring rise in costs even more.

(8) A light-amount detecting device according to (7), wherein a direction of a normal of the light-receiving surface of the light-receiving element in a light-receiving position of the second light beam is inclined relative to all directions of incidence of the second light beam entering the light-receiving surface.

Accordingly, it is possible to further suppress the influence of the reflected light of the light-amount detecting light beam on the emission property of the light source. Thus, it is possible to output the light stably from the light source without incurring rise in costs even more. In addition, it is possible to monitor the light-amount of the light source without influencing the emission property of the light source and without incurring rise in costs even more.

(9) A light-amount detecting device according to (7), wherein the light-condensing element is disposed such that the second light beam is incident on the light-condensing element in a position separated from all optical axis of the light-condensing element.

Accordingly, it is possible to further suppress the influence of the reflected light of the light-amount detecting light beam on the emission property of the light source. Thus, it is possible to output the light stably from the light source without incurring rise in costs even more. In addition, it is possible to monitor the light-amount of the light source without influencing the emission property of the light source and without incurring rise in costs even more.

(10) A light-amount detecting device according to (7), further comprising a light-shielding member disposed on an optical path of the reflected light of the second light beam reflected from the light-receiving surface of the light-receiving element and which shields the reflected light.

Accordingly, it is possible to further suppress the influence of the reflected light of the light-amount detecting light beam on the emission property of the light source. Thus, it is possible to output the light stably from the light source without incurring rise in costs even more. In addition, it is possible to monitor the light-amount of the light source without influencing the emission property of the light source and without incurring rise in costs even more.

(11) An optical scanning unit, comprising: the light-amount detecting device according to any one of (1) to (10), wherein the light source includes a plurality of light-emitting portions; a deflector which deflects the first light beam; an optical system which condenses the first light beam deflected from the deflector on a surface to be scanned; a synchronization sensor which detects a timing of starting a scanning by the first light beam of the surface to be scanned; and a controller which selects at least one of the light-emitting portions as the at least one light-emitting portion subjected to adjustment of a light-amount thereof, and which drives the at least one light-emitting portion subjected to the adjustment to emit the light beam and adjusts the light-amount of the at least one light-emitting portion subjected to the adjustment on the basis of the light-amount of the second light beam received by the light-receiving element during a time from a time point in which a predetermined time, after the timing of starting the scanning is detected by the synchronization sensor, is elapsed to a time point in which the first light beam reaches a scanning ending edge of the surface to be scanned.

Accordingly, at least one of the light-emitting portions is selected as the at least one light-emitting portion subjected to adjustment of the light-amount thereof. In addition, the at least one light-emitting portion subjected to the adjustment is caused to emit the light beam, and the light-amount of the at least one light-emitting portion subjected to the adjustment is adjusted on the basis of the light-amount of the second light beam received by the light-receiving element, during the time from the time point in which the predetermined time after the starting of the scanning is elapsed to the time point in which the scanning light beam reaches the scanning ending edge. At this time, it is possible to obtain the time in which all of the light-emitting portions are turned off. Therefore, it is possible to suppress the deterioration of the light-emitting portions due to the generation of heat.

(12) An optical scanning unit according to (11), wherein the controller comprises: a light-emitting portion selecting circuit which selects the at least one light-emitting portion subjected to the adjustment and at least one light-emitting portion used for detection of the timing of starting the scanning; a timing signal generating circuit which generates a timing signal, which controls a timing of emission of the at least one light-emitting portion subjected to the adjustment; a light-amount adjusting circuit which adjusts the light-amount of the at least one light-emitting portion subjected to the adjustment, on the basis of the light-amount of the second light beam received by the light-receiving element; and a light-emitting portion driving circuit which drives the at least one light-emitting portion subjected to the adjustment, on the basis of a signal outputted from the light-amount adjusting circuit.

(13) An optical scanning unit according to (12), wherein the light-emitting portion selecting circuit selects the at least one light-emitting portion subjected to the adjustment from the light-emitting portions excluding a light-emitting portion driven immediately before by the light-emitting portion driving circuit and excluding a light-emitting portion adjacent to that light-emitting portion driven by the light-emitting portion driving circuit immediately before.

(14) An optical scanning unit according to (12), wherein the light-emitting portion selecting circuit selects the at least one light-emitting portion subjected to the adjustment from the light-emitting portions excluding a light-emitting portion used for the detection of the timing of starting the subsequent scanning and excluding a light-emitting portion adjacent to that light-emitting portion used for the detection of the timing of starting the subsequent scanning.

(15) An optical scanning unit according to (12), wherein the light-emitting portion selecting circuit selects the at least one light-emitting portion subjected to the adjustment from the light-emitting portions excluding a light-emitting portion driven by the light-emitting portion driving circuit firstly in the subsequent scanning and excluding a light-emitting portion adjacent to that light-emitting portion driven firstly in the subsequent scanning by the light-emitting portion driving circuit.

(16) An optical scanning unit according to (12), wherein the light-emitting portion selecting circuit selects the plurality of light-emitting portions subjected to the adjustment, and individually drives each of the light-emitting portions such that the selected light-emitting portions subjected to the adjustment emit with a timing different from each other.

According to any one of (12) to (16), at least one of the light-emitting portions is selected as the at least one light-emitting portion subjected to adjustment of the light-amount thereof. In addition, the at least one light-emitting portion subjected to the adjustment is caused to emit the light beam, and the light-amount of the at least one light-emitting portion subjected to the adjustment is adjusted on the basis of the light-amount of the second light beam received by the light-receiving element, during the time from the time point in which the predetermined time after the starting of the scanning is elapsed to the time point in which the scanning light beam reaches the scanning ending edge. At this time, it is possible to obtain the time in which all of the light-emitting portions are turned off. Therefore, it is possible to ensure the suppression of the deterioration of the light-emitting portions due to the generation of heat.

(17) An optical scanning unit, comprising: the light-amount detecting device according to any one of (1) to (16); a holder which integrally retains the light-amount detecting device; and a position adjusting member which adjusts a position of the holder in a sub-scanning direction orthogonal to a direction of scanning by the first light beam on a surface to be scanned.

Accordingly, for example, a light source, a light-receiving element, a coupling lens, and an optical system are integrally retained by the holder with a state in which a mutual positional relationship is maintained. Thus, even when a position of the holder is adjusted by the adjuster, a state of incidence of the second light beam onto the light-receiving element is maintained with high accuracy. Therefore, the optical adjustment between the light source and the light-receiving element is unnecessary, and as a result, it is possible to perform the optical adjustment of the light source unit with high accuracy in a short time.

(18) An optical scanning unit according to (17), wherein the position adjusting member supports the holder with at least three supporting points, and at least one of the at least three supporting points is adjustable in the sub-scanning direction.

Accordingly, for example, the light source, the light-receiving element, the coupling lens, and an optical system are integrally retained by the holder with the state in which the mutual positional relationship is maintained. Thus, even when the position of the holder is adjusted by the adjuster, the state of incidence of the second light beam onto the light-receiving element is maintained with high accuracy. Therefore, the optical adjustment between the light source and the light-receiving element is unnecessary, and as a result, it is possible to perform the optical adjustment of the light source unit with high accuracy in a short time.

(19) An image forming apparatus, comprising: the optical scanning unit according to any one of (11) to (18); a photoreceptor on which an electrostatic latent image is formed by the optical scanning unit on the basis of image information; a developer which develops the electrostatic latent image formed on the photoreceptor as a toner image; and a transferring section which fixes the toner image developed by the developer on a recording medium.

Accordingly, a final image is formed based on the electrostatic latent image formed by the optical scanning unit, which outputs the light stably from the light source. Therefore, it is possible to form the image on the recording medium with high accuracy.

In addition, a final image is formed based on the electrostatic latent image formed by (17) or (18), in which the optical adjustment is carried out with high accuracy and which outputs the light stably from the light source. Therefore, it is possible to form the image on the recording medium with higher accuracy.

Although the present invention has been described in terns of exemplary embodiments, it is not limited thereto. It should be appreciated that variations may be made in the embodiments described by persons skilled in the art without departing from the scope of the present invention as defined by the following claims. The limitations in the claims are to be interpreted broadly based on the language employed in the claims and not limited to examples described in the present specification or during the prosecution of the application, and the examples are to be construed as non-exclusive. For example, in the present disclosure, the term "preferably", "preferred" or the like is non-exclusive and means "preferably", but not limited to. Moreover, no element or component in the present disclosure is intended to be dedicated to the public regardless of whether the element or component is explicitly recited in the following claims.

What is claimed is:

1. A light-amount detecting device, comprising:
a light source which emits a light beam;
a branching optical element which divides the light beam emitted from the light source into a first light beam traveling in a predetermined direction and a second light beam traveling in a direction different to the predetermined direction;
a light-condensing element which condenses the second light beam;
a light-receiving element having a light-receiving surface which receives the second light beam condensed by the light-condensing element; and
a detector which detects a light-amount of the second light beam received by the light-receiving element,
wherein an optical axis of the light-condensing element is inclined relative to the normal of the light-receiving surface, in a plane including the optical axis of the light-condensing element and the normal of the light-receiving surface.

2. A light-amount detecting device according to claim 1, wherein the light source includes a plurality of light-emitting portions arranged two-dimensionally in which an interval between the light-emitting portions located at both ends in a first direction of the light-emitting portions is set smaller than an interval between the light-emitting portions located at both ends in a second direction perpendicular to the first direction of the light-emitting portions, and wherein a direction of a normal of the light-receiving surface of the light-receiving element in a light-receiving position of the second light beam is inclined relative to all directions of incidence of the second light beam entering the light-receiving surface, in a plane which is horizontal to the first direction and which is perpendicular to a plane defined by the first direction and the second direction.

3. A light-amount detecting device according to claim 2, wherein a following relationship is satisfied: $(L1-L2)\times(\theta 1-\theta 2)<0$, where $L1$ is a center interval between the light-emitting portions located at the both ends in the first direction, $L2$ is a center interval between the light-emitting portions located at the both ends in the second direction, $\theta 1$ is an angle between the direction of the normal of the light-receiving surface of the light-receiving element in the light-receiving position of the second light beam and an optical axis of the second light beam entering the light-receiving element in the plane horizontal to the first direction and perpendicular to the plane defined by the first direction and the second direction, and $\theta 2$ is an angle between the direction of the normal of the light-receiving surface of the light-receiving element in the light-receiving position of the second light beam and an optical axis of the second light beam entering the light-receiving element in a plane which is horizontal to the second direction and which is perpendicular to a plane defined by the first direction and the second direction.

4. A light-amount detecting device according to claim 1, wherein the light-condensing element is disposed such that the second light beam is incident on the light-condensing element in a position separated from an optical axis of the light-condensing element.

5. A light-amount detecting device according to claim 1, wherein the light-receiving surface of the light-receiving element is disposed at a position separated in a direction of an optical axis of the light-condensing element from a focal position of the second light beam condensed by the light-condensing element.

6. A light-amount detecting device according to claim 2, wherein each of the light-emitting portions includes a vertical cavity surface emitting laser.

7. A light-amount detecting device according to claim 5, wherein the light-condensing element is disposed such that the second light beam is incident on the light-condensing element in a position separated from an optical axis of the light-condensing element.

8. A light-amount detecting device according to claim 5, further comprising a light-shielding member disposed on an optical path of the reflected light of the second light beam reflected from the light-receiving surface of the light-receiving element and which shields the reflected light.

9. An optical scanning unit, comprising: the light-amount detecting device according to claim 1, wherein the light source includes a plurality of light-emitting portions; a deflector which deflects the first light beam; an optical system which condenses the first light beam deflected from the deflector on a surface to be scanned; a synchronization sensor which detects a timing of starting a scanning by the first light beam of the surface to be scanned; and a controller which selects at least one of the light-emitting portions as the at least one light-emitting portion subjected to adjustment of a light-amount thereof, and which drives the at least one light-emitting portion subjected to the adjustment to emit the light beam and adjusts the light-amount of the at least one light-emitting portion subject to the adjustment on the basis of the light-amount of the second light beam received by the light-receiving element during a time from a time point in which a predetermined time, after the timing of starting the scanning is detected by the synchronization sensor, is elapsed to a time point in which the first light beam reaches a scanning ending edge of the surface to be scanned.

10. An optical scanning unit according to claim 9, wherein the controller comprises: a light-emitting portion selecting circuit which selects the at least one light-emitting portion subjected to the adjustment and at least one light-emitting portion used for detection of the timing of starting the scanning; a timing signal generating circuit which generates a timing signal, which controls a timing of emission of the at least one light-emitting portion subjected to the adjustment; a light-amount adjusting circuit which adjusts the light-amount of the at least one light-emitting portion subjected to the adjustment, on the basis of the light-amount of the second light beam received by the light-receiving element; and a light-emitting portion driving circuit which drives the at least one light-emitting portion subjected to the adjustment, on the basis of a signal outputted from the light-amount adjusting circuit.

11. An optical scanning unit according to claim 10, wherein the light-emitting portion selecting circuit selects the at least one light-emitting portion subjected to the adjustment from the light-emitting portions excluding a light-emitting portion driven immediately before by the light-emitting portion driving circuit and excluding a light-emitting portion adjacent to that light-emitting portion driven by the light-emitting portion driving circuit immediately before.

12. An optical scanning unit according to claim 10, wherein the light-emitting portion selecting circuit selects the at least one light-emitting portion subjected to the adjustment from the light-emitting portions excluding a light-emitting portion used for the detection of the timing of starting the subsequent scanning and excluding a light-emitting portion adjacent to that light-emitting portion used for the detection of the timing of starting the subsequent scanning.

13. An optical scanning unit according to claim 10, wherein the light-emitting portion selecting circuit selects the at least one light-emitting portion subjected to the adjustment from the light-emitting portions excluding a light-emitting portion driven by the light-emitting portion driving circuit firstly in the subsequent scanning and excluding a light-emitting portion adjacent to that light-emitting portion driven firstly in the subsequent scanning by the light-emitting portion driving circuit.

14. An optical scanning unit according to claim 10, wherein the light-emitting portion selecting circuit selects the plurality of light-emitting portions subjected to the adjustment, and individually drives each of the light-emitting portions such that the selected light-emitting portions subjected to the adjustment emit with a timing different from each other.

15. An image forming apparatus, comprising: the optical scanning unit according to claim 9; a photoreceptor on which an electrostatic latent image is formed by the optical scanning unit on the basis of image information; a developer which develops the electrostatic latent image formed on the photoreceptor as a toner image; and a transferring section which fixes the toner image developed by the developer on a recording medium.

16. An optical scanning unit comprising: the light-amount detecting device according to claim 1; a holder which integrally retains the light-amount detecting device; and a position adjusting member which adjusts a position of the holder in a sub-scanning direction orthogonal to a direction of scanning by the first light beam on a surface to be scanned.

17. An optical scanning unit according to claim 16, wherein the position adjusting member supports the holder with at least three supporting points, and at least one of the at least three supporting points is adjustable in the sub-scanning direction.

18. An image forming apparatus, comprising: the optical scanning unit according to claim 16; a photoreceptor on which an electrostatic latent image is formed by the optical scanning unit on the basis of image information; a developer which develops the electrostatic latent image formed on the photoreceptor as a toner image; and a transferring section which fixes the toner image developed by the developer on a recording medium.

19. The light-amount detecting device according to claim 1, wherein at least one of a direction of reflected light of the second light beam reflected from the light-receiving surface of the light-receiving element and spread of the reflected light of the second light reflected from the light-receiving surface of the light-receiving element is adjusted to control a light-amount of the reflected light of the second light beam returning to the light source; and wherein the light-receiving element is disposed such that a direction of a normal of the light-receiving surface in a light-receiving position of the second light beam is inclined relative to all directions of incidence of the second light beam entering the light-receiving surface.

20. The light-amount detecting device according to claim 1, wherein an angle $\theta_1$ between the optical axis of the light-condensing element and the normal of the light-receiving surface at the light-receiving position on the light-receiving surface satisfies the following condition: $\theta_1 > 2 \times \tan^{-1}(dxy/2f)$, where dxy is a diameter of a beam entering the light-condensing element, and f is a focusing distance of the light-condensing element.

* * * * *